(12) United States Patent
Elden

(10) Patent No.: US 12,103,576 B2
(45) Date of Patent: Oct. 1, 2024

(54) STACKABLE COLLAPSIBLE CARTS

(71) Applicant: dbest products, Inc., Carson, CA (US)

(72) Inventor: Richard Elden, Carson, CA (US)

(73) Assignee: dbest products, Inc., Carson, CA (US)

( * ) Notice: Subject to any disclaimer, the term of this patent is extended or adjusted under 35 U.S.C. 154(b) by 0 days.

(21) Appl. No.: 18/542,495

(22) Filed: Dec. 15, 2023

(65) Prior Publication Data

US 2024/0116555 A1    Apr. 11, 2024

Related U.S. Application Data

(63) Continuation of application No. 18/161,677, filed on Jan. 30, 2023, which is a continuation-in-part of
(Continued)

(51) Int. Cl.
B62B 3/02    (2006.01)

(52) U.S. Cl.
CPC .................. B62B 3/025 (2013.01)

(58) Field of Classification Search
CPC ......... B62B 3/025; B62B 3/027; B62B 3/022; B62B 3/02; B62B 5/02; B62B 5/026; B62B 5/028
See application file for complete search history.

(56) References Cited

U.S. PATENT DOCUMENTS 1,554,034 A    9/1925    Richie
2,132,069 A    10/1938   Hall
(Continued)

FOREIGN PATENT DOCUMENTS

CN    206813544 U    12/2017
CN    107668883 A    2/2018
(Continued)

OTHER PUBLICATIONS

AMAZON.Com, "Foldable Utility Cart Portable Rolling Crate Handcart Shopping Trolley Collapsible 4 Rotate Wheels with Durable Heavy Duty Plastic Telescoping Handle for Travel Shopping Moving Storage Office Use", Available online at: "https://www.amazon.com/Portable-Handcart-Telescoping-Collapsible-Shopping/dp/B08HT17X39?th=1", Retrieved on Sep. 6, 2023, 8 pages.

(Continued)

Primary Examiner — John D Walters
(74) Attorney, Agent, or Firm — ORBIT IP, LLP

(57) ABSTRACT

Embodiments of the present disclosure may include a collapsible cart configured to transition from a closed condition where it may be folded up to an open condition where it may be expanded for use, the collapsible cart including a rigid frame forming a compartment, the rigid frame having a front wall, a rear wall, a right sidewall, a left sidewall, and a bottom wall, the right sidewall and the left sidewall may be configured to fold inwardly in the closed condition. In some embodiments, the right sidewall including a first right panel rotatably coupled to a second right panel. In some embodiments, a retractable handle mechanism is disposed at, within or adjacent the back wall. The retractable handle mechanism includes a hand grip attached to a telescoping assembly. The telescoping assembly is pivotably coupled at a proximal end to the bottom of the rear wall.

18 Claims, 53 Drawing Sheets

Related U.S. Application Data application No. 17/712,032, filed on Apr. 1, 2022, now Pat. No. 11,565,735, which is a continuation of application No. 17/143,116, filed on Jan. 6, 2021, now Pat. No. 11,338,835.

(60) Provisional application No. 62/974,956, filed on Jan. 6, 2020, provisional application No. 62/995,375, filed on Jan. 27, 2020, provisional application No. 63/576,750, filed on Mar. 6, 2023, provisional application No. 63/577,068, filed on Mar. 28, 2023.

(56) References Cited

U.S. PATENT DOCUMENTS

| | | | |
|---|---|---|---|
| 2,362,721 A | 11/1944 | Reynolds | |
| 2,514,849 A | 7/1950 | Dewing | |
| 2,564,939 A | 8/1951 | Weast | |
| 2,715,533 A | 8/1955 | Strausburg | |
| 2,742,973 A | 4/1956 | Johannesen | |
| 2,757,935 A | 8/1956 | Sofia | |
| 2,786,692 A | 3/1957 | Timpson | |
| 2,957,700 A | 10/1960 | Beaurline | |
| 3,041,026 A | 6/1962 | Wilson | |
| 3,092,395 A | 6/1963 | Mitty et al. | |
| 3,135,527 A | 6/1964 | Knapp | |
| 3,276,786 A | 10/1966 | Olander | |
| 3,804,432 A | 4/1974 | Lehrman | |
| 4,202,521 A | 5/1980 | Harding | |
| 4,205,413 A * | 6/1980 | Collignon | A61G 1/0243 |
| | | | 16/35 D |
| 4,509,461 A | 4/1985 | Peck | |
| D292,135 S | 9/1987 | Grube et al. | |
| 4,765,644 A | 8/1988 | Bell | |
| 4,765,646 A | 8/1988 | Cheng | |
| 4,852,520 A | 8/1989 | Goetz | |
| 4,887,837 A | 12/1989 | Bonewicz, Jr. et al. | |
| 4,977,857 A | 12/1990 | Slawinski | |
| 5,197,754 A | 3/1993 | Ward | |
| 5,244,219 A | 9/1993 | Hadlum | |
| 5,294,158 A | 3/1994 | Cheng | |
| D352,145 S | 11/1994 | Perez | |
| 5,603,573 A | 2/1997 | Mercier et al. | |
| 5,653,194 A | 8/1997 | Guy | |
| 5,660,476 A | 8/1997 | DeCoster | |
| 5,678,842 A | 10/1997 | Hook et al. | |
| 5,765,665 A | 6/1998 | Cheng et al. | |
| 5,884,982 A | 3/1999 | Yemini | |
| 5,988,671 A | 11/1999 | Abelbeck et al. | |
| 6,021,740 A | 2/2000 | Martz | |
| 6,076,485 A | 6/2000 | Peeples et al. | |
| 6,126,183 A | 10/2000 | Lensing | |
| 6,431,580 B1 | 8/2002 | Kady | |
| 6,561,524 B1 | 5/2003 | Medina | |
| 6,598,898 B2 | 7/2003 | Chu | |
| D477,916 S | 8/2003 | Nykoluk | |
| 6,601,859 B2 | 8/2003 | Durham | |
| 6,626,634 B2 | 9/2003 | Hwang et al. | |
| 6,651,791 B1 | 11/2003 | Nykoluk et al. | |
| 6,688,516 B1 | 2/2004 | Ussen | |
| 6,918,474 B2 | 7/2005 | Nykoluk | |
| 7,066,476 B2 | 6/2006 | Elden | |
| D525,758 S | 7/2006 | Lynch | |
| 7,140,635 B2 | 11/2006 | Johnson et al. | |
| 7,147,243 B2 | 12/2006 | Kady | |
| D545,025 S | 6/2007 | Elden | |
| 7,316,407 B1 | 1/2008 | Elden | |
| D565,269 S | 3/2008 | Tomasiak et al. | |
| 7,458,451 B2 | 12/2008 | Godshaw et al. | |
| 7,617,797 B2 | 11/2009 | Lam | |
| 7,731,221 B2 | 6/2010 | Bess | |
| 7,789,044 B2 | 9/2010 | McGrade | |
| 7,914,015 B2 | 3/2011 | Tompkins | |
| D642,764 S | 8/2011 | Elden | |
| 8,317,219 B2 | 11/2012 | Bruce | |
| 8,366,124 B1 | 2/2013 | Caldwell | |
| 8,439,374 B1 | 5/2013 | Elden | |
| D690,893 S | 10/2013 | O'Brien | |
| 8,579,305 B2 | 11/2013 | Hou | |
| 8,641,059 B2 * | 2/2014 | Khodor | B62B 1/12 |
| | | | 280/47.28 |
| 8,915,504 B1 | 12/2014 | Seibert | |
| D723,237 S | 2/2015 | Maddux et al. | |
| 9,233,700 B1 | 1/2016 | Elden | |
| 9,382,035 B2 * | 7/2016 | Fritz | B65D 21/0213 |
| 9,392,766 B1 | 7/2016 | Elden | |
| 10,588,388 B2 | 3/2020 | Kabalin | |
| 10,676,235 B1 * | 6/2020 | Song | B65D 11/1873 |
| D904,716 S | 12/2020 | Shen | |
| D930,314 S | 9/2021 | Huang | |
| D932,186 S | 10/2021 | Brunner et al. | |
| D942,107 S | 1/2022 | Ren | |
| 2002/0050429 A1 | 5/2002 | Nykoluk et al. | |
| 2002/0089134 A1 | 7/2002 | Salzberger et al. | |
| 2002/0139628 A1 | 10/2002 | Chang | |
| 2002/0144874 A1 | 10/2002 | Nykoluk et al. | |
| 2003/0011173 A1 * | 1/2003 | Shall | A01K 97/22 |
| | | | 280/639 |
| 2004/0075248 A1 | 4/2004 | Elden | |
| 2004/0211635 A1 | 10/2004 | Lu | |
| 2005/0275195 A1 | 12/2005 | Matula et al. | |
| 2006/0278173 A1 | 12/2006 | Kamijo | |
| 2007/0215425 A1 | 9/2007 | Slater | |
| 2009/0145913 A1 * | 6/2009 | Panosian | B62B 1/12 |
| | | | 220/666 |
| 2009/0205578 A1 | 8/2009 | Alves | |
| 2009/0212536 A1 | 8/2009 | Tadeo | |
| 2010/0026080 A1 * | 2/2010 | Colchiesqui | B62B 5/026 |
| | | | 301/5.23 |
| 2010/0175633 A1 | 7/2010 | Krauss et al. | |
| 2011/0056441 A1 | 3/2011 | Chang | |
| 2011/0197823 A1 | 8/2011 | Pietra | |
| 2012/0055122 A1 | 3/2012 | Beauchamp | |
| 2012/0274052 A1 | 11/2012 | Zhu | |
| 2013/0320641 A1 | 12/2013 | Zhang | |
| 2015/0360710 A1 | 12/2015 | Thompson | |
| 2017/0001654 A1 * | 1/2017 | Obrien | B62B 1/14 |
| 2017/0120679 A1 | 5/2017 | Naiva | |
| 2017/0297601 A1 | 10/2017 | Carbonaro | |
| 2018/0014502 A1 | 1/2018 | O'Shaughnessy et al. | |
| 2019/0216193 A1 | 7/2019 | Kabalin | |
| 2019/0322302 A1 * | 10/2019 | Greenup | B62B 1/002 |
| 2020/0269898 A1 | 8/2020 | Frankel et al. | |

FOREIGN PATENT DOCUMENTS

| | | |
|---|---|---|
| CN | 207120985 U | 3/2018 |
| CN | 207191693 U | 4/2018 |
| CN | 207506081 U | 6/2018 |
| CN | 108328065 A | 7/2018 |
| CN | 208070260 U | 11/2018 |
| CN | 304926177 S | 12/2018 |
| CN | 305015819 S | 1/2019 |
| CN | 209177176 U | 7/2019 |
| CN | 210747711 U | 6/2020 |
| CN | 214777508 U | 11/2021 |
| DE | 202020102798 U1 | 5/2020 |
| EP | 3318465 A1 | 5/2018 |
| GB | 2243198 A | 10/1991 |
| GB | 2349186 A | 10/2000 |

OTHER PUBLICATIONS

AMAZON.Com, Foldable Utility Cart Folding Portable Rolling Crate Handcart with Durable Heavy Duty Plastic Telescoping Handle Collapsible 4 Rotate Wheels for Travel Shopping Moving Luggage Office Use (Red), Available online at: "https://www.amazon.com/Foldable-Portable-Handcart-Telescoping-Collapsible/dp/B07YFG4BW6/ref=sr_1_1?dchild=1&keywords=B07YFG4BW6&qid=1627442148&sr=8-1&th=1" Retrieved on Sep. 6, 2023, 9 pages.

(56) References Cited

OTHER PUBLICATIONS

AMAZON.Com, "Olympia Tools 85-015 Grand Folding Storage Rolling Cart with Telescopic Handle for Easy Transportation, Weight Capacity up to 150 Pounds", Available online at : "https://www.amazon.ca/Pack-N-Roll-85-015-917-85-015-Portable-Capacity/dp/B076D9XG7T?th=1", Retrieved on Sep. 6, 2023, 7 pages.

AMAZON.Com, "Olympia Tool 85-010 Grand Pack-N-Roll Portable Tool Carrier, Black" Available online at: "https://web.archive.org/web/20150727103951/http://www.amazon.com:80/Olympia-85-010-Pack-N-Roll-Portable-Carrier/dp/B000UZ0P7I", Retrieved on Sep. 6, 2023, 5 pages.

Bed Bath and Beyond. com, "Folding Crate Cart in Grey", 2022, 9 pages.

EBAY.com, "Dbest Products Quik Cart Elite Stair Climber wheeled rolling crate", May 31, 2022, 4 pages, https://www.ebay.com/itm/394062298897.

Global Industrial, "Olympia Tools Grand Pack-N-Roll® Rolling Folding Crate Cart 85-010—80 Lb. Capacity", Available online at: "https://www.globalindustrial.com/p/pack-n-roll-grand-rolling-folding-crate-cart-85-010", Retrieved on Sep. 6, 2023, 3 pages.

\* cited by examiner

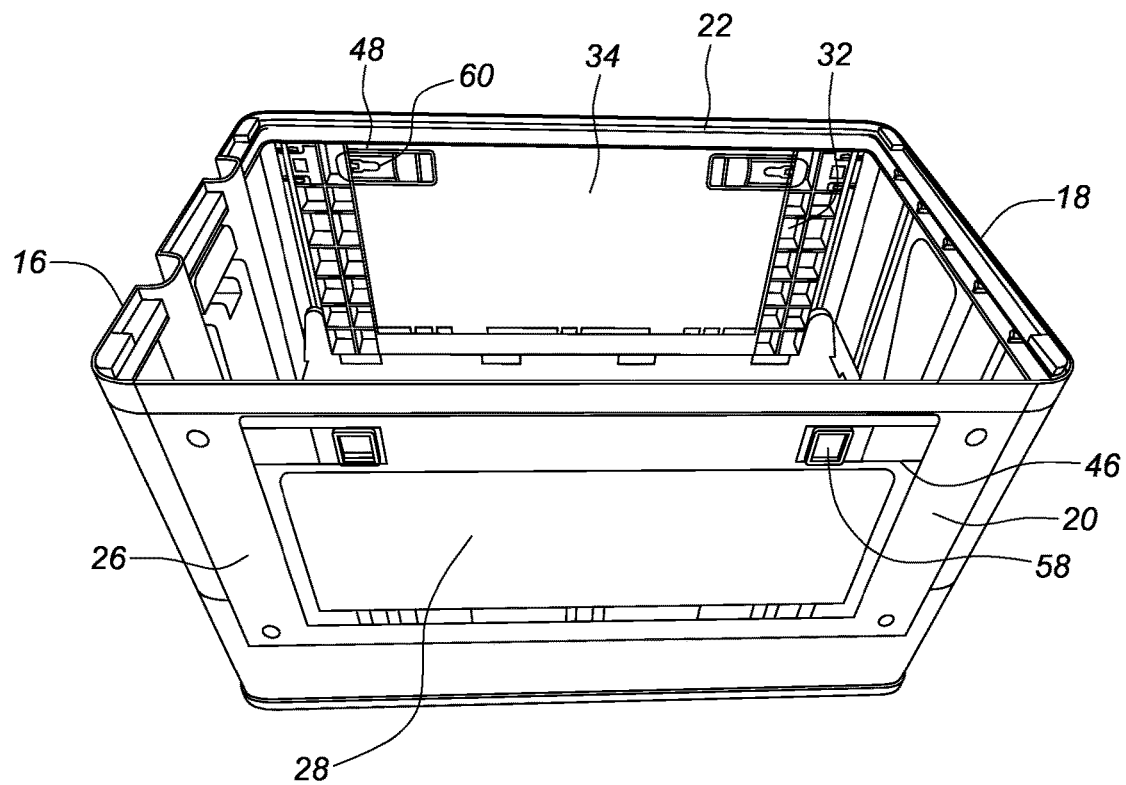
FIG. 51
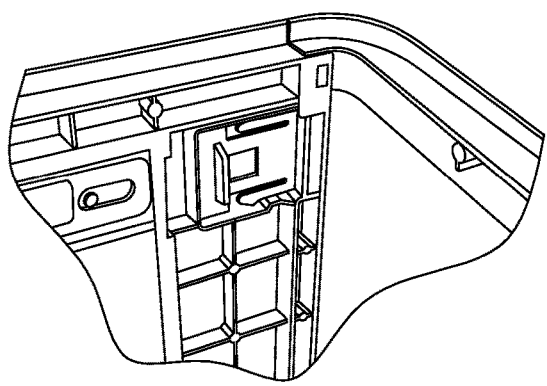 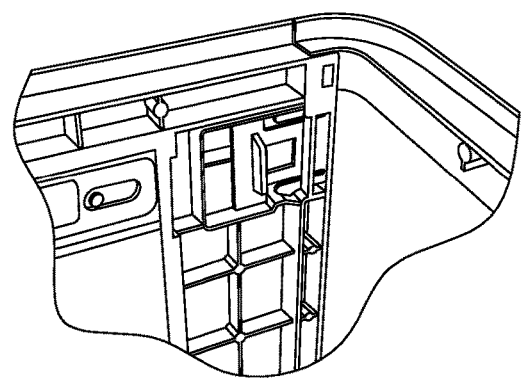
FIG. 52        FIG. 53

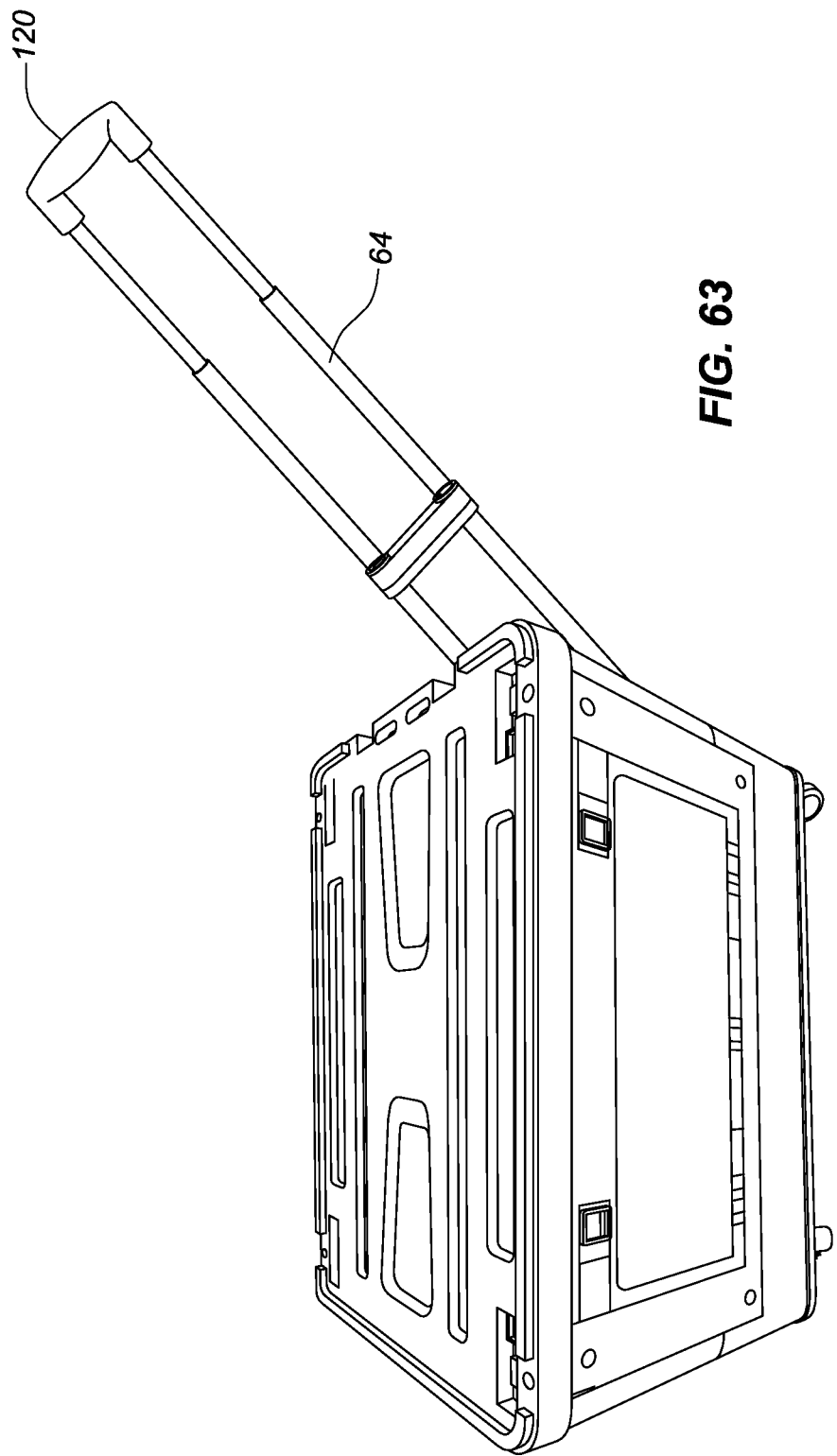

STACKABLE COLLAPSIBLE CARTS

RELATED APPLICATIONS

This application is a continuation of U.S. patent application Ser. No. 18/161,677, filed on Jan. 30, 2023, which is a continuation-in-part of U.S. patent application Ser. No. 17/712,032, filed on Apr. 1, 2022, and issued as U.S. Pat. No. 11,338,835, which is a continuation of U.S. patent application Ser. No. 17/143,116, filed on Jan. 6, 2021, and issued as U.S. Pat. No. 11,338,835, which claims the benefit of the filing date of U.S. Provisional Patent Application, Ser. No. 62/974,956, filed on Jan. 6, 2020, and U.S. Provisional Patent Application, Ser. No. 62/995,375, filed on Jan. 27, 2020, the disclosure of each is incorporated herein by reference in its entirety. This application also claims the benefit of U.S. Provisional Patent Application, Ser. No. 63/576,750, filed on Mar. 6, 2023, the disclosure of which is incorporated herein by reference in its entirety. This application also claims the benefit of U.S. Provisional Patent Application, Ser. No. 63/577,068, filed on Mar. 28, 2023, the disclosure of which is incorporated herein by reference in its entirety.

FIELD OF THE INVENTION

This patent document relates to collapsible carts, and more particularly, to collapsible carts for high load capacity that are capable of folding up for convenient storage.

DESCRIPTION OF THE RELATED ART

Collapsible carts have been widely used in household and commercial settings. They provide a convenient way to transport objects when needed, but can be folded or collapsed for storage.

The following patents and published applications are representative prior art: 1. U.S. Pat. No. 2,564,939 issued to Louis S. Weast on Aug. 21, 1951 for "Foldable Shopping Cart"; 2. U.S. Pat. No. 2,786,692 issued to Anne Jackson Timpson on Mar. 26, 1957 for "Collapsible Cart"; 3. U.S. Pat. No. 3,092,395 issued to Sol Mitty et al. on Jun. 4, 1963 for "Corrugated Shopping Cart and Parts"; 4. U.S. Pat. No. 3,135,527 issued to Philip B. Knapp on Jun. 2, 1964 for "Wheeled Market Carts"; 5. U.S. Pat. No. Des. 292,135 issued to John W. Grube et al. on Sep. 29, 1987 for "Collapsible Cart"; 6. U.S. Pat. No. 4,765,644 issued to Laurence G. Bell on Aug. 23, 1988 for "Foldable Cart"; 7. U.S. Pat. No. 4,765,646 issued to Karen Cheng on Aug. 23, 1988 for "Collapsible Shopping Cart"; 8. U.S. Pat. No. 5,197,754 issued to Lyla B. Ward on Mar. 30, 1993 for "Collapsible Beach Cart"; 9. U.S. Pat. No. 5,244,219 issued to Sidney R. Hadlum on Sep. 14, 1993 for "Hand Held Carrier"; 10. U.S. Pat. No. 5,988,671 issued to Kevin G. Abelbeck et al. on Nov. 23, 1999 for "Collapsible Cart"; 11. United States Published Patent Application No. 2002/0050429 to Cory O. Nykoluk et al. on May 2, 2002 for "Pivotal Handle For Towable Baggage"; 12. United States Published Patent Application No. 2002/0139628 to Wen-Cheng Chang on Oct. 3, 2002 for "Retractable Handle Assembly"; 13. United States Published Patent Application No. 2002/0144874 to Cory O. Nykoluk et al. on Oct. 10, 2002 for "Pivotal Handle For Towable Baggage"; 14. U.S. Pat. No. 6,598,898 issued to Yong S. Chu on Jul. 29, 2003 for "Folding Cart"; 15. U.S. Pat. No. D477,916 issued to Cory O. Nykoluk on Aug. 5, 2003 for "Towing Member For A Piece of Baggage"; 16. U.S. Pat. No. 6,651,791 issued to Cory O. Nykoluk et al. on Nov. 25, 2003 for "Pivotal Handle For Towable Baggage"; 17. United States Published Patent Application No. 2004/0211635 to Chen-Tien Lu on Oct. 28, 2004 for "Apparatus for Mounting Telescopic Handle on Trunk"; 18. U.S. Pat. No. 6,918,474 issued to Cory O. Nykoluk on Jul. 19, 2005 for "Towable Wheeled-Backpack"; 19. United States Published Patent Application No. 2009/0212536 to Maria I. Tadeo on Aug. 27, 2009 for "Collapsible Rolling Tote Bag"; 20. U.S. Pat. No. 7,731,221 issued to Suzan L. Bess on Jun. 8, 2010 for "Collapsible and Portable Wheeled Dolly Particularly Suitable for Use by Students or Others in the Transport of Items"; 21. U.S. Pat. No. 7,066,476 issued to the named inventor Richard Elden on Jun. 27, 2006 for "Side Attachable Cover/Seat for a Cart Carrying Box"; 22. U.S. Pat. No. 7,147,243 issued to Darren Kady on Dec. 12, 2006 for "Accessories for a Collapsible Rolling Caddy"; and 23. U.S. Pat. No. 8,439,374 issued to the named inventor Richard Elden on May 14, 2013 for "Lightweight High Load Capacity Folding Utility Cart with Unique Support Structure and Ergonomic Handle."

Because of the collapsible nature of the prior art cart design, the sidewalls may not be sufficiently sturdy to allow for transporting heavy objects. None of the prior art has effectively addressed this problem. Thus, the need for improvements to collapsible carts still remains.

SUMMARY

Stackable collapsible carts are disclosed herein. Embodiments of the present disclosure may include a collapsible cart configured to transition from a closed condition where it may be folded up to an open condition where it may be expanded for use. The collapsible cart may include a rigid frame forming a compartment. The rigid frame having a front wall, a rear wall, a right sidewall, a left sidewall, and a bottom wall. The right sidewall and the left sidewall may be configured to fold inwardly in the closed condition.

In some embodiments, the right sidewall includes a first right panel rotatably coupled to a second right panel. In some embodiments, the second right panel proportioned to fit within an opening in the first right panel. Embodiments may also include a first lock assembly comprising a first track and a first slideable member. The first track formed along the first right panel and the second right panel, and extending from a first position on the first right panel to a second position on the second right panel. The first slideable member may be cooperatively engaged to the first track. The first slideable member may be movable along the first track between an open position to a closed position to selectively lock the first right panel to the second right panel. In some embodiments, the first slideable member may be in the open position when disposed along the first track adjacent the first position of the first track while not disposed along the second right panel and may be in the closed position when disposed along the first track adjacent the second position of the first track while being disposed across both the first right panel and second right panel.

In some embodiments, the second right panel may include a ribbed wall with a plurality of ribs. The ribbed wall may be disposed adjacent or parallel to the first track. In some embodiments, the collapsible cart may include a top cover with at least one integrated lock assembly. The at least one lock assembly removably couples the top cover to an interior surface of at least one of the front wall, the rear wall, the right sidewall, and the left sidewall.

In some embodiments, the left sidewall including a first left panel rotatably coupled to a second left panel. The second left panel may be proportioned to fit within an opening in the first left panel. In some embodiments, the collapsible cart may include a second track formed along the first left panel and the second left panel extending from a first position on the first left panel to a second position on the second left panel. Embodiments may also include a second slideable member cooperatively engaged to the second track, the second slideable member may be movable along the second track between an open position to a closed position to selectively lock the first left panel to the second left panel.

In some embodiments, the second slideable member may be in the open position when disposed along the second track adjacent the first position of the second track while not disposed along the second left panel and may be in the closed position when disposed along the second track adjacent the second position of the second track while being disposed across both the first left panel and second left panel.

In yet another embodiment, the right sidewall further including a third right panel. In some embodiments, each of the second right panel and the third right panel encloses half of the opening in the first right panel. In some embodiments, the collapsible cart may include a telescoping handle assembly adjacent the rear wall, the telescoping handle assembly may include a hand grip at a distal end of the telescoping handle assembly and may be pivotably coupled at proximal end to the bottom of the rear wall. Embodiments may also include a sliding lock member translatable along at least a portion of the telescoping handle assembly. In some embodiments, the sliding lock member may be configured to lock to the rear wall securing the telescoping handle assembly parallel to the rear wall. In some embodiments, the sliding lock member may be configured to unlock from the rear wall allowing the telescoping handle assembly to pivot at an angle away from the rear wall. In some embodiments, the telescoping handle assembly may be rotatable to be horizontally aligned with the bottom wall and may be retained parallel to the bottom wall when in storage. In some embodiments, the bottom wall may include a sleeve. The telescoping handle assembly may be rotatable to be horizontally aligned with the bottom wall and may be retained in the sleeve when the stackable collapsible cart may be in the closed condition.

In some embodiments, the collapsible cart may include a wheel assembly coupled to the bottom wall of the cart. In some embodiments, the rigid top cover includes an indentation pattern being at least substantially aligned with the vertical axis of the wheel assembly. The indentation pattern configured to receive a wheel assembly from another identical collapsible cart when stacked vertically. In some embodiments, the top cover may also include an integrated second lock assembly. The second lock assembly may be configured to removably couple the top cover to an interior surface of at least one of the front wall, the rear wall, the right sidewall, and the left sidewall.

Each of the foregoing various aspects, together with those set forth in the claims and described in connection with the embodiments summarized above and disclosed herein may be combined to form claims for a device, apparatus, system, methods of manufacture and/or use in any way disclosed herein without limitation.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

FIGS. 50-51 are perspective views of the collapsible cart of FIG. 45 illustrating the transition from a closed condition to an open condition, according to an embodiment.

FIGS. 52-53 illustrate a lock assembly translatable to lock a first panel to a second panel of the collapsible cart of FIG. 45, according to an embodiment.

FIG. 63 is a view similar to FIG. 62 now showing how the telescoping handle can pivot at its proximal end for rolling the cart while allowing all four wheels to remain in contact with the ground.

DETAILED DESCRIPTION

Figure 1:
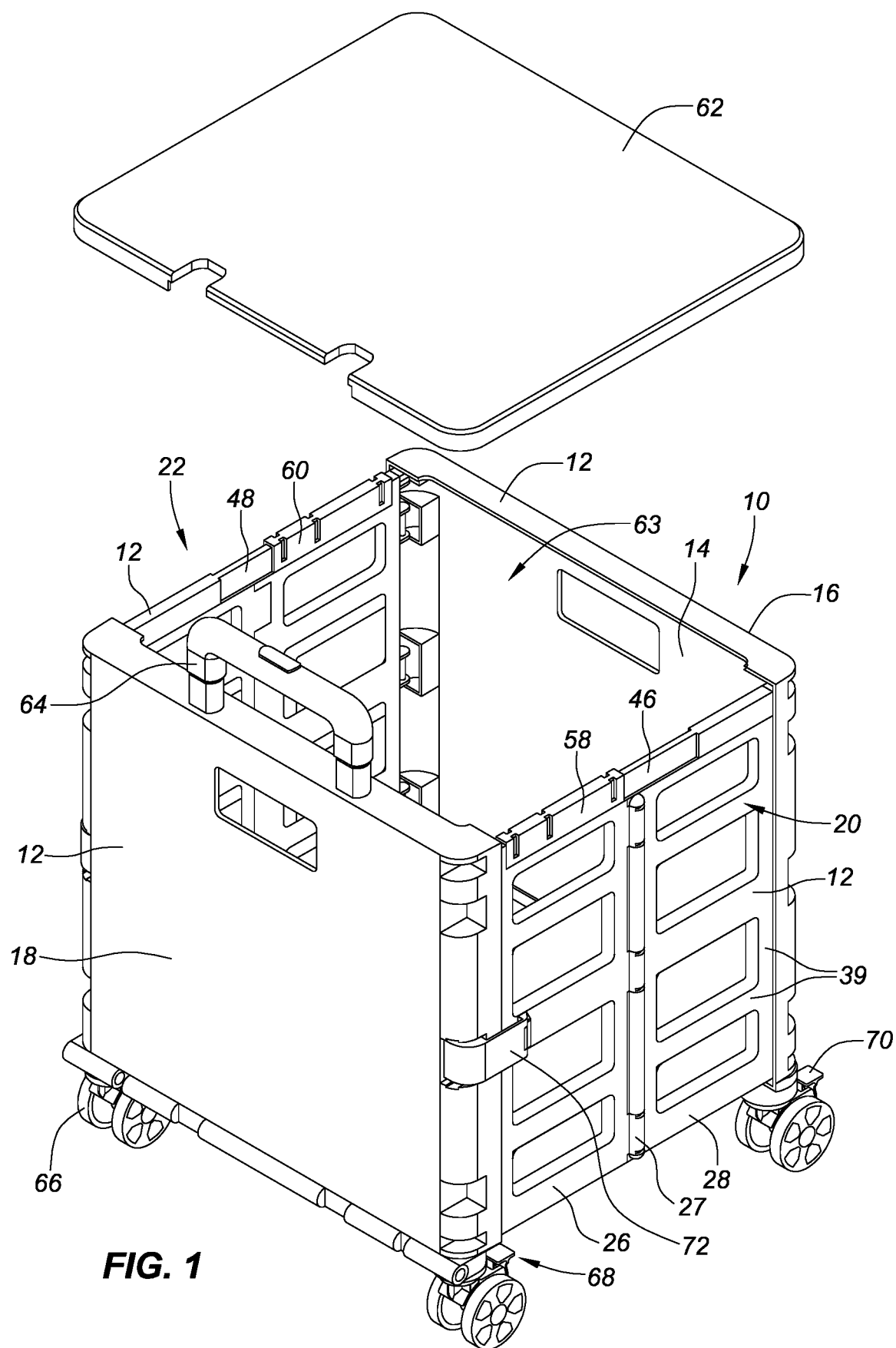
FIG. 1 is a perspective view of a collapsible cart illustrated in an open condition, according to an embodiment.
Figure 2:
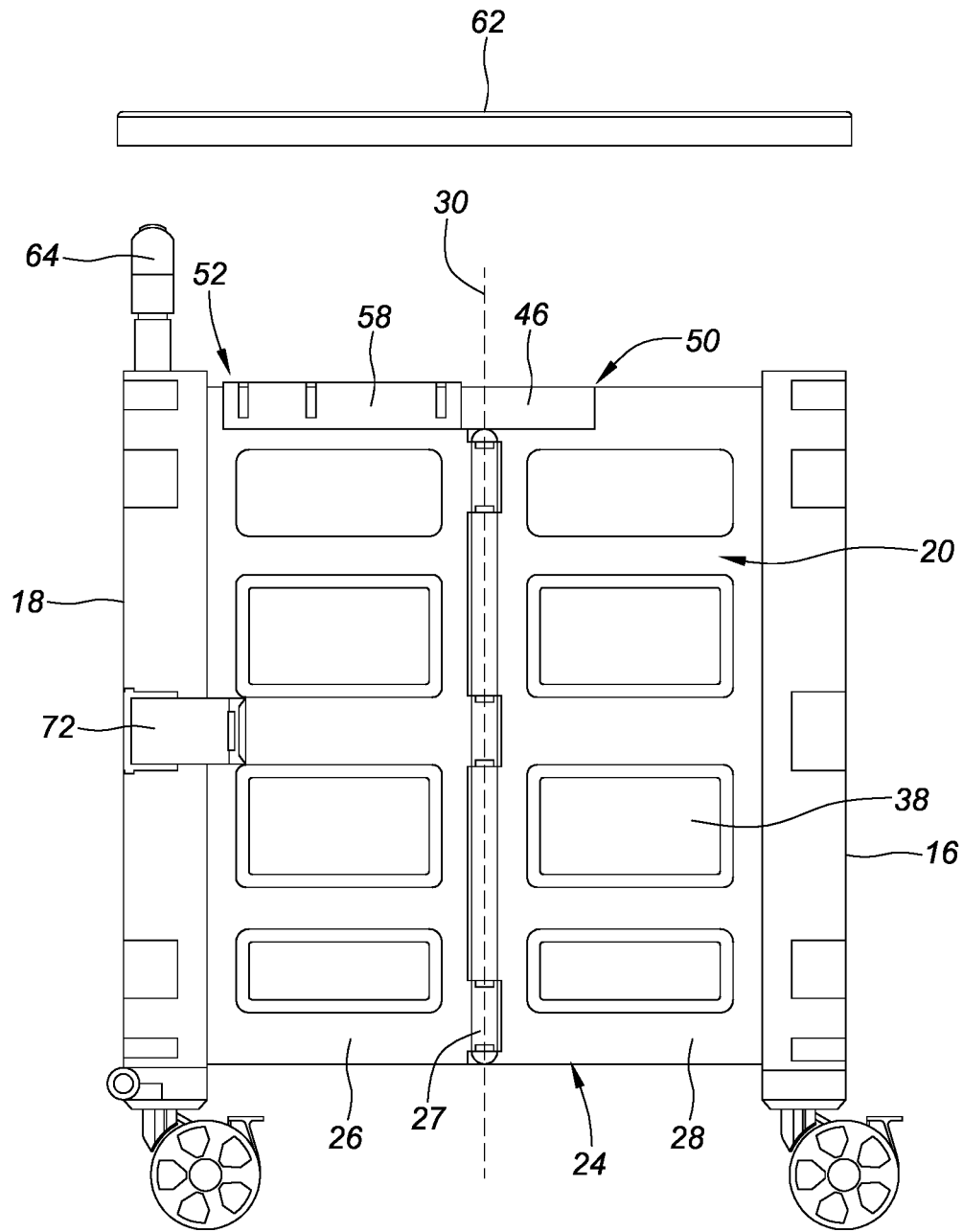
FIG. 2 is a right-side view of the collapsible cart of FIG. 1, according to an embodiment.
Figure 3:
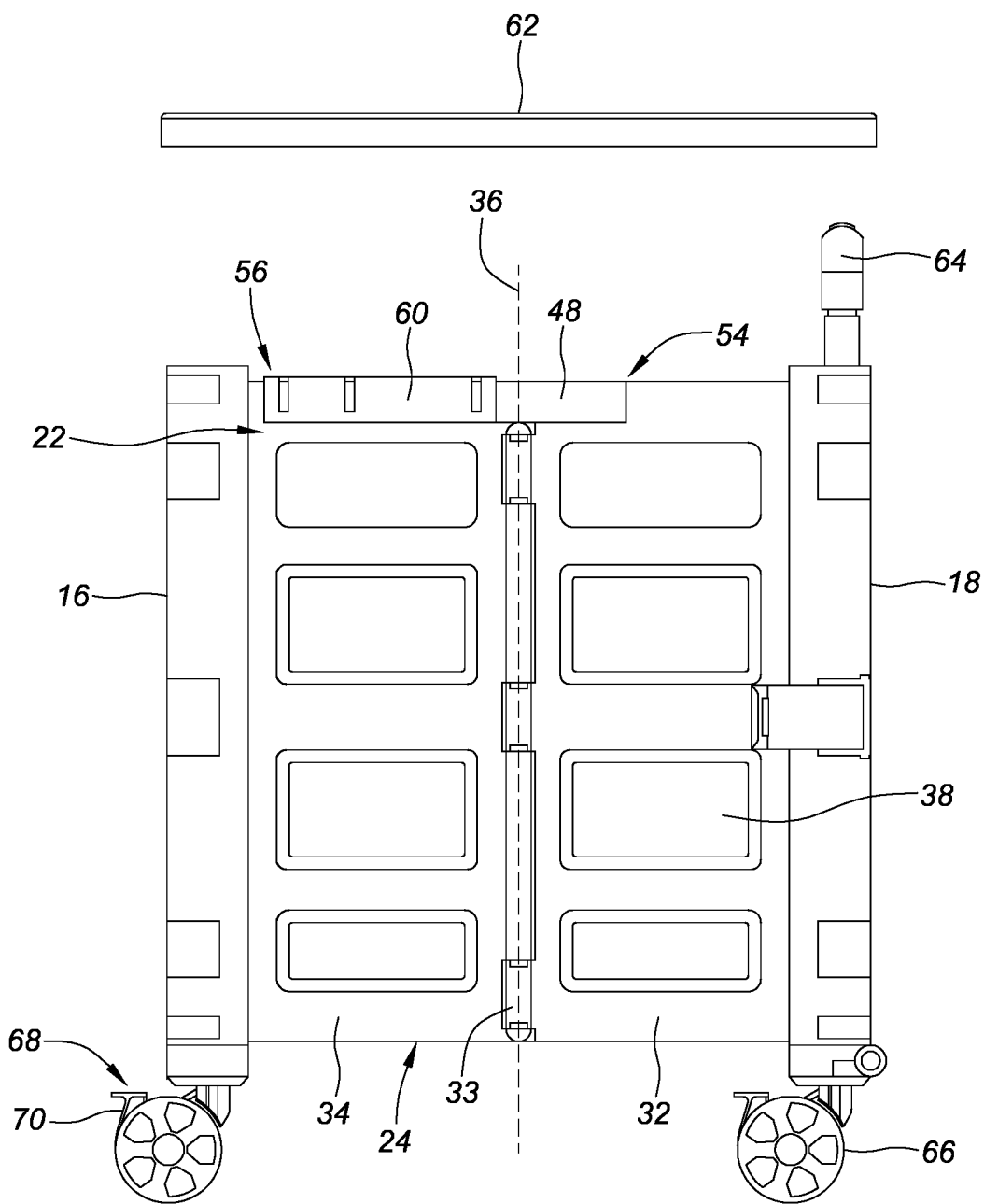
FIG. 3 is a left-side view of the collapsible cart of FIG. 1, according to an embodiment.
Figure 4:
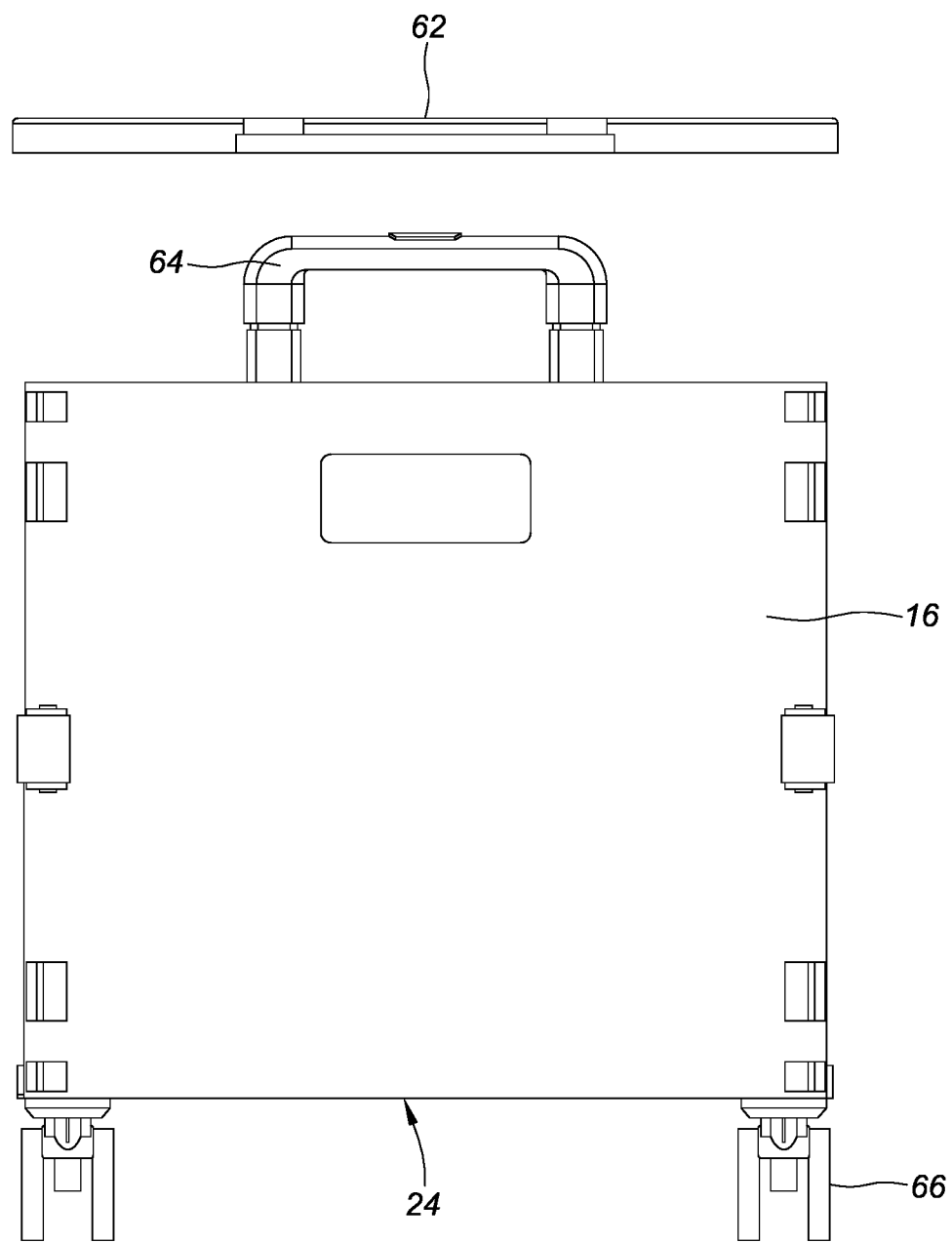
FIG. 4 is a front plan view of the collapsible cart of FIG. 1, according to an embodiment.
Figure 5:
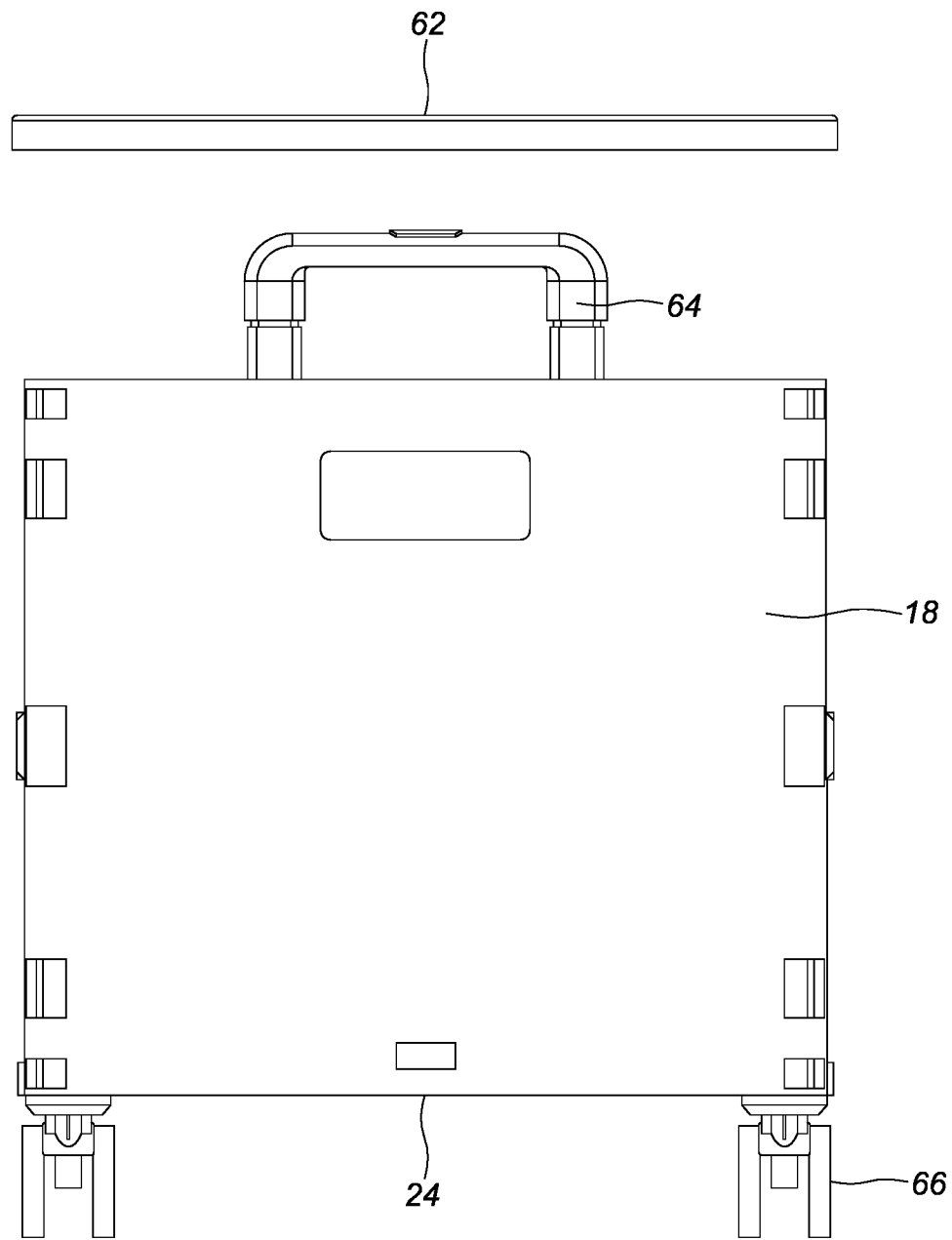
FIG. 5 is a rear plan view of the collapsible cart of FIG. 1, according to an embodiment.
Figure 6:
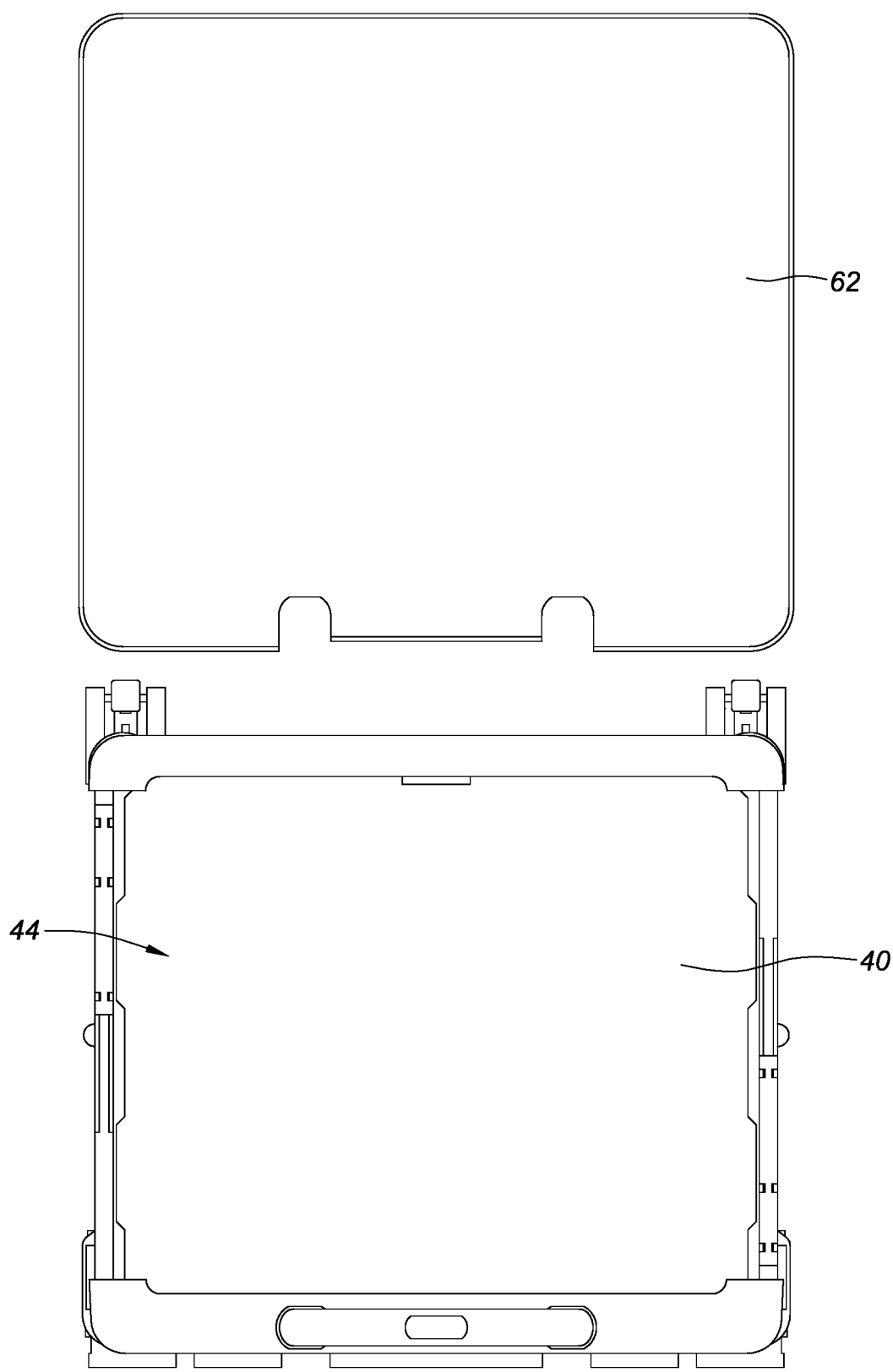
FIG. 6 is a top view of the collapsible cart of FIG. 1, according to an embodiment.
Figure 7:
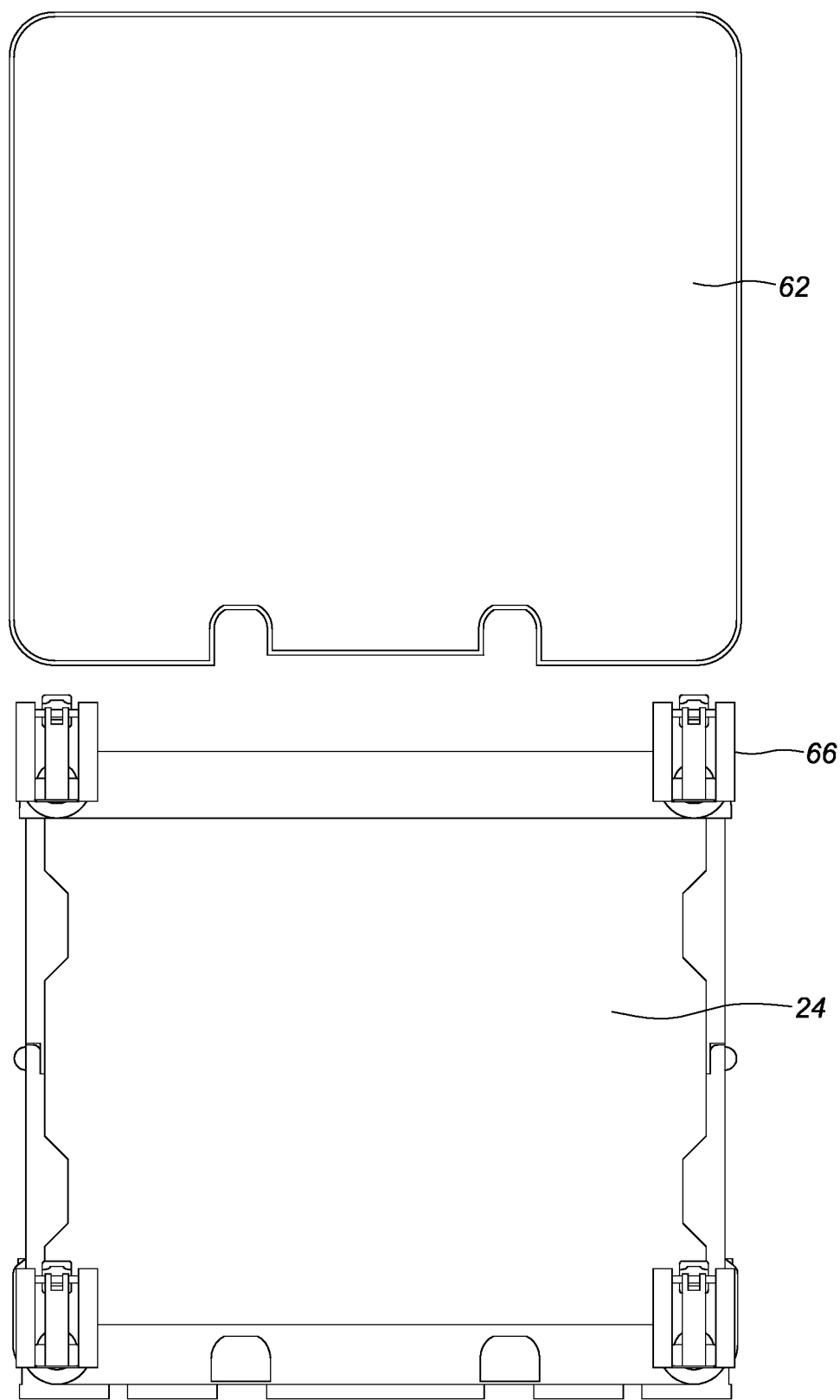
FIG. 7 is a bottom view of the collapsible cart of FIG. 1, according to an embodiment.
Figure 8:
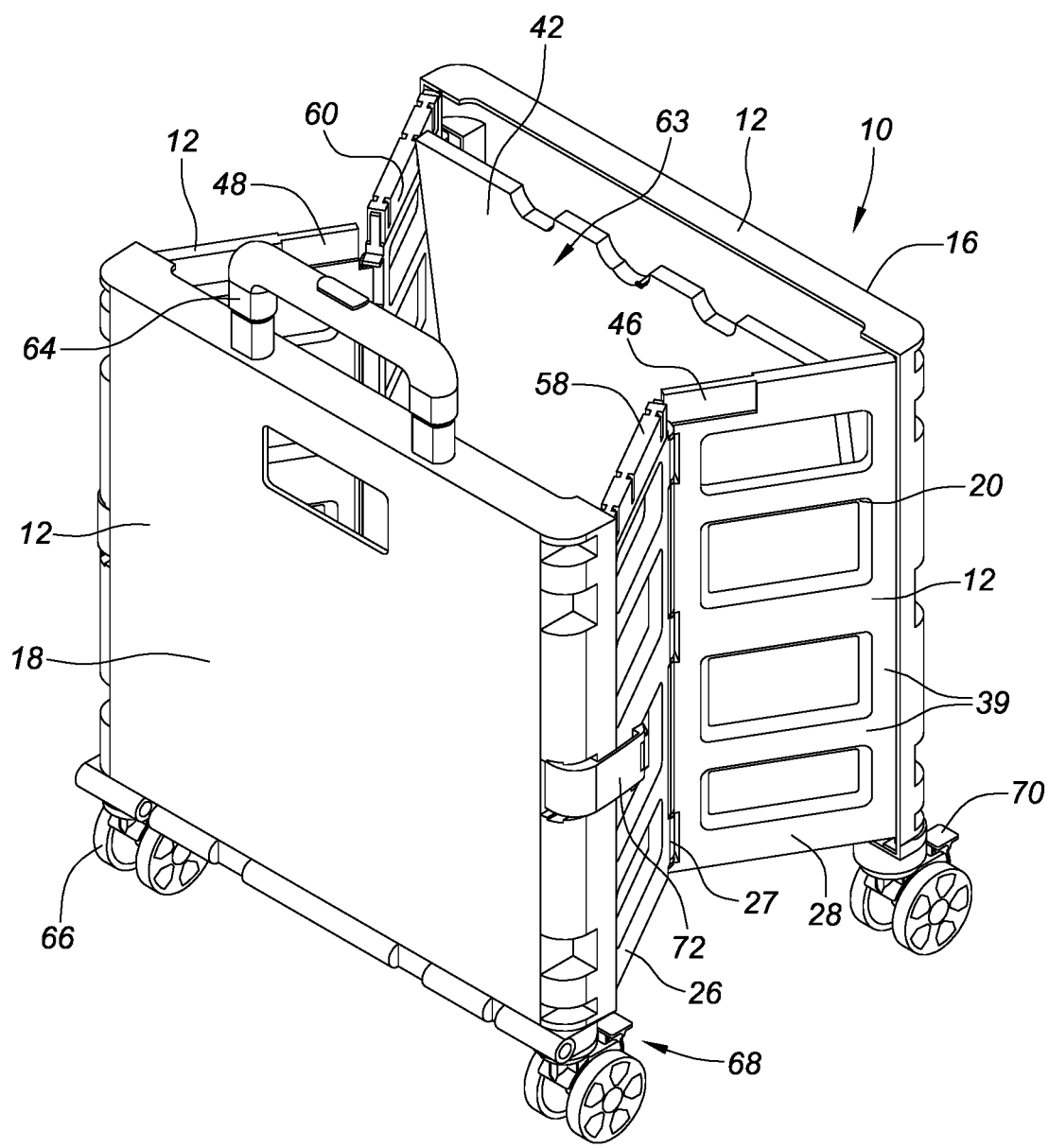
FIG. 8 is a perspective view of the collapsible cart of FIG. 1 illustrated with the sidewalls folded inwardly, according to an embodiment.
Figure 9:
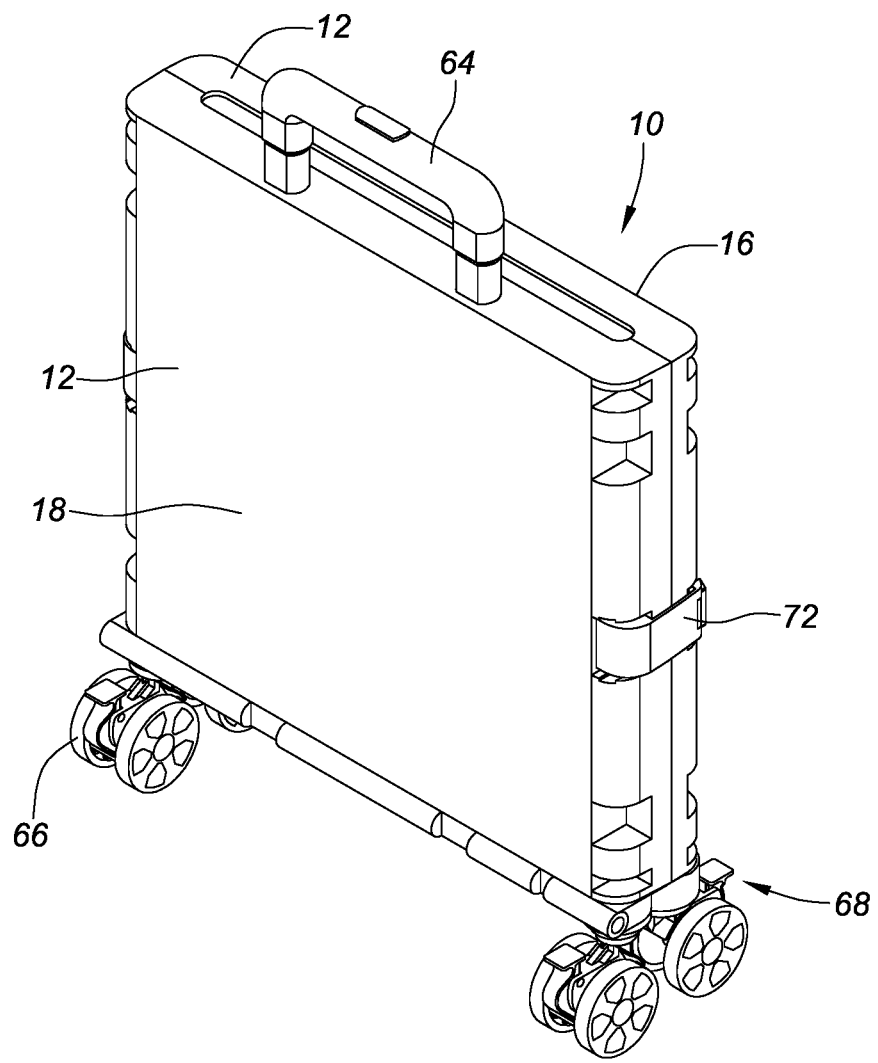
FIG. 9 is a perspective view of the collapsible cart of FIG. 1 illustrated in a closed condition, according to an embodiment.
Figure 10:
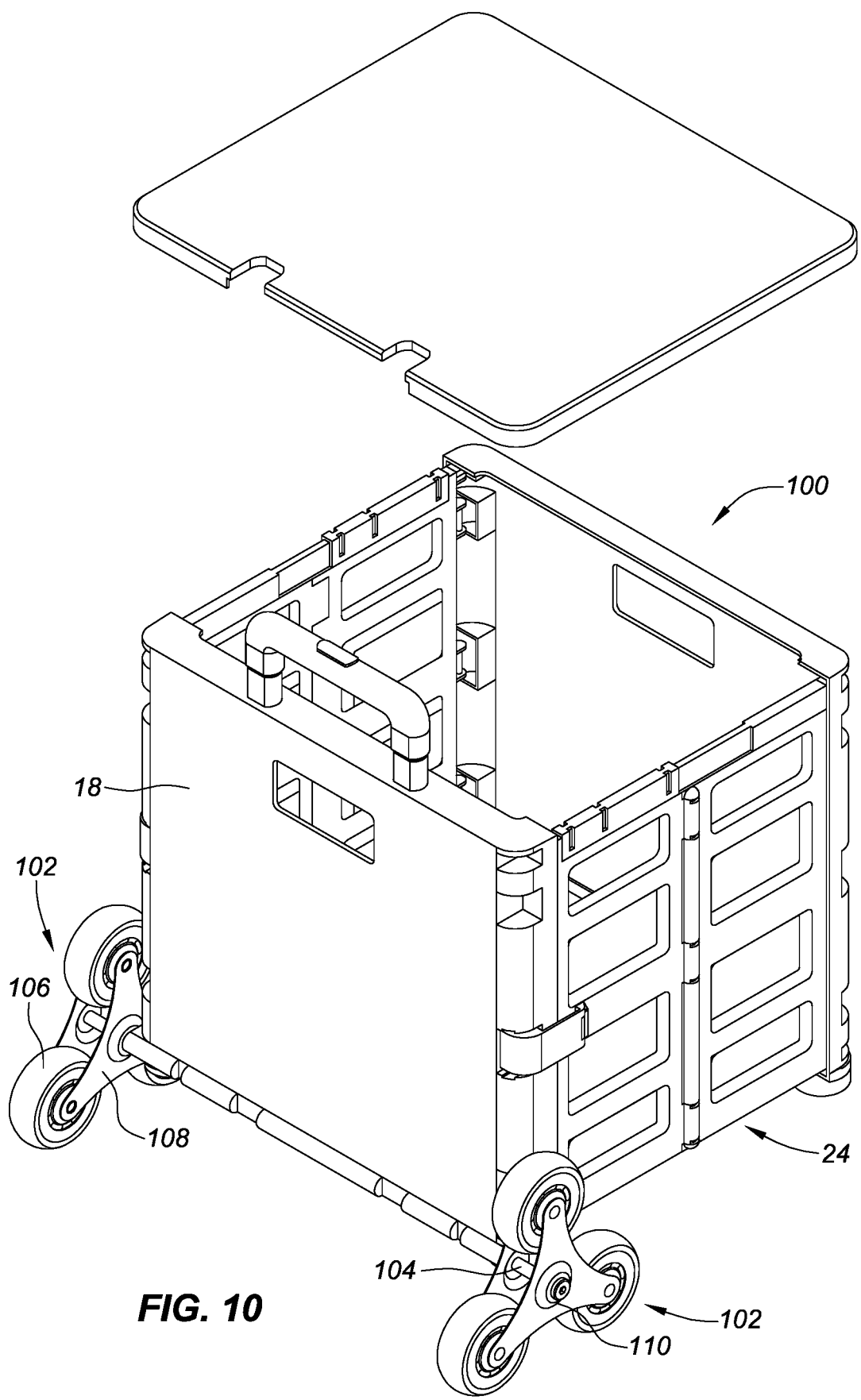
FIG. 10 is a perspective view of a collapsible cart illustrated in an open condition, according to an embodiment.
Figure 11:
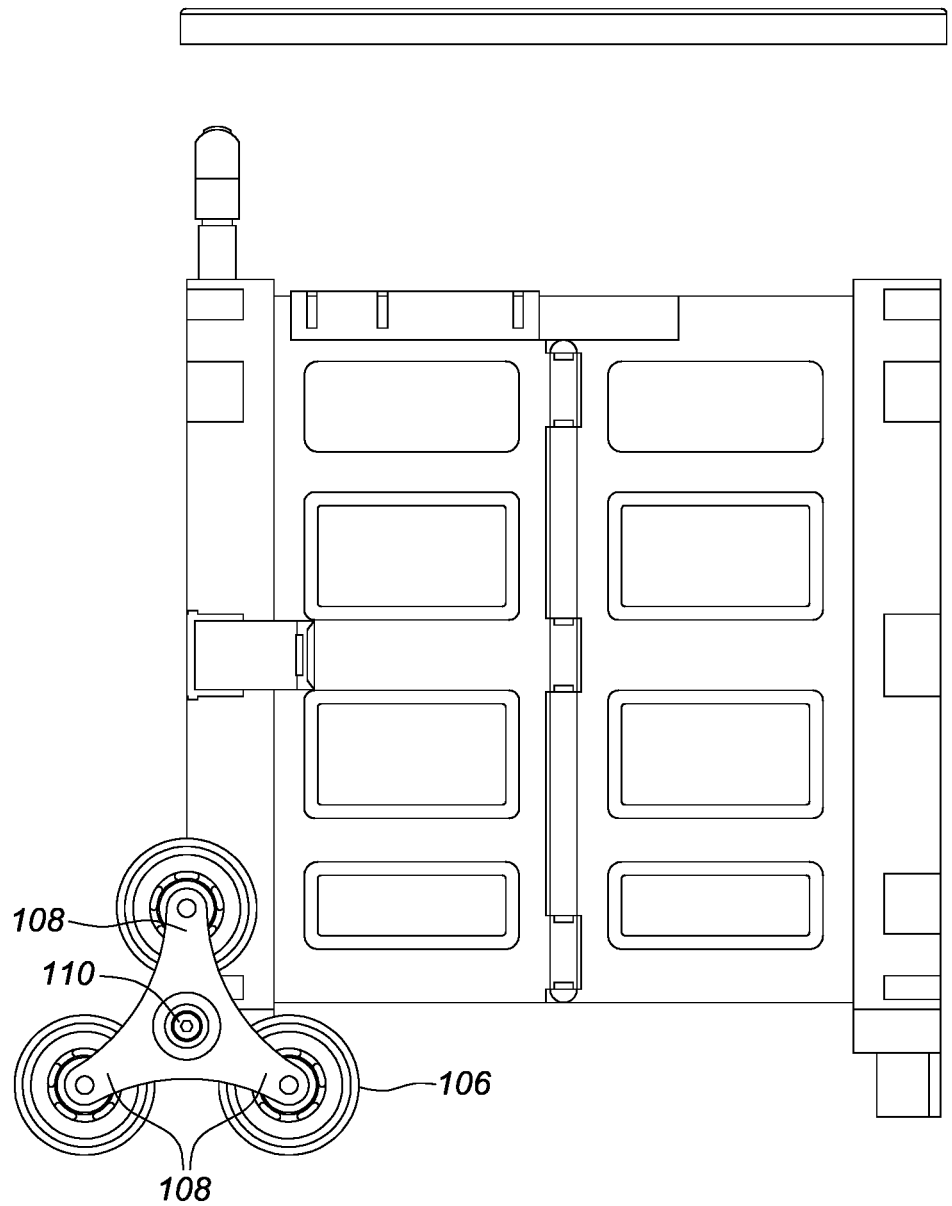
FIG. 11 is a right-side view of the collapsible cart of FIG. 10, according to an embodiment.
Figure 12:
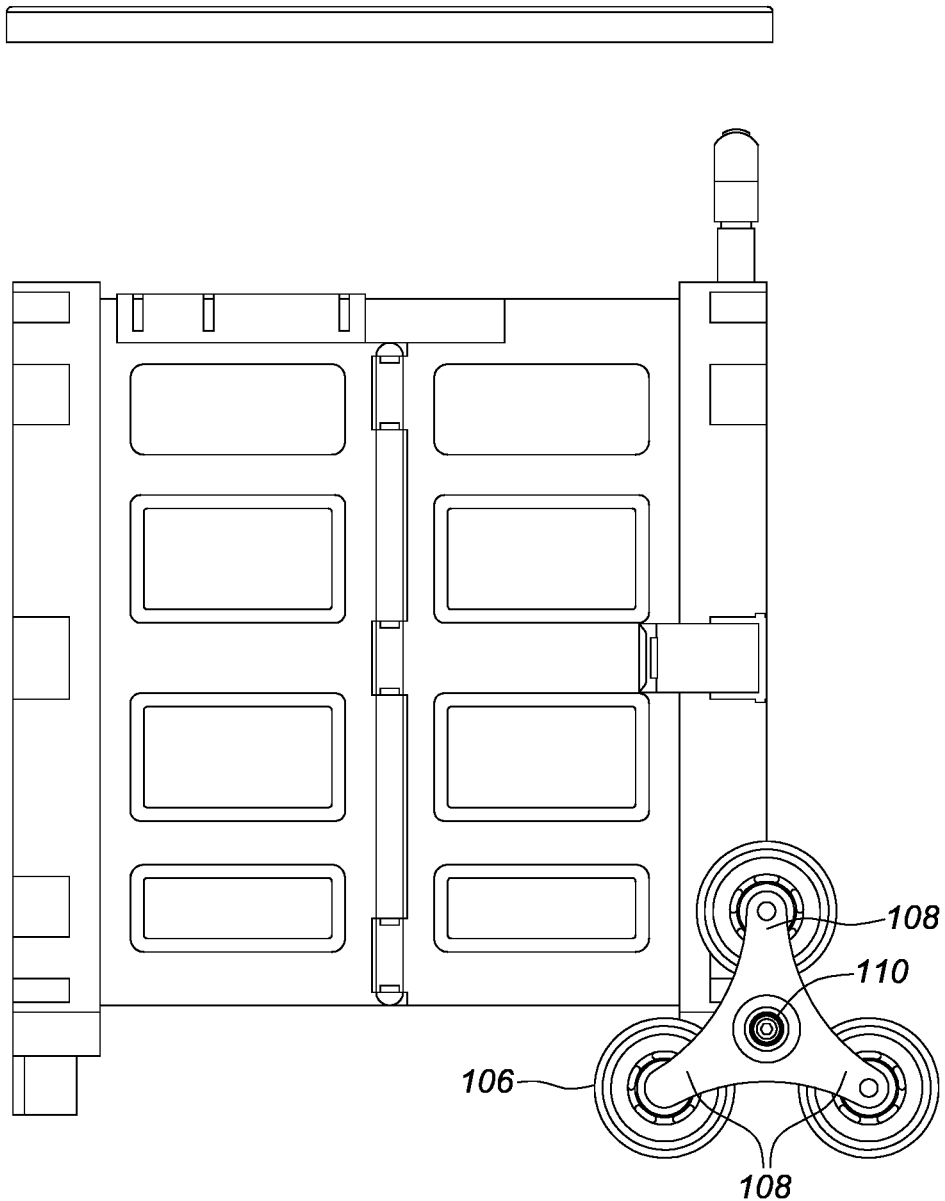
FIG. 12 is a left-side view of the collapsible cart of FIG. 10, according to an embodiment.
Figure 13:
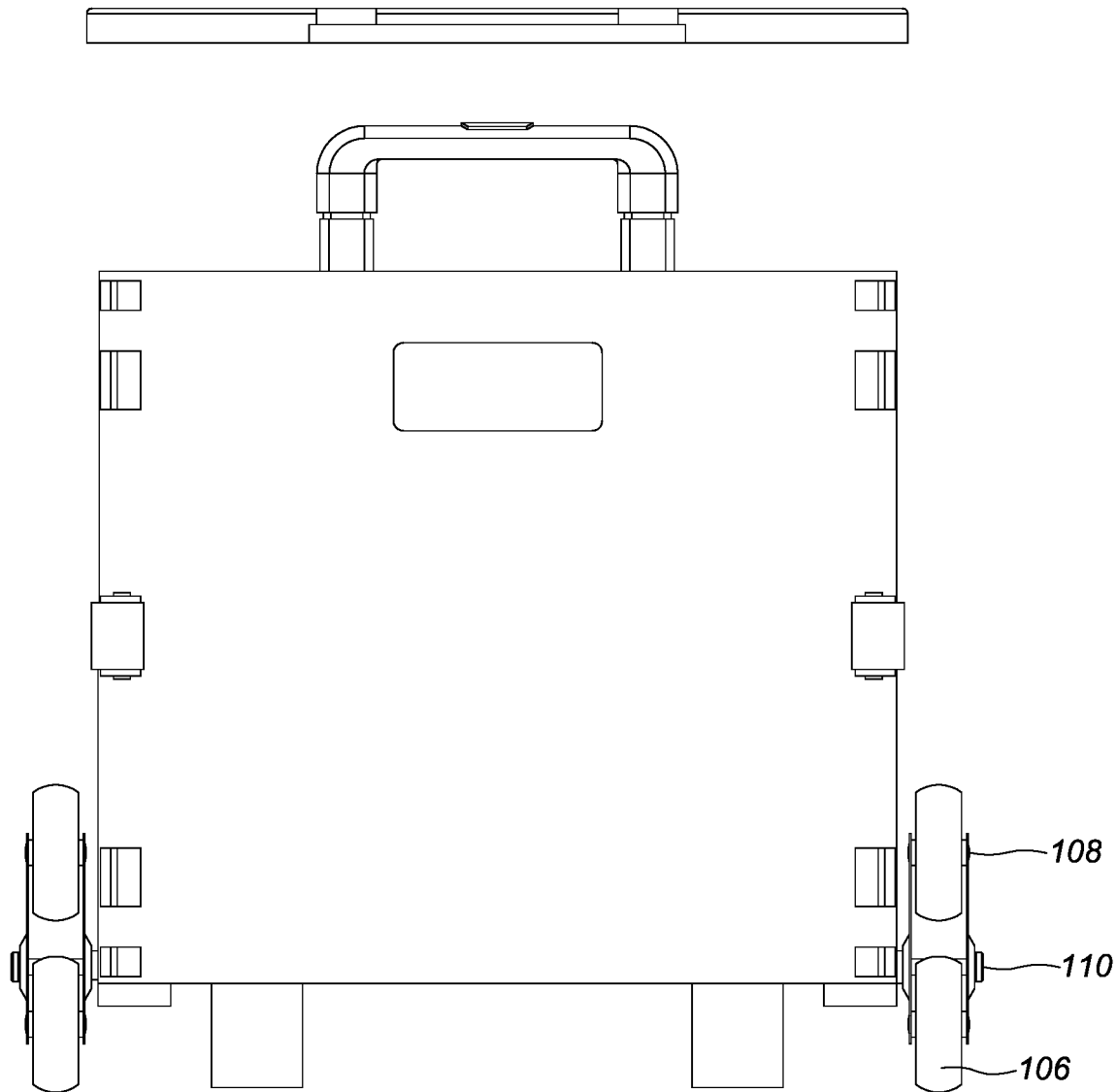
FIG. 13 is a front plan view of the collapsible cart of FIG. 10, according to an embodiment.
Figure 14:
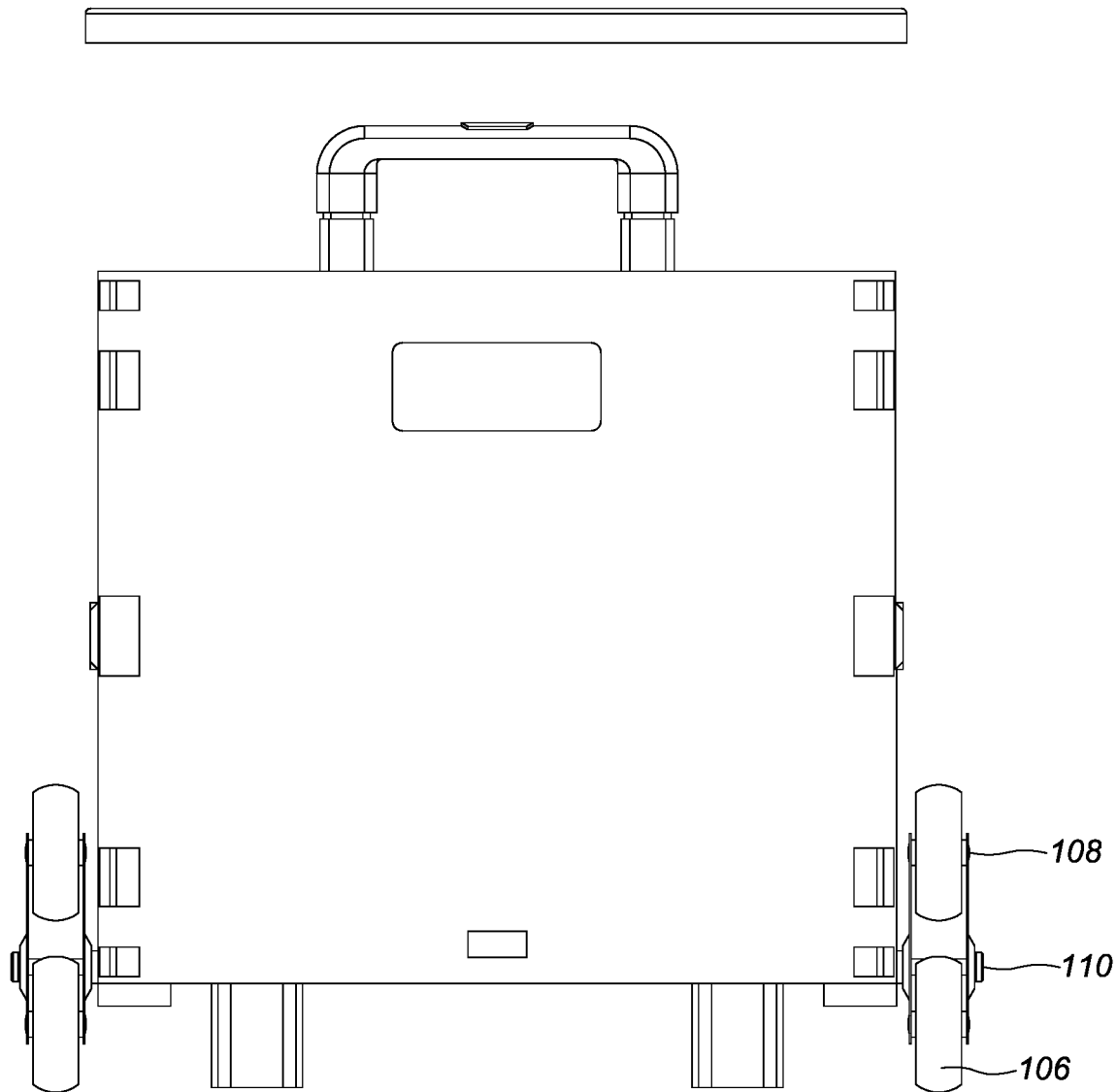
FIG. 14 is a rear plan view of the collapsible cart of FIG. 10, according to an embodiment.
Figure 15:
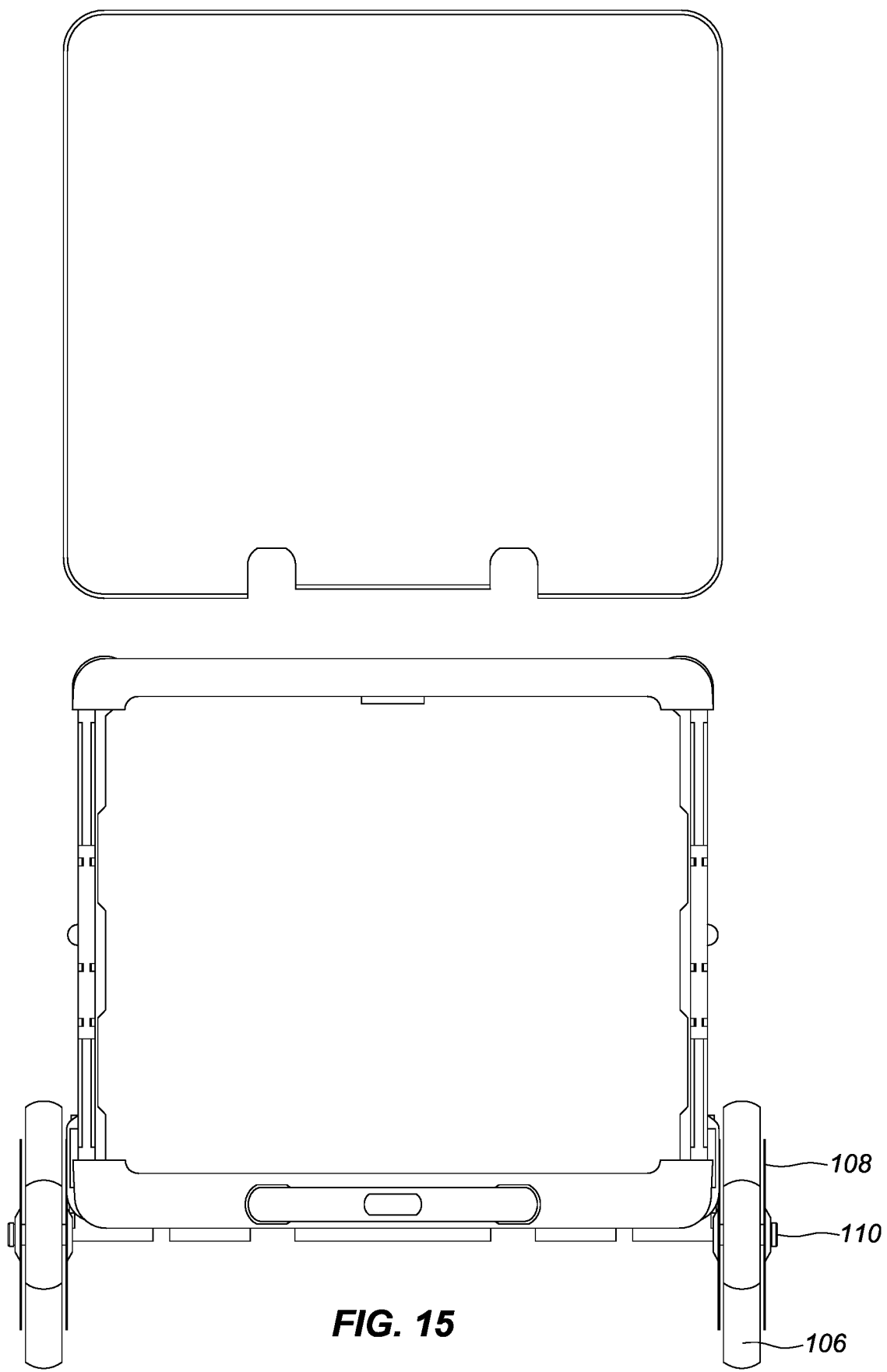
FIG. 15 is a top view of the collapsible cart of FIG. 10, according to an embodiment.
Figure 16:
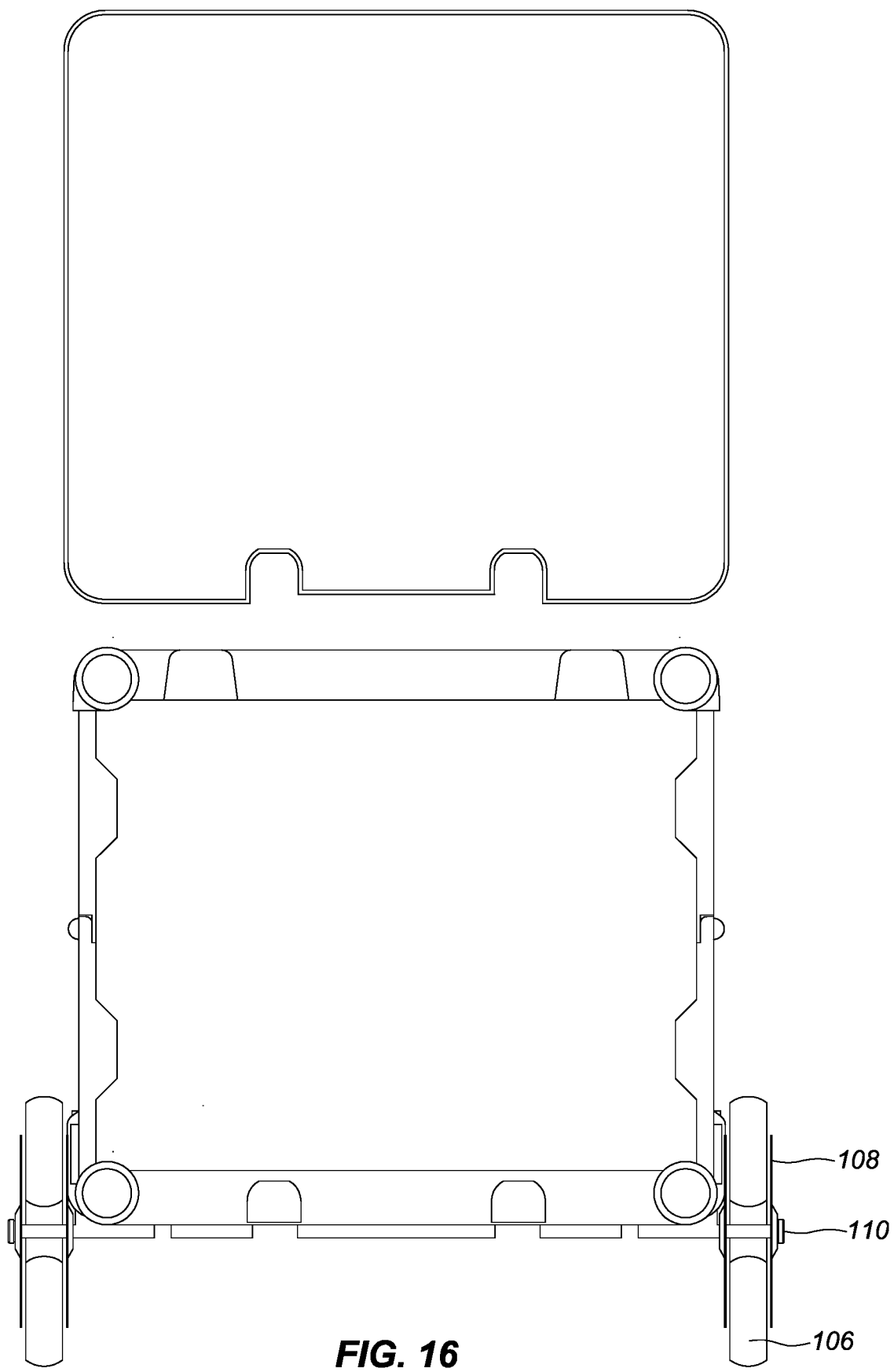
FIG. 16 is a bottom view of the collapsible cart of FIG. 10, according to an embodiment.
Figure 17:
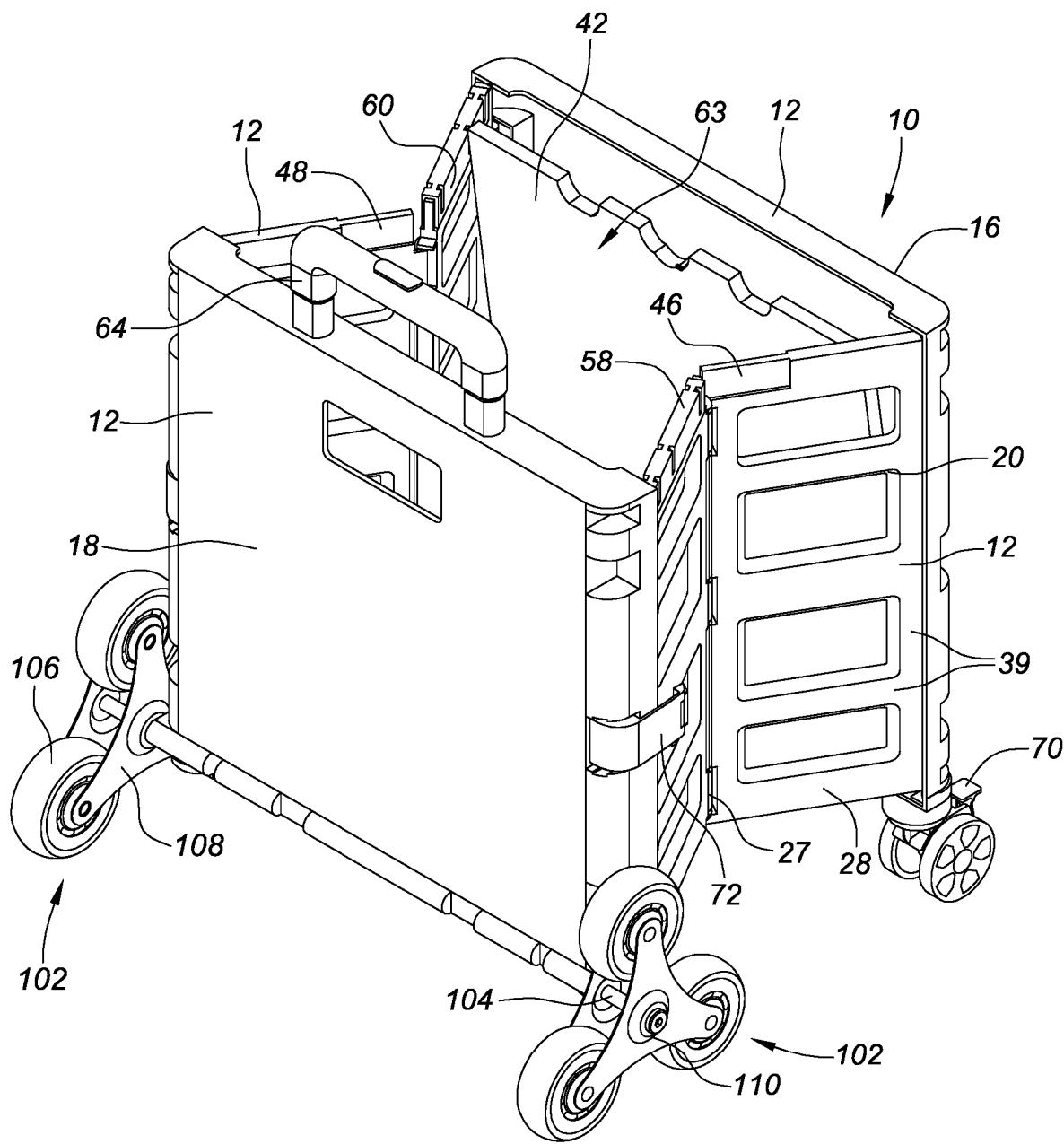
FIG. 17 is a perspective view of the collapsible cart of FIG. 10 illustrated with the sidewalls folded inwardly, according to an embodiment.
Figure 18:
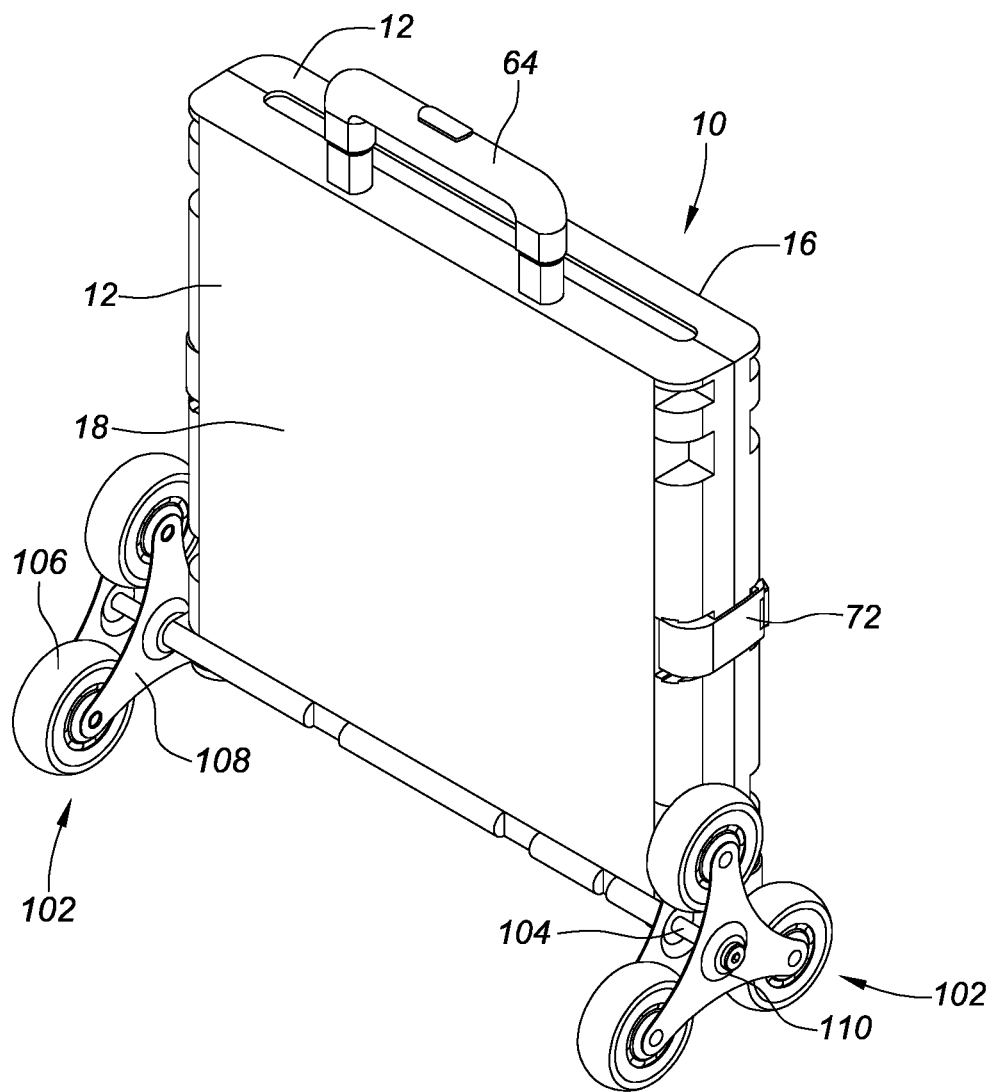
FIG. 18 is a perspective view of the collapsible cart of FIG. 10 illustrated in a closed condition, according to an embodiment.
Figure 19:
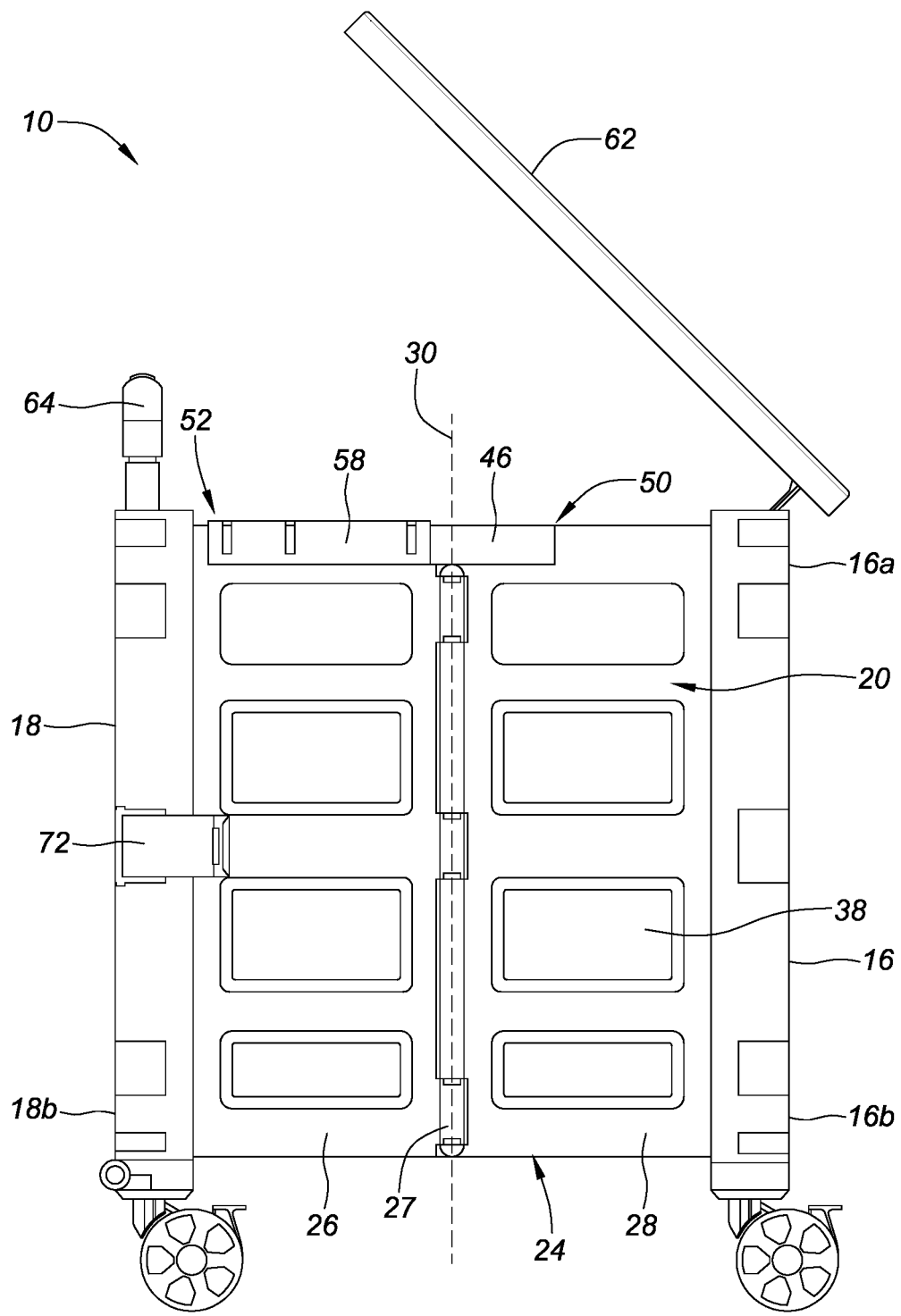
FIG. 19 is a right-side view of the collapsible cart similar to FIG. 1 illustrating another embodiment having the rigid cover panel pivoting in a first axis by a hinge mechanism that connects the cover panel to the front wall.
Figure 20:
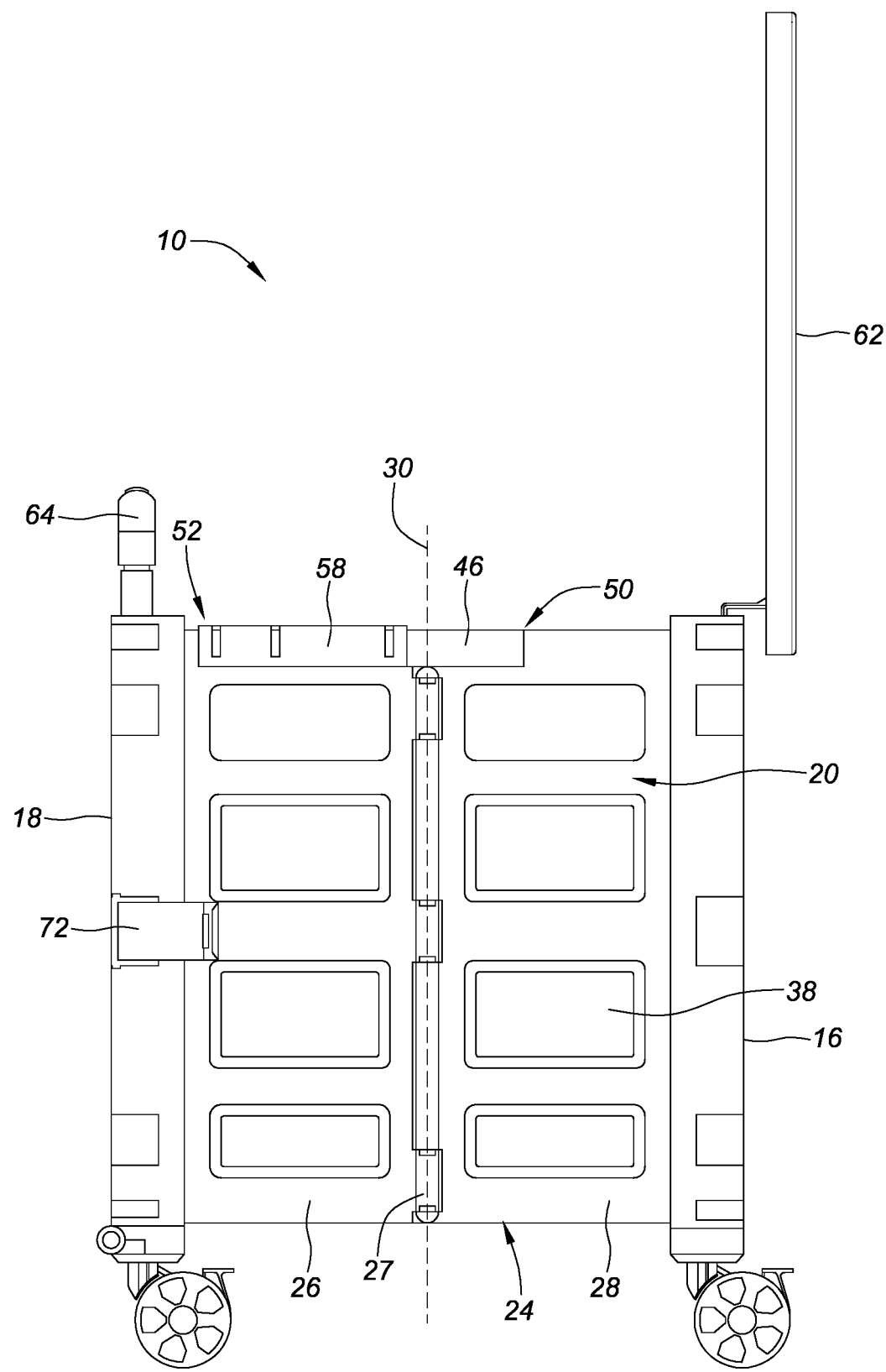
FIG. 20 is a view similar to FIG. 19 now showing the rigid cover panel in a vertical orientation.
Figure 21:
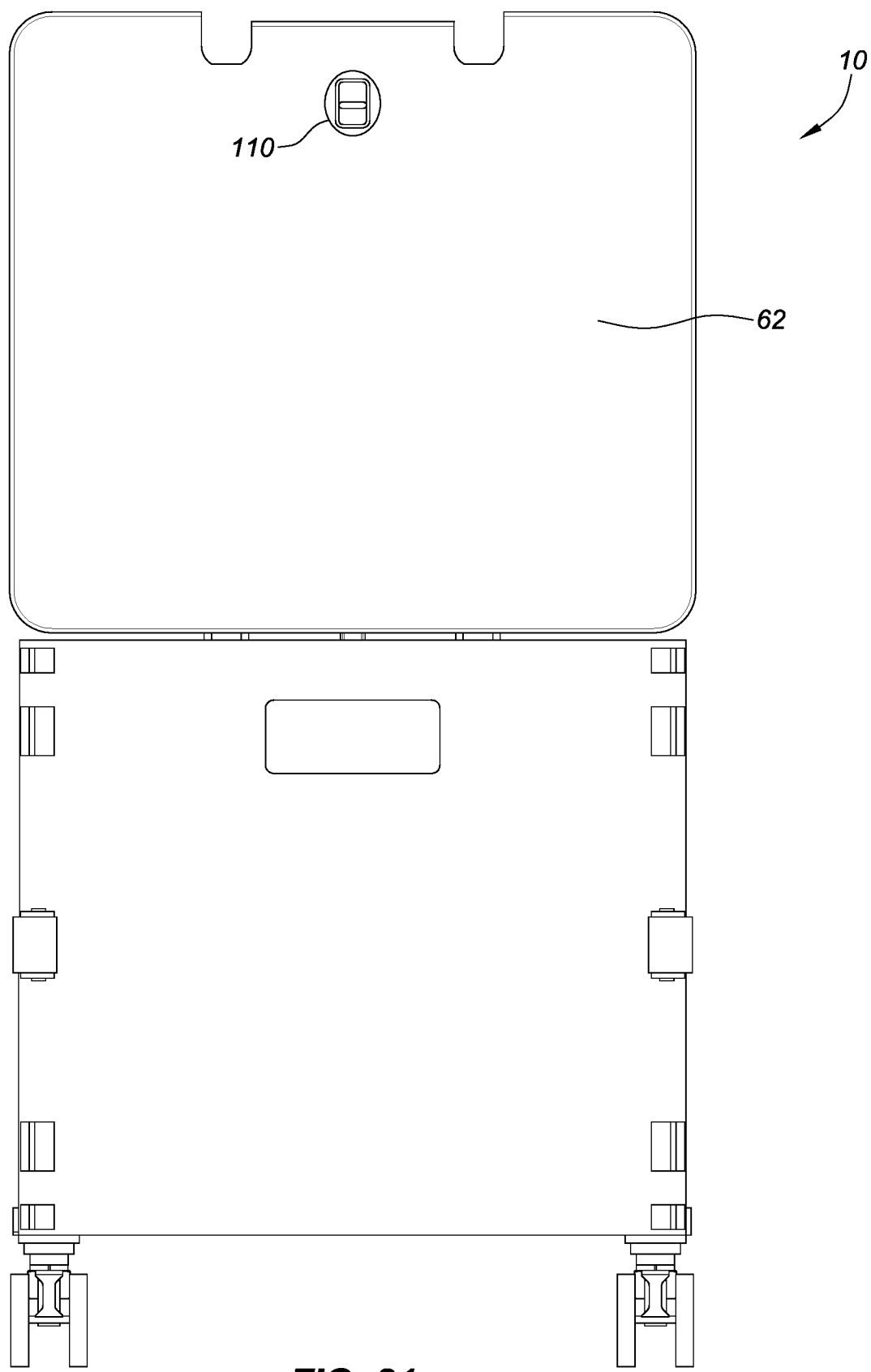
FIG. 21 is a front plan view of the structure of FIG. 19.
Figure 22:
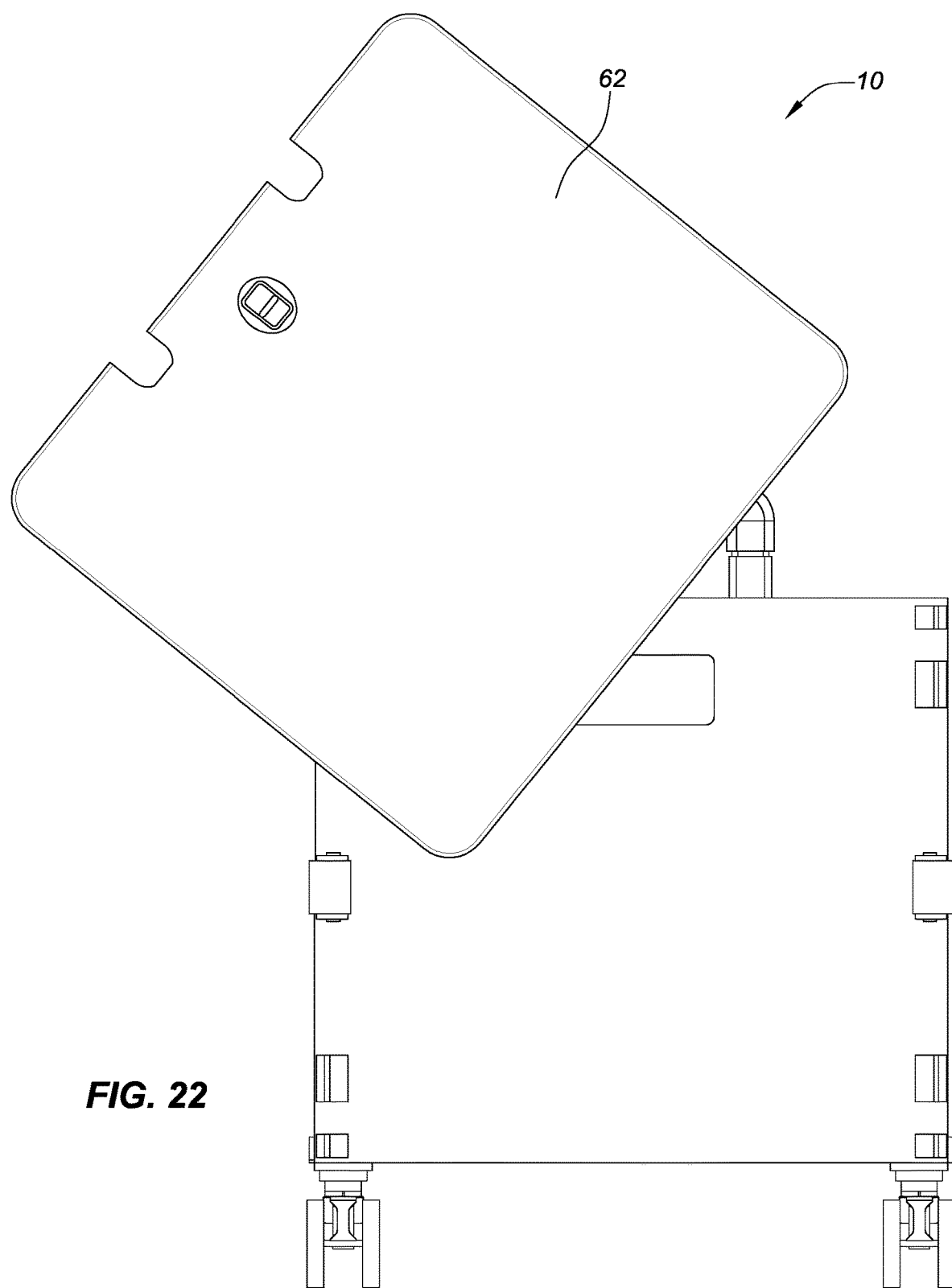
FIG. 22 is a view similar to FIG. 21 now showing the rigid cover panel rotating in a second axis.
Figure 23:
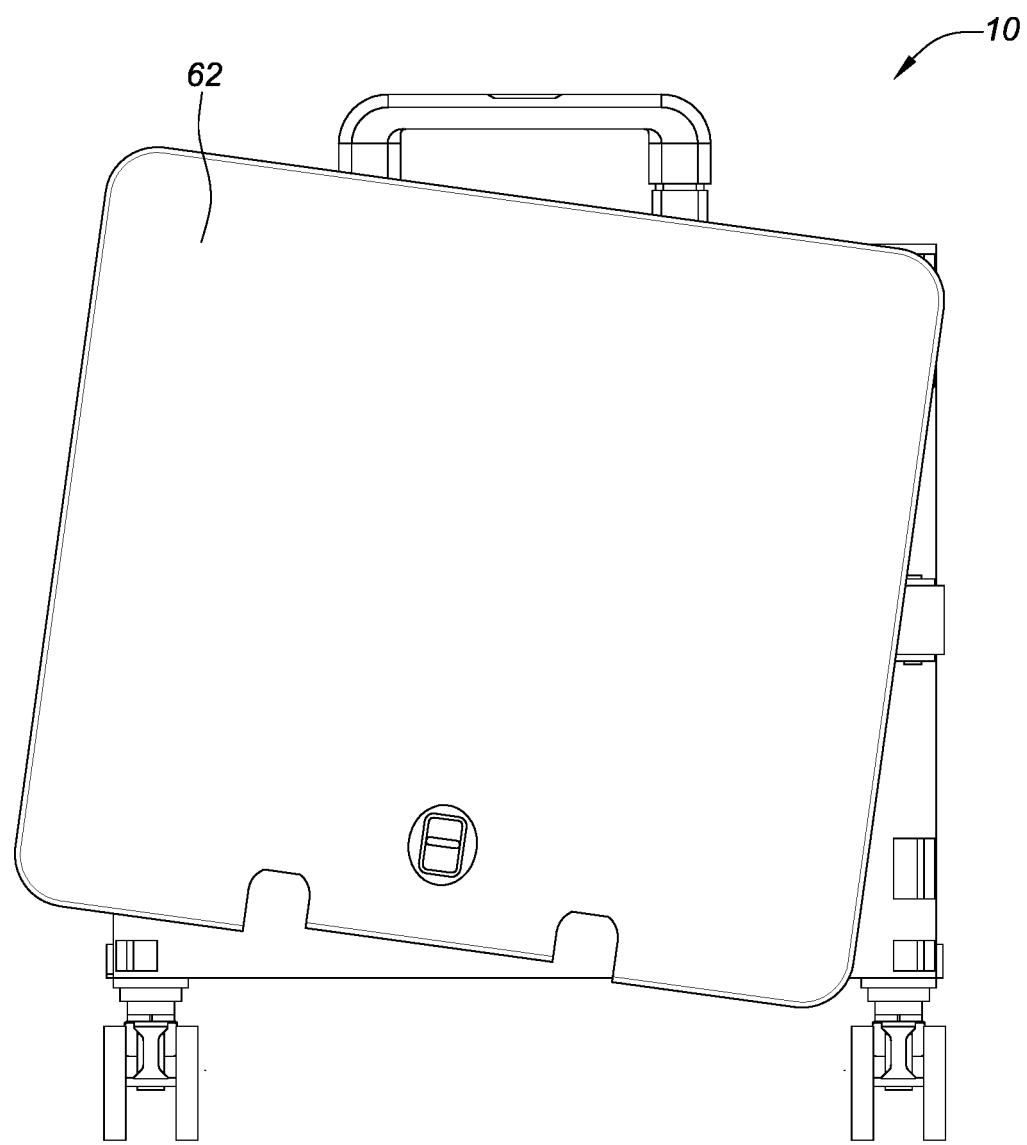
FIG. 23 is a view similar to FIG. 21 and FIG. 22 now showing the rigid cover panel further rotating in a second axis.
Figure 24:
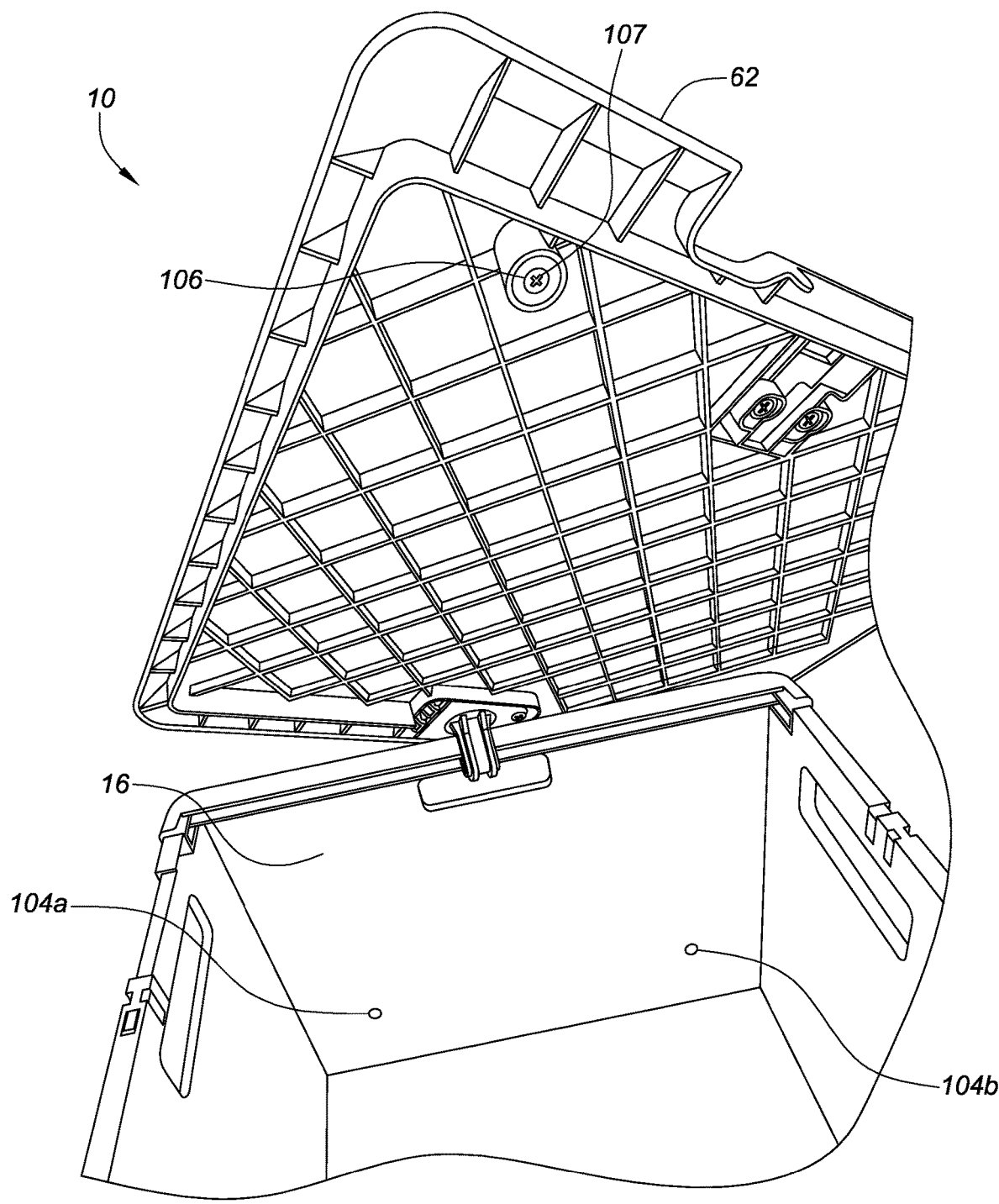
FIG. 24 is a perspective view showing the magnets and washers disposed inside the collapsible cart.
Figure 25:
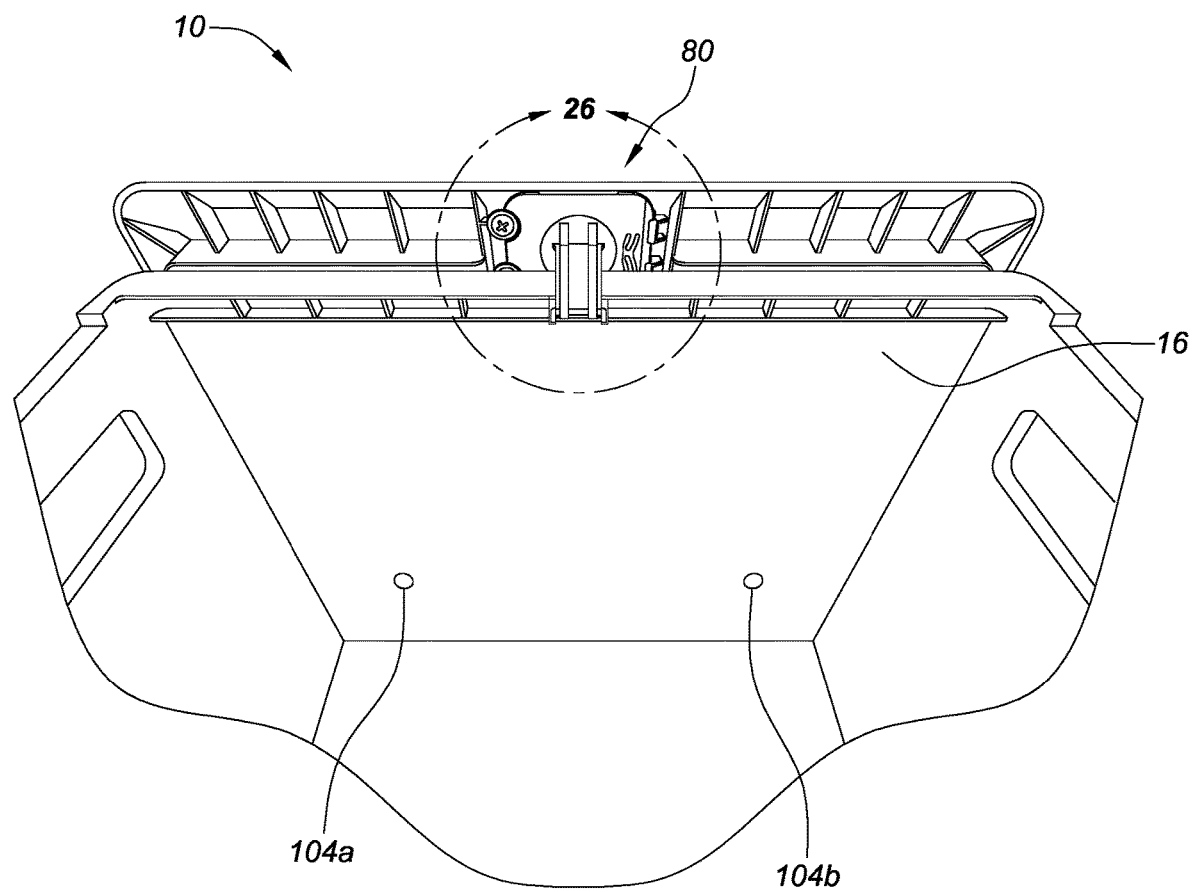
FIG. 25 is a perspective view showing the hinge mechanism of FIGS. 20-24.
Figure 26:
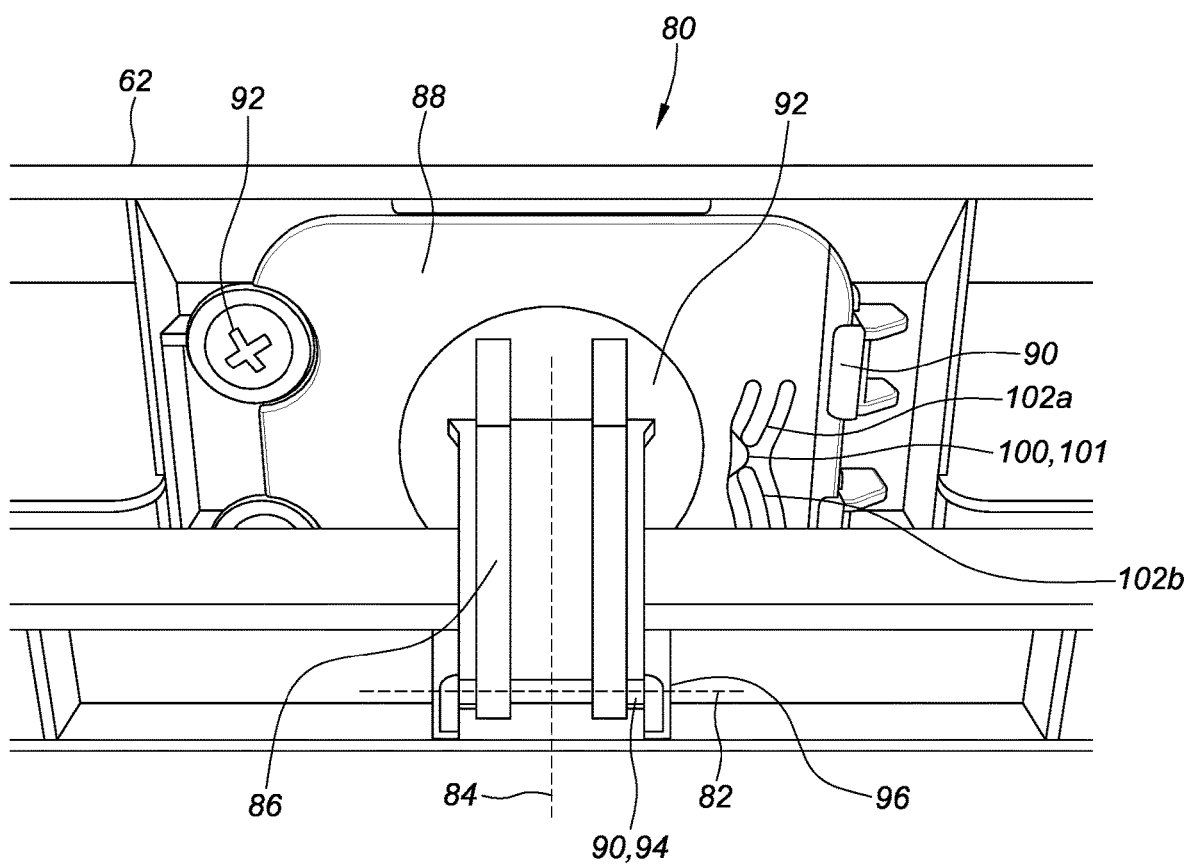
FIG. 26 is an enlarged view taken along line 26 of FIG. 25.

Unique and inventive collapsible carts are disclosed herein. Although embodiments of collapsible carts are disclosed herein, it is to be expressly understood that the present invention is not restricted solely to such embodiments. Rather, the present disclosure is directed to each of the inventive features described below, both individually as well as collectively, in various embodiments. Further, as will become apparent to those skilled in the art, one or more aspects of the present disclosure may be incorporated in other devices.

FIGS. 1-9 illustrate an embodiment of a collapsible cart 10 with swivel wheels, according to an embodiment. The collapsible cart 10 may include a rigid frame 12 forming a compartment 14. The rigid frame 12 may a front wall 16, a rear wall 18, a right sidewall 20, a left sidewall 22, and a bottom wall 24. The right sidewall 20 may include a first right panel 26 and a second right panel 28. The first right panel 26 may be coupled with a first hinge 27 to the second right panel 28 along a first vertical axis 30. The left sidewall 22 may include a first left panel 32 and a second left panel 34. The first left panel 32 may be coupled with a second hinge 33 to the second left panel 34 along a second vertical axis 36.

As can be appreciated, the first right panel 26, the second right panel 28, the first left panel 32 and the second left panel 34 may be formed of molded rigid plastic. In one embodiment, the first right panel 26, the second right panel 28, the first left panel 32 and the second left panel 34 may each be a solid panel member. In another embodiment, the first right panel 26, the second right panel 28, the first left panel 32 and the second left panel 34 may each be configured in a frame structure with a plurality of apertures 38 positioned between vertical and horizontal rigid members 39. Artisans would appreciate that this configuration allows for light-weight construction of the sidewalls 20 and 22.

In one embodiment, the collapsible cart 10 may include a rotatable base panel 40 (shown in FIGS. 6 and 8) rotatably coupled to the bottom wall 24 within the compartment 14. The rotatable base panel 40 may include a lower surface 42 (shown FIG. 8) and an upper surface 44 (shown FIG. 6). As can be appreciated, when in use, the rotatable base panel 40 may be rotated so that its lower surface rests against an interior surface of the bottom wall 24.

In another embodiment, the collapsible cart 10 may include a first track 46 and a second track 48. The first track 46 may extend across the first vertical axis 30 from a first position 50 on the first right panel 26 to a second position 52 on the second right panel 28. The second track 48 may extend across the second vertical axis 36 from a first position 54 on the first left panel 32 to a second position 56 on the second left panel 34.

The collapsible cart 10 may also include a first slideable member 58 and a second slideable member 60. The first slideable member 58 may cooperatively engage the first track 46 and may be movable between an open position to a closed position to selectively secure or lock the first right panel 26 to the second right panel 28 (shown in FIG. 2). As can be appreciated, the first slideable member 58 is in the open position when adjacent the first position 50 of the first track 46 and is in the closed position when adjacent the second position 52 of the first track 46. Similarly, the second slideable member 60 may be cooperatively engage the second track 48 and may be movable between an open position to a closed position to selectively secure or lock the first left panel 32 to the second left panel 34. As can be appreciated, the second slideable member 60 is in the open position when adjacent the first position 54 of the second track 48 and is in the closed position when adjacent the second position 56 of the second track 48. In another embodiment, the collapsible cart 10 may include one only one slideable member on either one of the sidewalls 20 or 22. Alternatively, the collapsible cart 10 may include a plurality of slideable members for each sidewall 20 and 22.

In one embodiment, the collapsible cart 10 may include a rigid cover panel 62 and a retractable handle 64. The rigid cover panel 62 may be formed of a molded plastic with a ribbed pattern for increased rigidity. The rigid cover panel 62 may be configured to conform in shape and fit snugly to a top opening 63 of the compartment 14. The rigid cover panel 62 may securely fit in a first position over the top opening 63 to serve as a cover or seat on top of the collapsible cart 10. The rigid cover panel 62 may include one or more protrusions on a bottom surface to removably secure to the front wall 16 of the collapsible cart 10. Meanwhile, the retractable handle 64 may be positioned adjacent the back wall 12.

As shown in FIGS. 1-9, the collapsible cart 10 may include a plurality of rotatable swivel wheels 66 coupled to the bottom wall 24 of the collapsible cart 10. The rotatable swivel wheels 66 may include at least one-wheel locking assembly 68 having a first condition for locking at least one of the rotatable swivel wheels to prevent rolling movement, and a second condition for unlocking the at least one of the rotatable swivel wheels. As can be appreciated, the at least one-wheel locking assembly may include a brake actuator pedal 70.

FIGS. 10-18 illustrate an embodiment of a collapsible cart 100 with a pair of three-wheel assemblies 102, according to an embodiment. The collapsible cart 100 may include a spindle 104 rotatably coupled to the bottom wall 24 and adjacent an intersection of the bottom wall 24 and the rear wall 18. Each three-wheel assembly 102 may include three wheels 106, three spokes 108 and a central rotational point 110. As can be appreciated, each wheel 106 may be rotatably coupled to one of the three spokes 108, and each spoke 108 may be connected to the central rotational point 110 coupled to the spindle 104.

As can be appreciated, the collapsible cart 10 may be fabricated with a light-weight material, such as plastic. In one embodiment, one or more of the walls 16, 18, 20, 22 and 24 may be formed of a molded plastic with a ribbed pattern for increased rigidity.

In operation, the collapsible cart 10 and 100 is transitioned from a closed condition where it is folded up to an open position where it is expanded for use. In the closed condition (shown in FIGS. 9 and 18), a user may unlock clips 72 on the right side and left side to extend the right and left opposing sidewalls 20 and 22. In one embodiment, the user may need to insert his or hands in the compartment 14 to push out the sidewalls 20 and 22. As the sidewalls 20 and 22 are pushed outwards, the rotatable base panel 40 drops down such that its lower surface rests against the interior surface of the bottom wall 24, and stabilizes the cart by fitting tightly between the lower region of the two opposing sidewalls 20 and 22. The first slideable member 58 and the second slideable member 60 may then be moved along their respective tracks 46 and 48 and from their respective open position to their respective closed position to selectively secure the sidewall panels. As can be appreciated, the slideable members 58 and 60 may be used to hold the extended sidewalls 20 and 22 in place. The rigid cover panel 62, which may be secured to the front wall 16 for storage, may be unlatched and securely fit over the top opening 63 of the compartment 14 to serve as a cover or seat. The collapsible cart 10 or 100 may be used to transport heavy loads in this open condition or may be collapsed in reverse fashion to place in a closed condition for storage.

Figure 27:
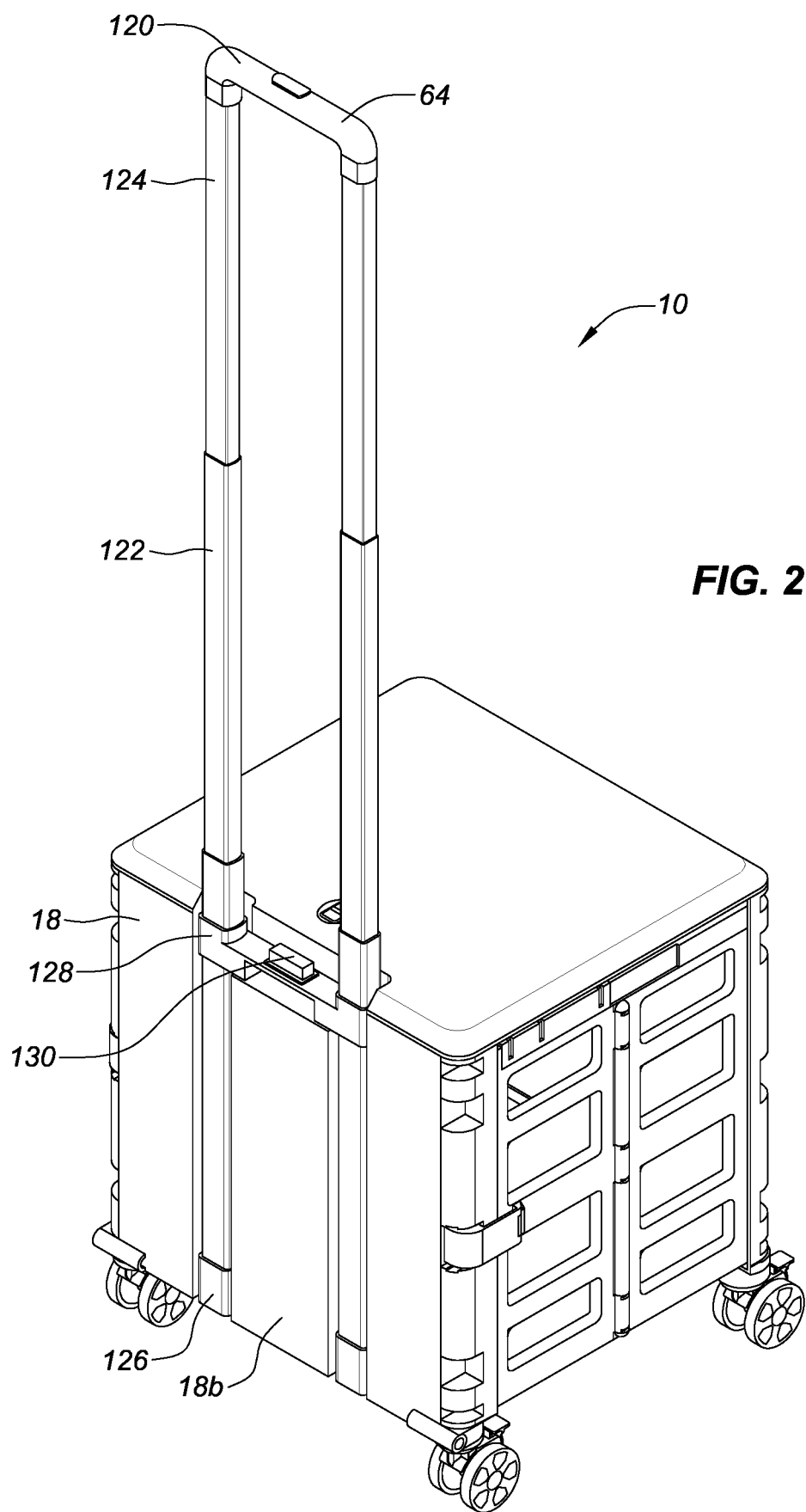
FIG. 27 is a perspective view of another embodiment of the collapsible cart now having a pivoting telescoping handle.
Figure 28:
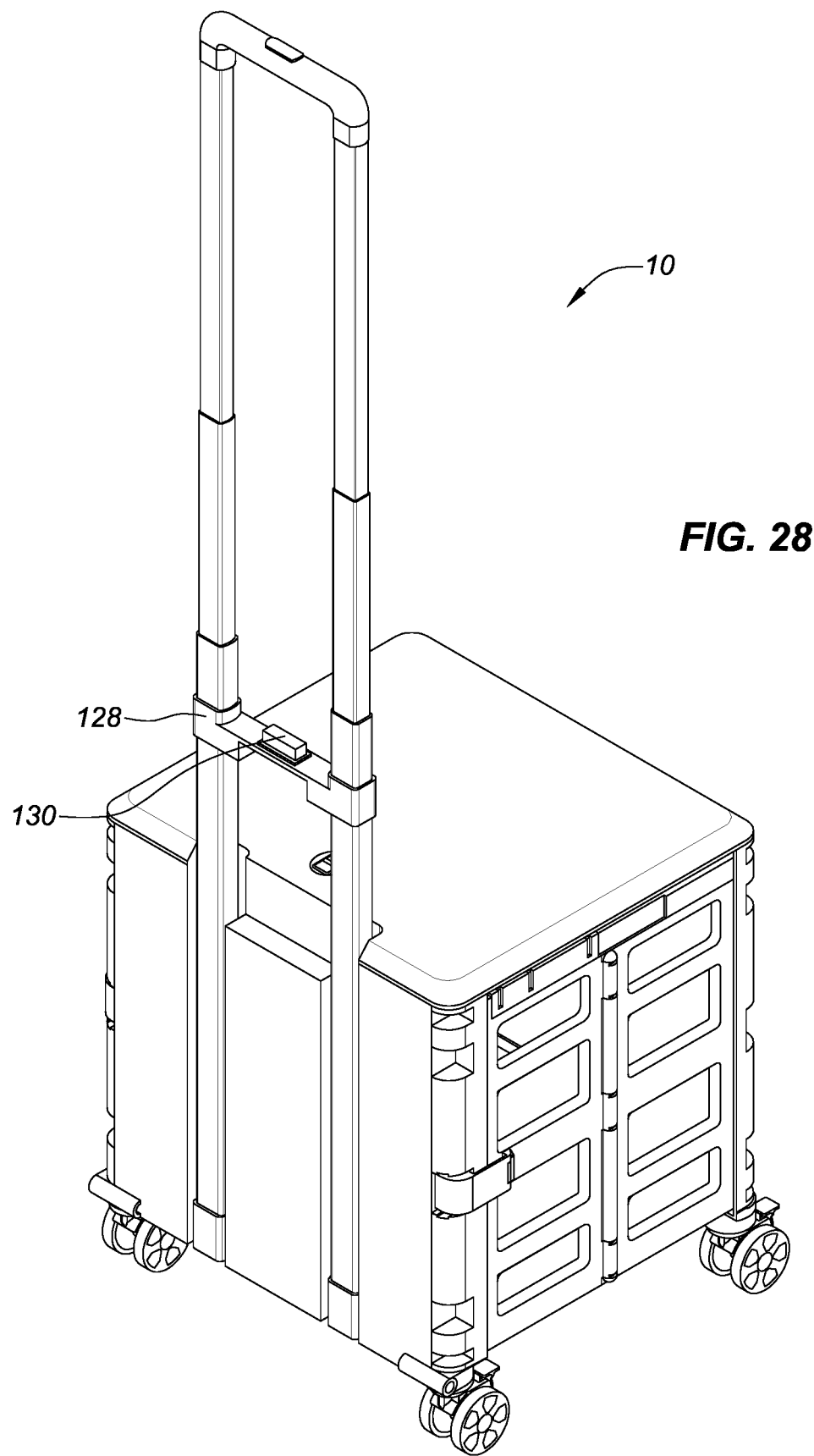
FIG. 28 is a view similar to FIG. 27 now showing a locking slide being moved upwards to unlock the telescoping handle relative to the rear wall of the cart.
Figure 29:
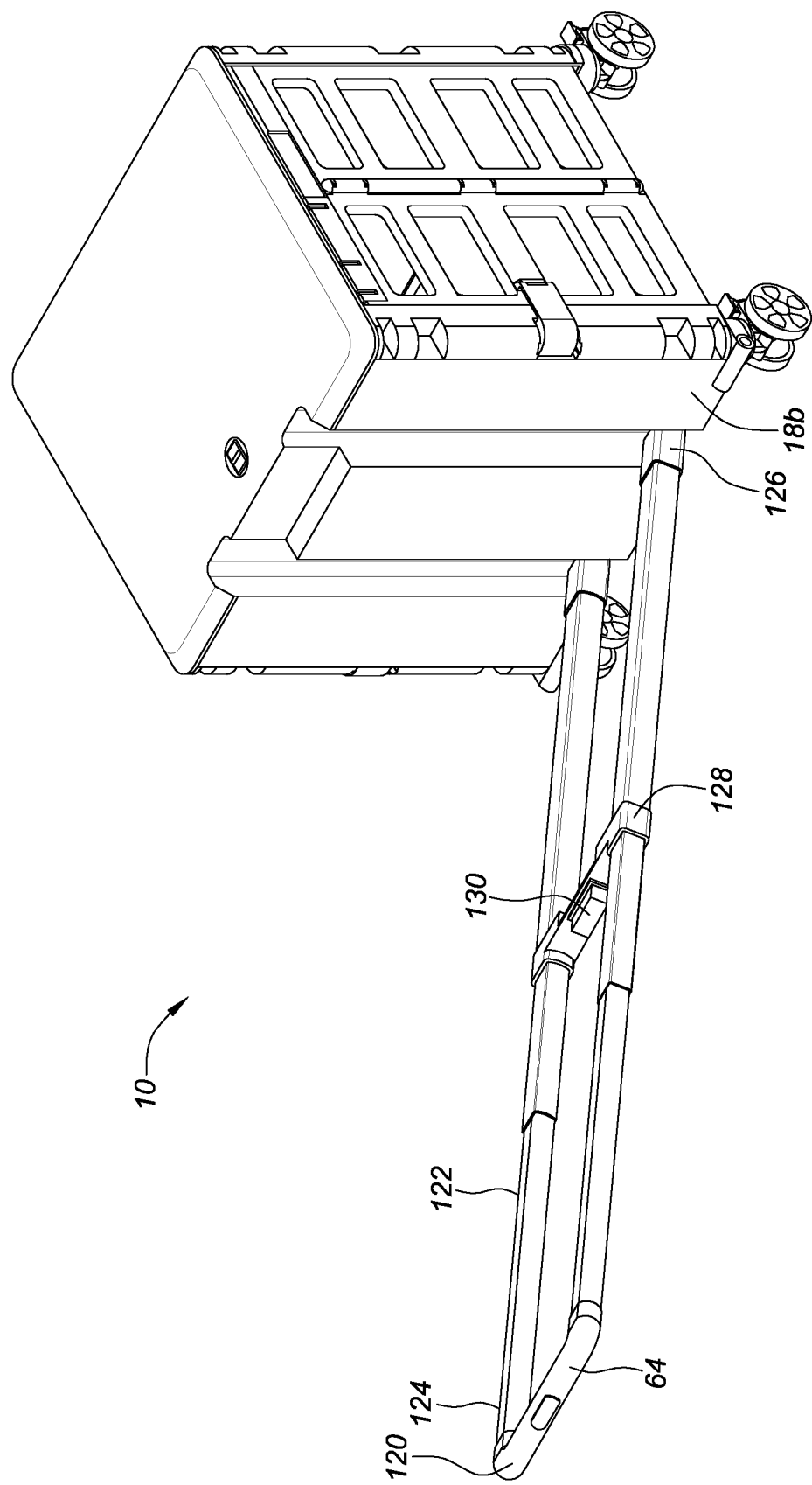
FIG. 29 is a perspective view of the structure of FIGS. 27-28 now showing how the telescoping handle can pivot at its proximal end for rolling the cart while allowing all four wheels to remain in contact with the ground.
Figure 30:
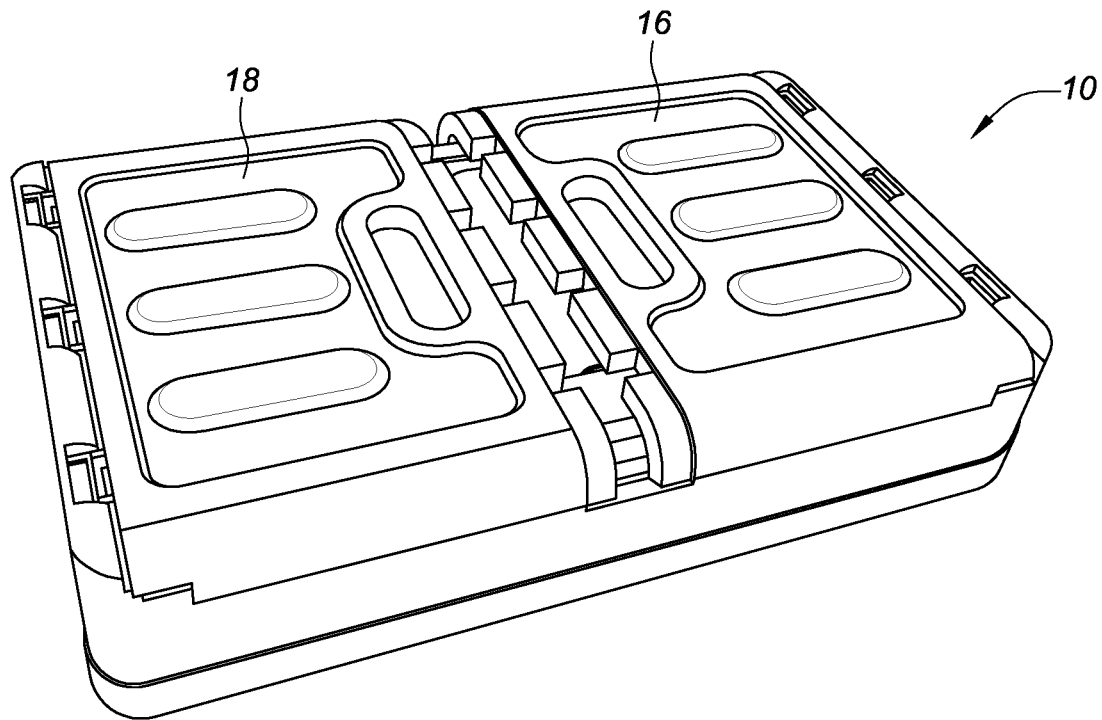
FIG. 30 is a perspective view of a collapsible cart illustrated in a closed condition, according to an embodiment.
Figure 31:
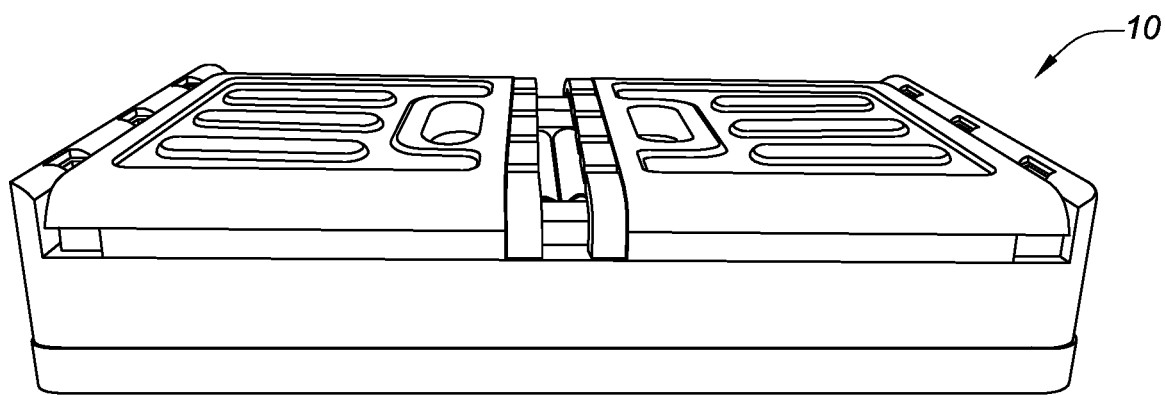
FIG. 31 is another perspective view of the collapsible cart of FIG. 30, according to an embodiment.
Figure 32:
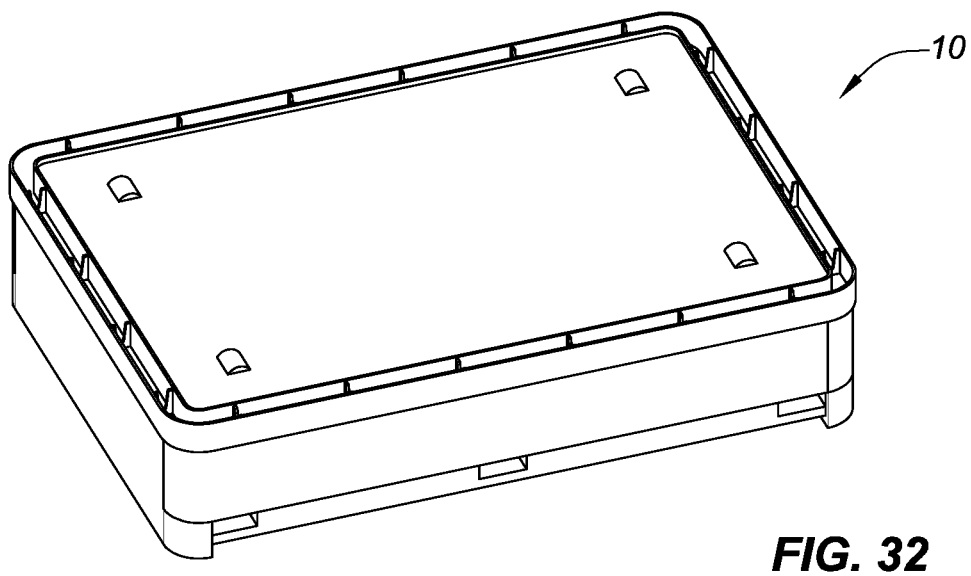
FIG. 32 is a perspective view of the collapsible cart of FIG. 30 having a cover panel stored and engaged to the underside of the collapsible cart, according to an embodiment.
Figure 33:
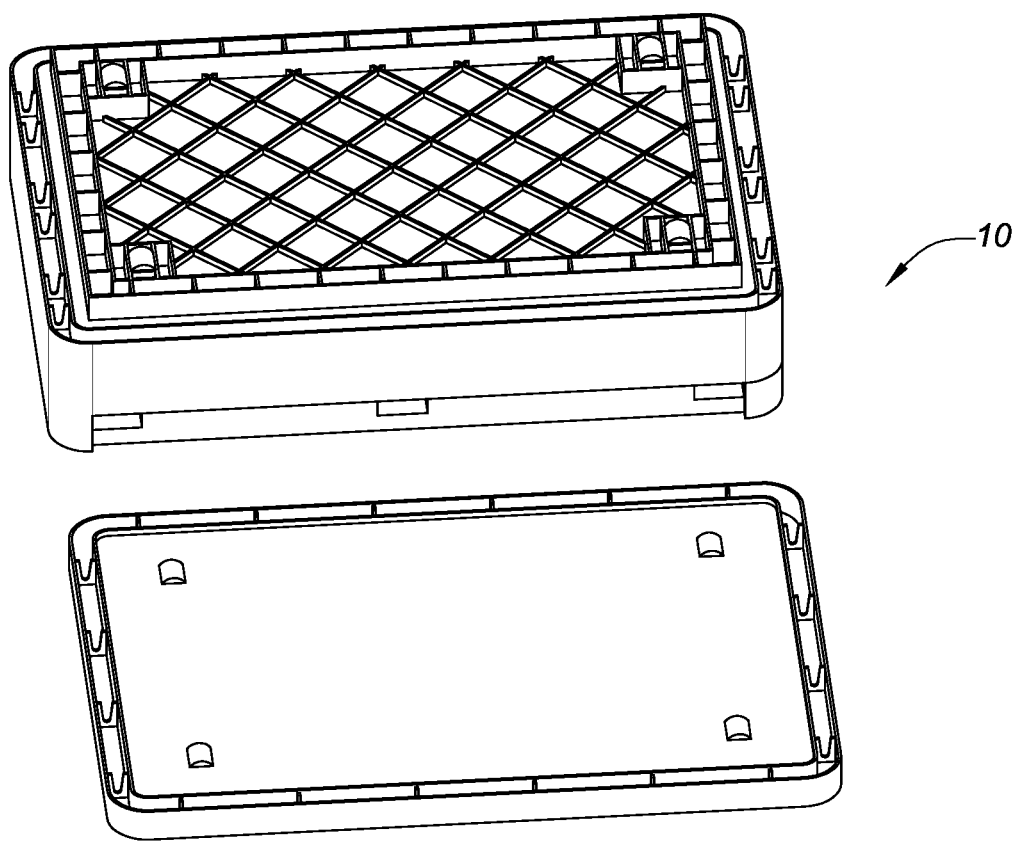
FIG. 33 is a view similar to FIG. 32 showing the cover panel removed from the underside of the collapsible cart of FIG. 30, according to an embodiment.
Figure 34:
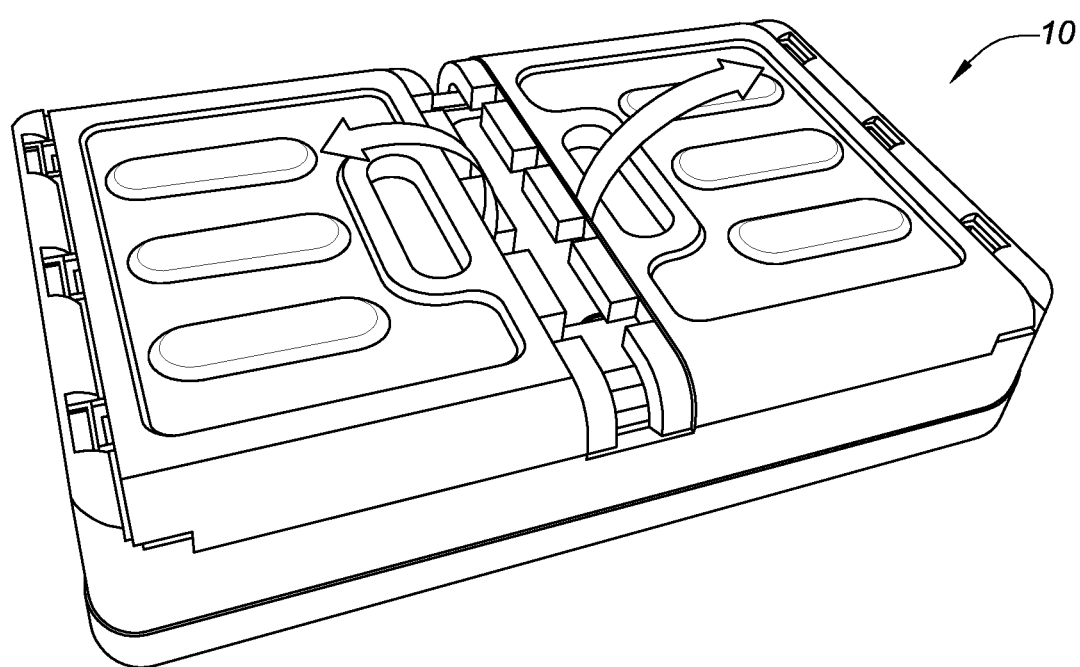
FIGS. 34-41 are perspective views of the collapsible cart of FIG. 30 illustrating the transition from a closed condition to an open condition, according to an embodiment.
Figure 35:
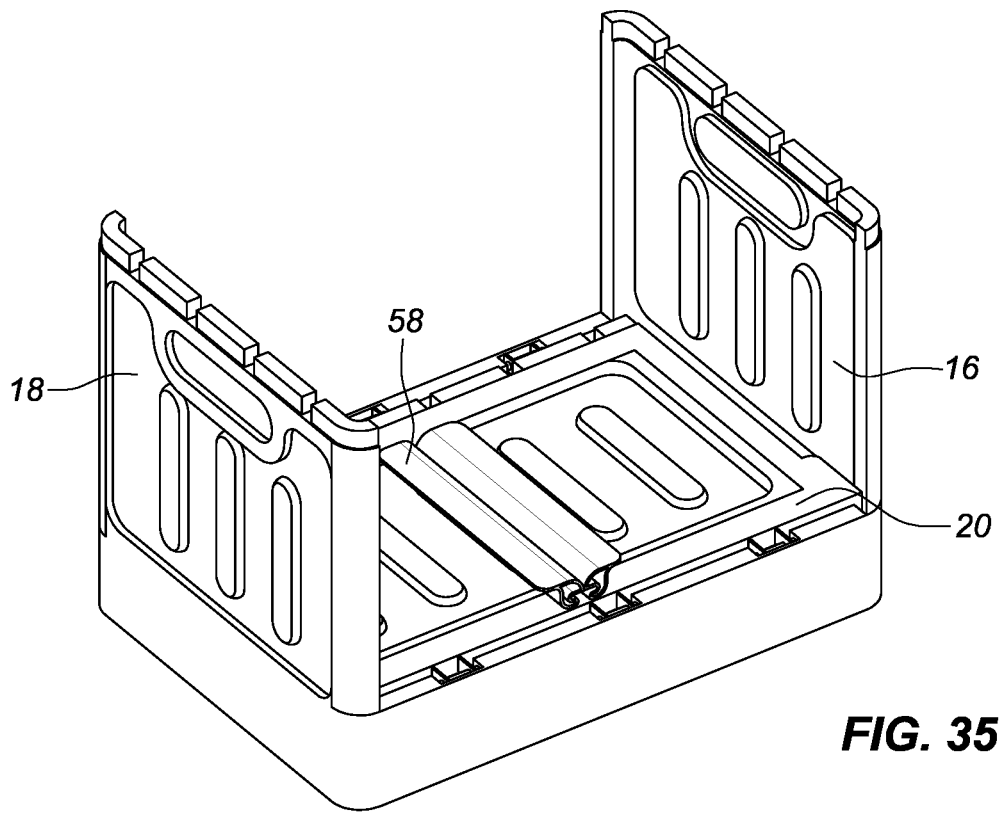
Figure 36:
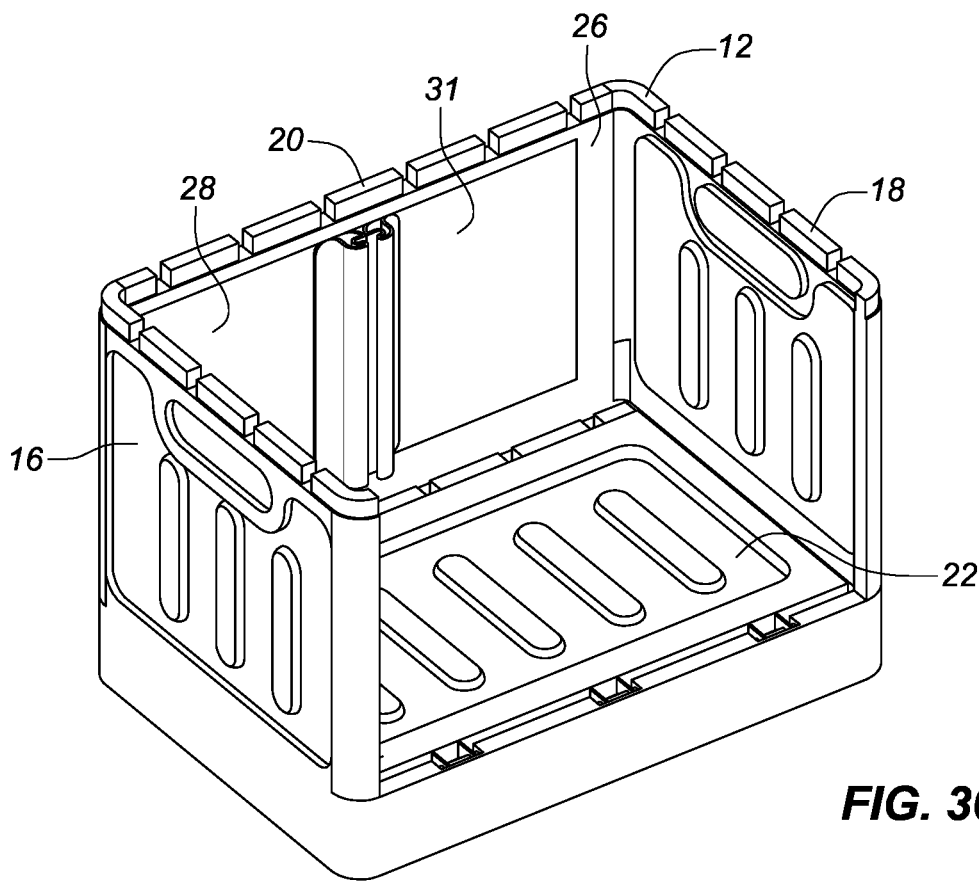
Figure 37:
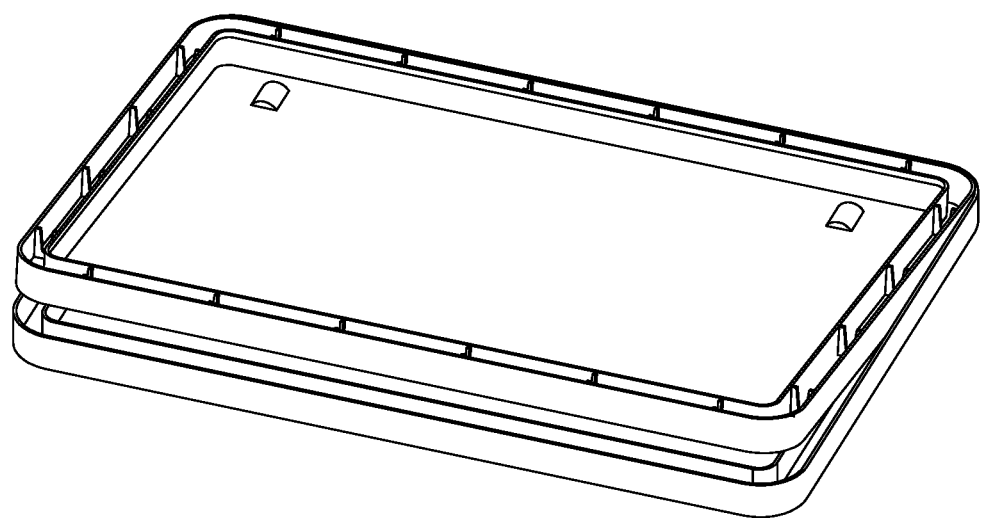
Figure 38:
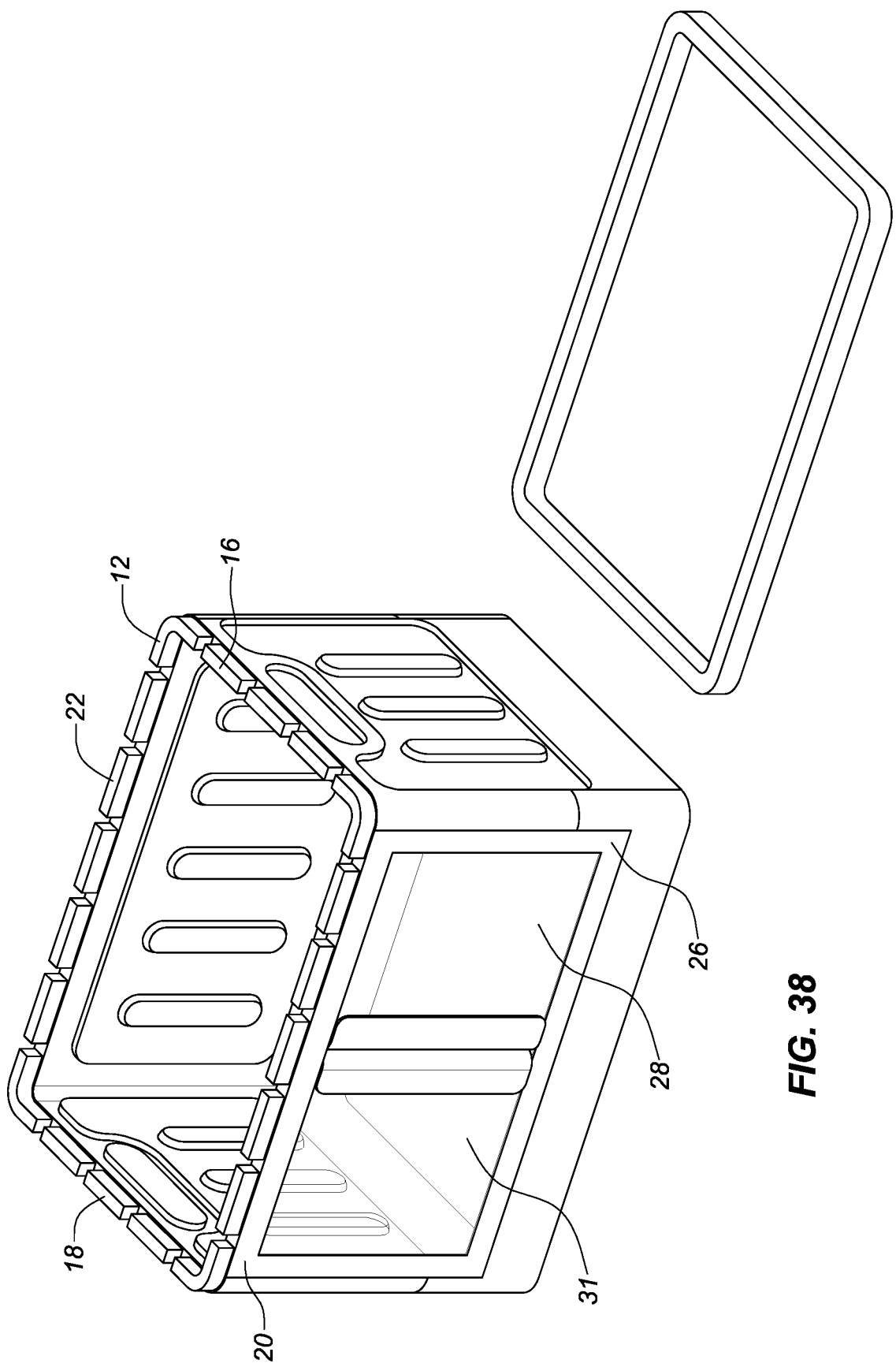
Figure 39:
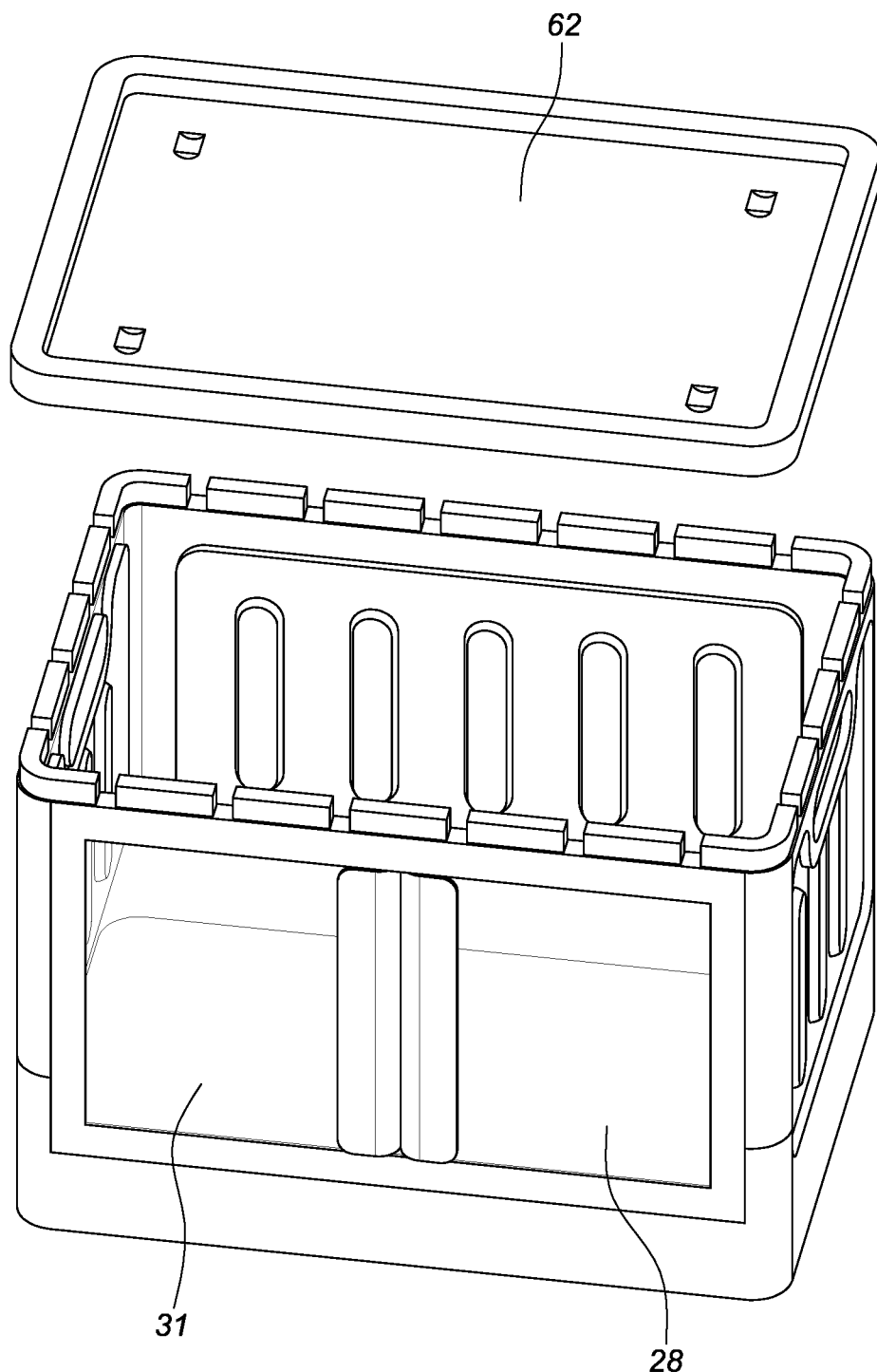
Figure 40:
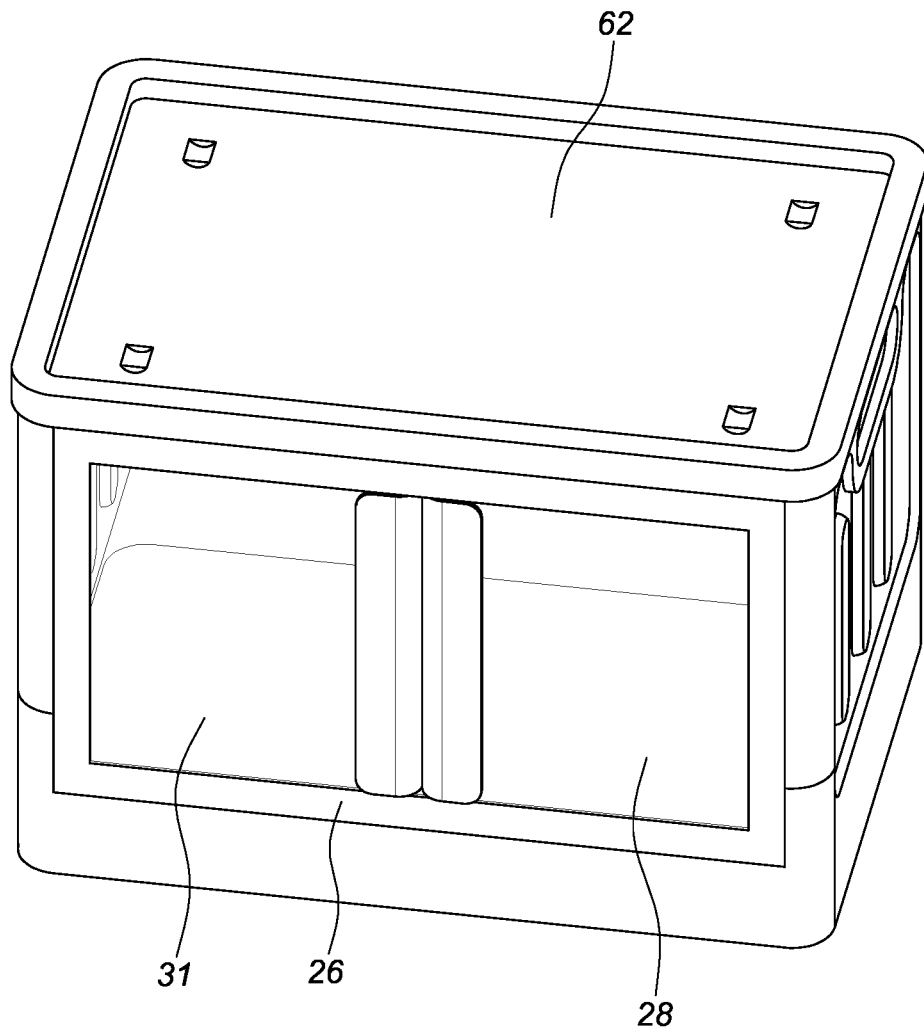
Figure 41:
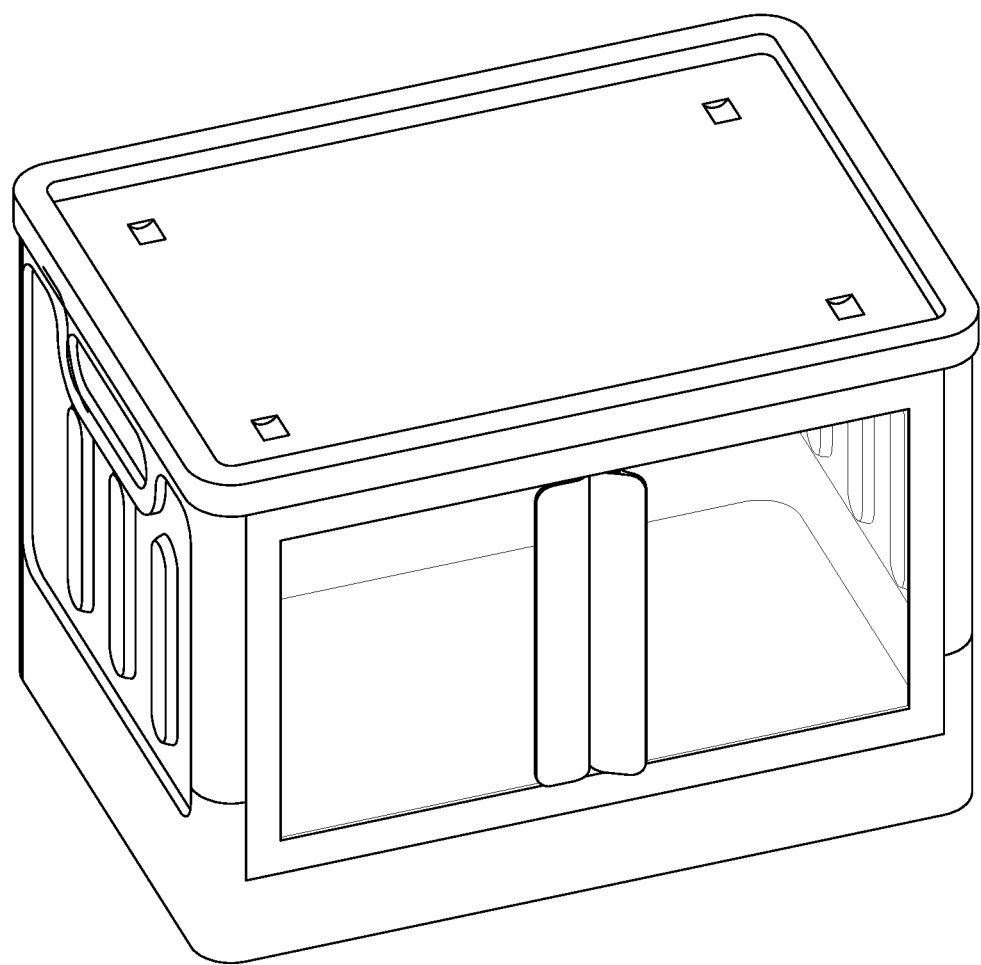
Figure 42A:
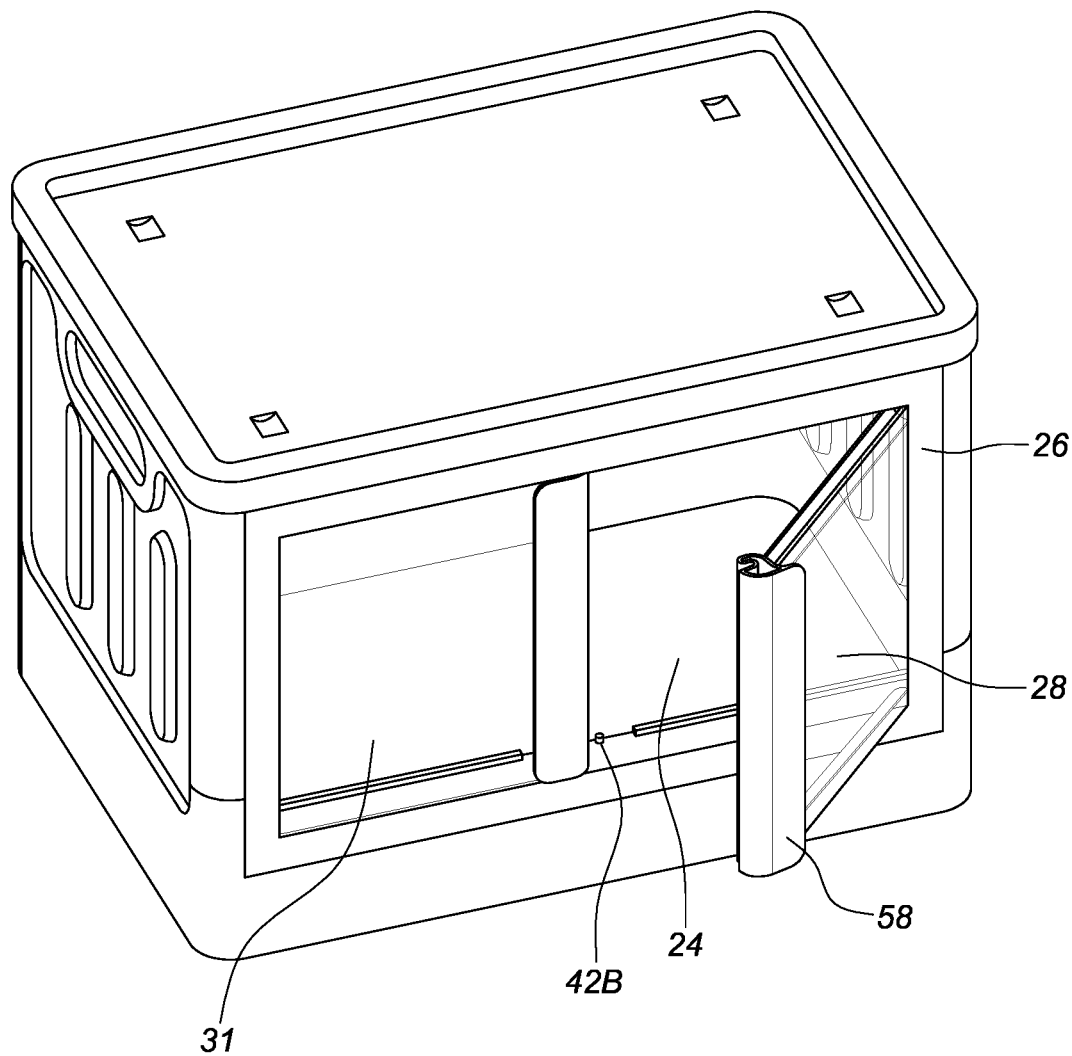
FIG. 42A is a perspective view of the collapsible cart of FIG. 30 illustrating a second right panel rotatably coupled to a first right panel, according to an embodiment.
Figure 42B:
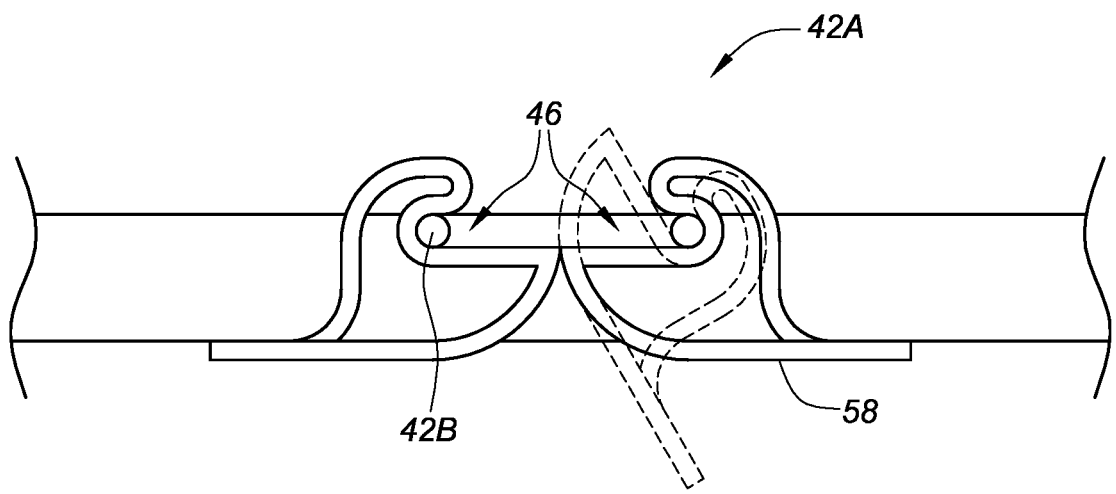
FIG. 42B is a cross-sectional view of a first slideable member for coupling the first right panel to the second right panel and a second slideable member for coupling the third right panel to the second right panel, according to an embodiment.
Figure 43:
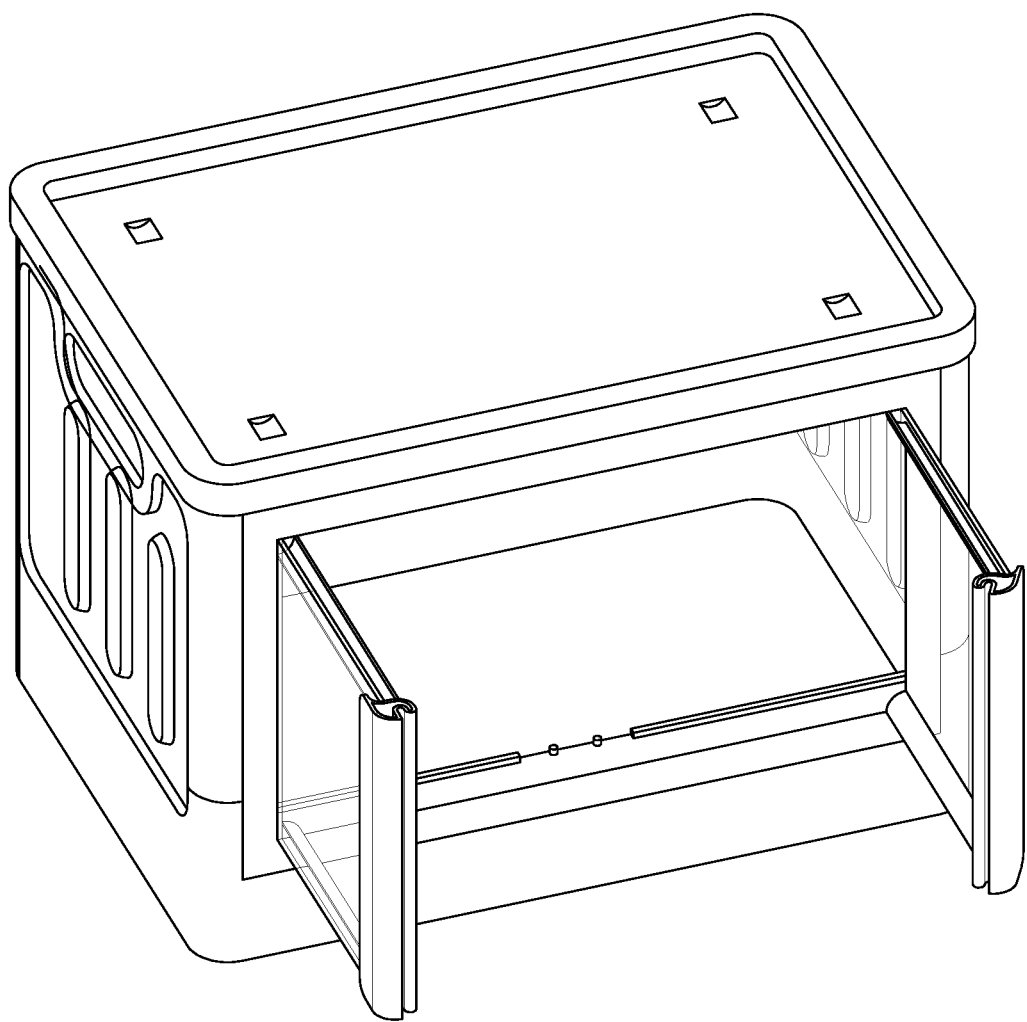
FIG. 43 is a perspective view of the collapsible cart of FIG. 30 illustrating a second right panel and a third right panel each rotatably coupled to a first right panel, according to an embodiment.

FIGS. 19-29 illustrate another embodiment of the present invention. The collapsible cart 10 is very similar to the previous embodiments already disclosed, such that common reference numbers are used herein. Similarly, the rigid frame 12 forms the compartment 14. The rigid frame 12 includes the front wall 16, the rear wall 18, the right sidewall 20, the left sidewall 22, and the base panel 40. The retractable handle mechanism 64 is disposed at, within or adjacent the back wall 18 as best shown in FIG. 27. The retractable handle mechanism 64 comprises a hand grip 120 attached to a telescoping assembly 122. The hand grip is attached at a distal end 124 of the telescoping assembly. The telescoping assembly 122 is pivotably attached at a proximal end 126 to the bottom 18b of the rear wall 18 as best seen in FIG. 28. As can be appreciated, there are a multitude of mechanisms and methods that may be used by those skilled in the art to create the pivot joint at the proximal end of the telescoping assembly, as this teaching is not to be limited to any one specific structure.

A locking slide 128 is translatable along at least a portion of the telescoping assembly 122. The locking slide 128 is a rigid structure that captures both of the telescoping tubes and helps secure them in parallel relationship. It is understood by those skilled in the art that just one telescoping tube could be used and as such the locking slide 128 would translate along this one telescoping tube.

In FIG. 27 the locking slide 128 is locking the telescoping assembly 122 to the rear wall 18 at a distance apart from the proximal end which is pivotable. Then, in FIG. 28, the locking slide 128 has moved upwards and no longer locks the telescoping assembly 122 to the rear wall 18.

The locking slide 128 may be configured to lock to the rear wall 18 securing the telescoping assembly 122 parallel to the rear wall 18. The locking slide 128 may also be configured to unlock from the rear wall 18 allowing the telescoping assembly 122 to pivot at an angle away from the rear wall 18, as shown in FIG. 28. A release button 130 may be used to lock and unlock the locking slide 128 from the rear wall 18. As shown in FIG. 28, the collapsible cart 10 can now be rolled with all four wheels remaining on the ground while still retaining the functionality of the cart as described in the previous embodiments.

It is also understood by those skilled in the art that the locking slide 128 could be replaced with a locking mechanism that either secures the telescoping assembly 122 to the rear wall 18 or allows the telescoping assembly 122 to pivot about the proximal end. In other words, in other embodiments, the locking slide 128 need not translate along the telescoping assembly 122 while still being able to lock and unlock the telescoping assembly 122 in relation to the rear wall 18.

FIGS. 30-44 illustrate another embodiment of the present invention. The collapsible cart 10 is very similar to the previous embodiments already disclosed, such that common reference numbers are used herein. Like the prior disclosed embodiments, the rigid frame 12 forms the compartment 14. The rigid frame 12 includes the front wall 16, the rear wall 18, the right sidewall 20, the left sidewall 22, and the bottom wall 24. In some embodiments, the right sidewall 20 and the left sidewall 22 may be configured to fold inwardly in the closed condition. The right sidewall 20 may include a first right panel 26 rotatably coupled to a second right panel 28.

The collapsible cart 10 may include a first track 46 formed along the first right panel 26 and the second right panel 28 extending from a first position on the first right panel 26 to a second position on the second right panel 28. The collapsible cart 10 may also include a first lock assembly 42A comprising a first slideable member 58 traversing the first track 46 and capable of cooperatively engaging with a peg 42B. In one embodiment, the first slideable member 58 is spring loaded to move the first slideable member 68 from an open condition to a closed condition to lock around the peg 42B. The first slideable member 58 may be movable along the first track 46 between an open position to a closed position to selectively lock the first right panel 26 to the second right panel 28. As can be appreciated, other lock assemblies may be employed to selectively lock and/or unlock the first right panel 26 to the second right panel 28.

In one embodiment, the second right panel 28 may be proportioned to fit within an opening in the first right panel 26. In some embodiments, the second right panel 28 may be configured to conform in shape to cover at least a portion of an opening in the first right panel 26. The first slideable member 58 may be in the open position when disposed along the first track 46 adjacent the first position of the first track 46 while not disposed along the second right panel 28 and may be in the closed position when disposed along the first track 46 adjacent the second position of the first track 46 while being disposed across both the first right panel 26 and second right panel 28.

Figure 44:
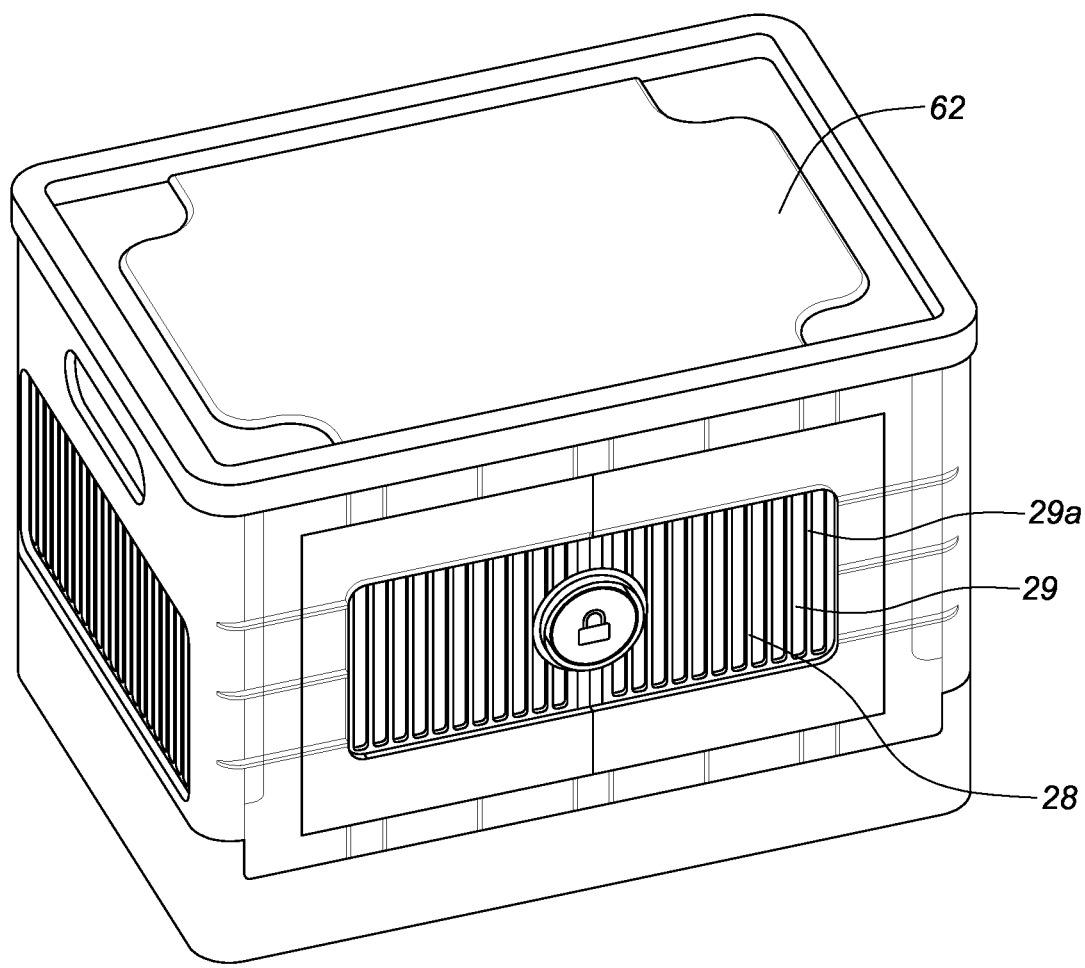
FIG. 44 is a perspective view of a collapsible cart with a lock mechanism illustrated in an open condition, according to an embodiment.
Figure 45:
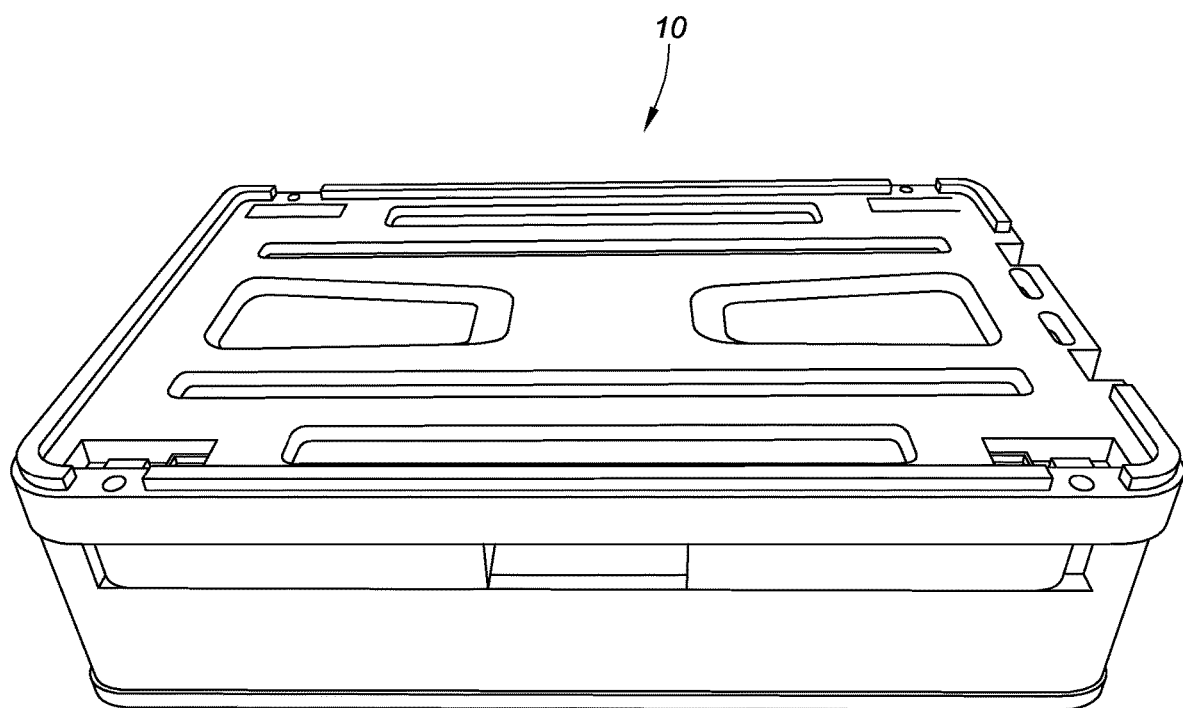
FIG. 45 is a perspective view of another collapsible cart illustrated in a closed condition and having a cover panel stored on the top of the collapsible cart, according to an embodiment.

As shown in FIG. 44, in some embodiments, the second right panel 28 may also include a ribbed wall 29 with a plurality of ribs 29a. The ribbed wall 29 may be disposed adjacent the first track 46 (not shown). In some embodiments, the plurality of ribs 29a may be aligned parallel to the first track 46 to distribute compressive stresses away from the first track 46. In other embodiments, the plurality of ribs 29a may be aligned vertically to withstand compressive forces applied to the right sidewall 20 from the weight of other objects resting on the top cover 62, such as other stackable collapsible carts 10.

In some embodiments, the collapsible cart 10 may also include a top cover 62 with at least one integrated lock assembly 65. The top cover 62 may be configured to conform in shape to a top opening of the compartment. In one embodiment, the top cover 62 securely fits in a first position over the top opening to serve as a cover or seat on top of the collapsible cart 10. The at least one lock assembly 65 may be configured to removably couple the top cover 62 to an interior surface of at least one of the front wall 16, the rear wall 18, the right sidewall 20, and the left sidewall 22.

As shown in FIGS. 35-43, in some embodiments, the right sidewall 20 may include a third right panel 31. In such embodiment, the second right panel 28 and the third right panel 31 may be configured to enclose half of the opening in the first right panel 26. In yet another embodiment, the second right panel 28 and the third right panel 31 may conform in shape to collectively cover the opening in the first right panel 26.

Figure 46:
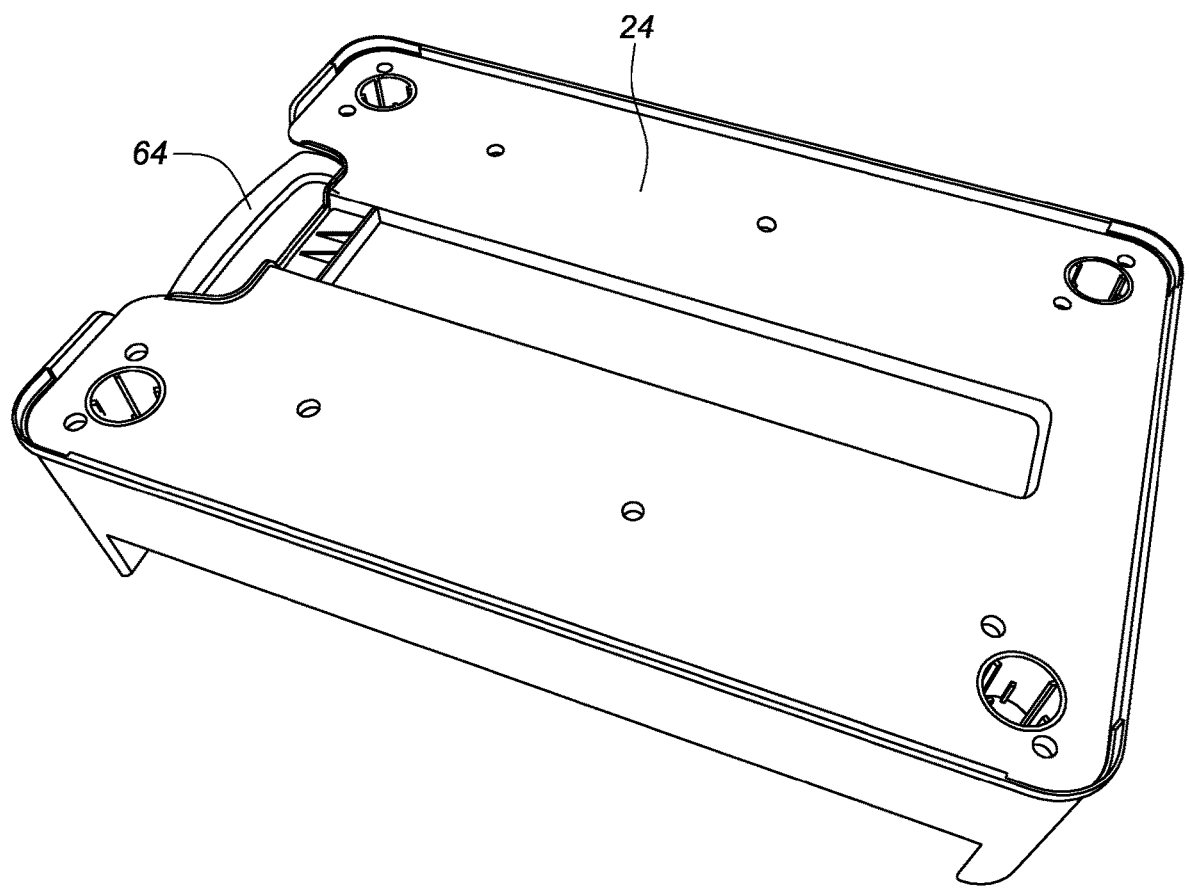
FIG. 46 is a perspective view of the underside of the collapsible cart of FIG. 45, according to an embodiment.
Figure 47:
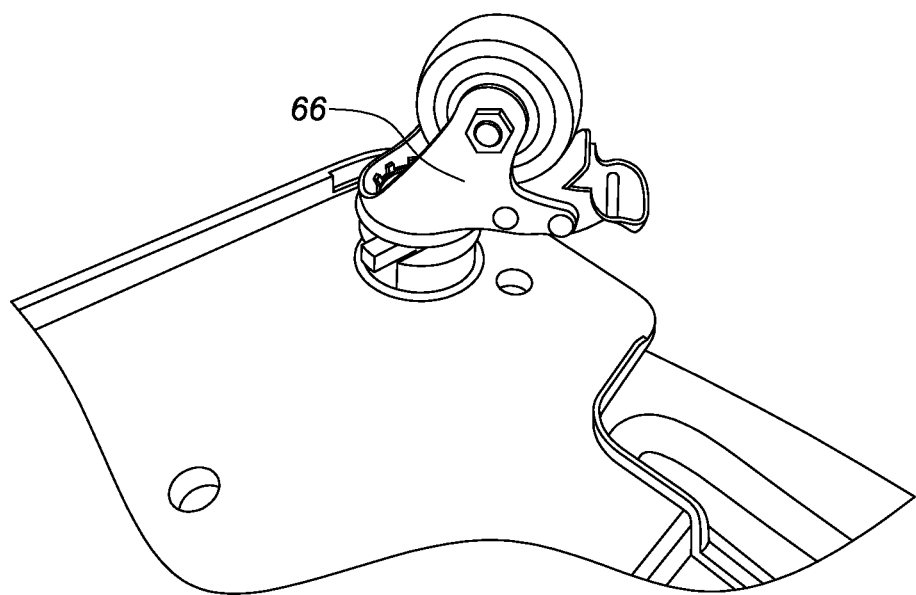
FIG. 47 is a close-up view of a wheel assembly engaged to a receiving aperture in the underside of the collapsible cart of FIG. 45, according to an embodiment.
Figure 48:
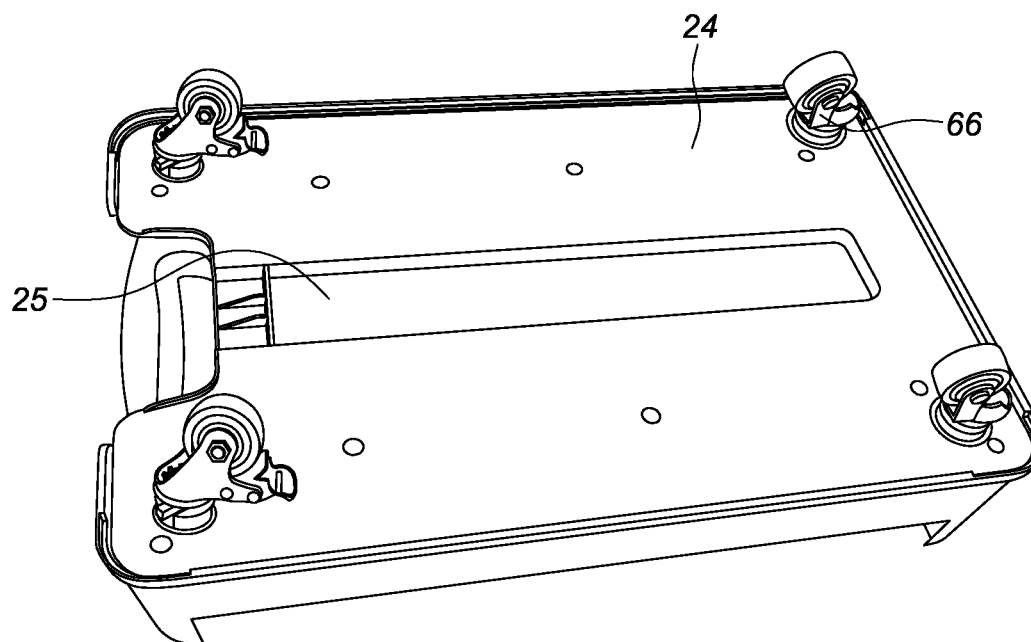
FIG. 48 is a perspective view of the underside of the collapsible cart of FIG. 45 with wheel assemblies, according to an embodiment.
Figure 49:
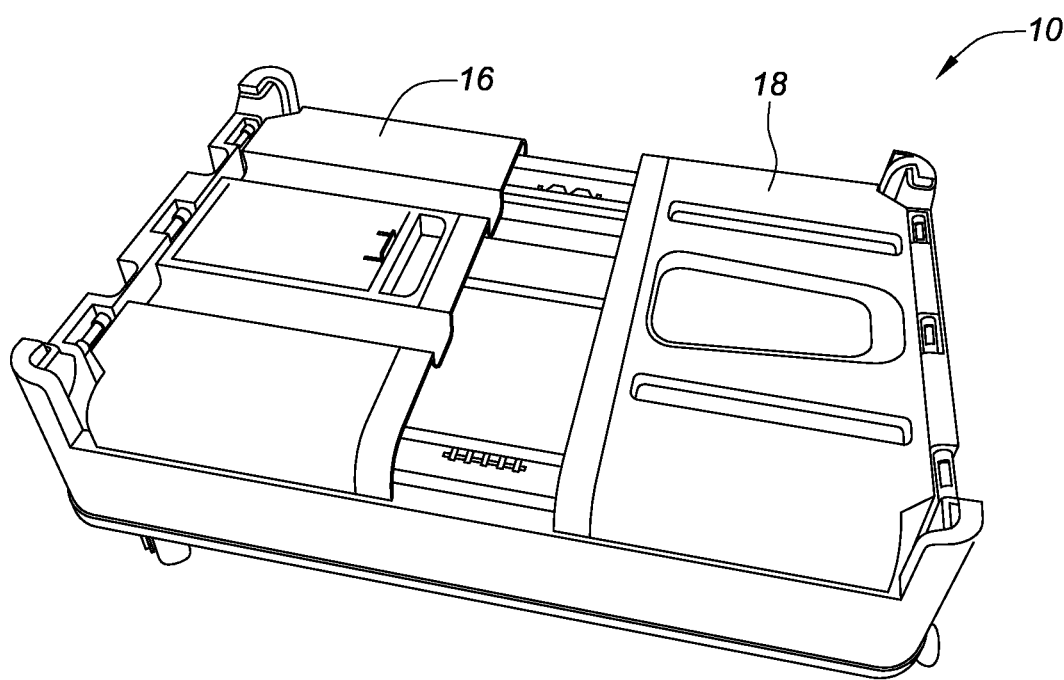
FIG. 49 is a perspective view of the collapsible cart of FIG. 45 without the cover panel, according to an embodiment.
Figure 50:
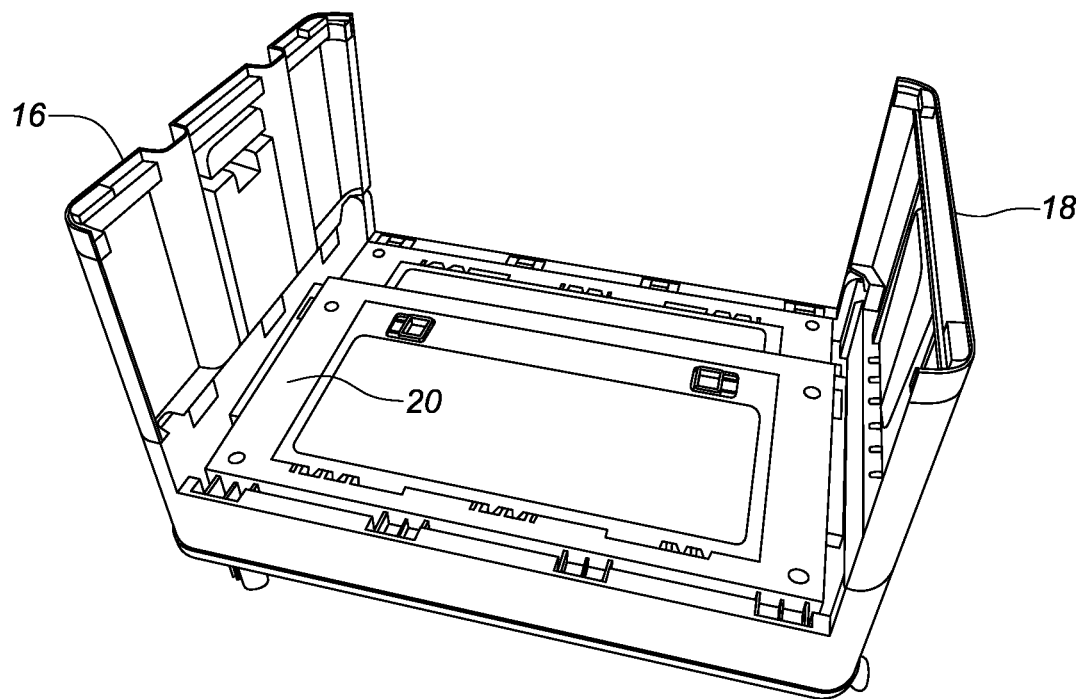
Figure 54:
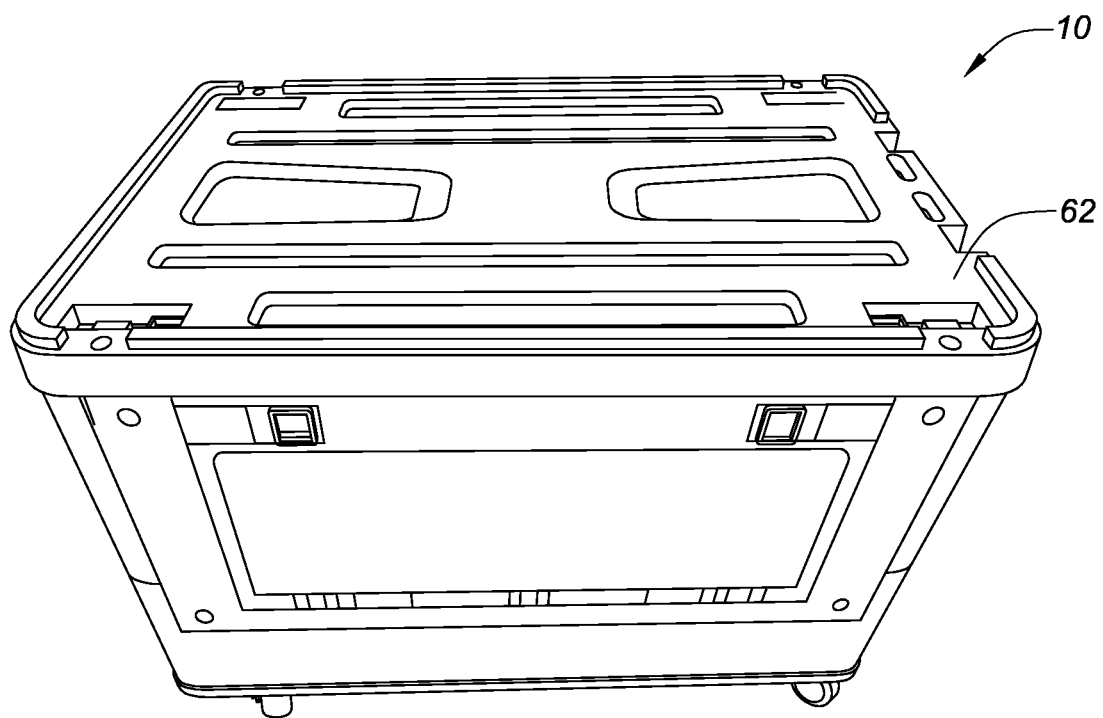
FIG. 54 is a perspective view of the collapsible cart of FIG. 45 in an open condition with the cover panel placed on top, according to an embodiment.
Figure 55:
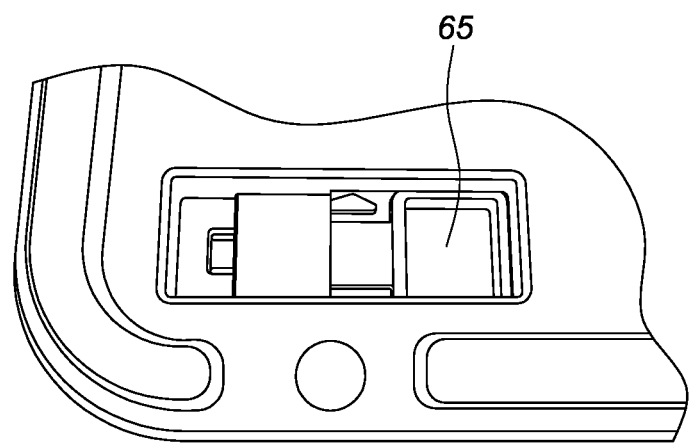
FIG. 55 illustrate a lock assembly translatable to lock the cover panel to one of the sidewalls of the collapsible cart of FIG. 45, according to an embodiment.
Figure 56:
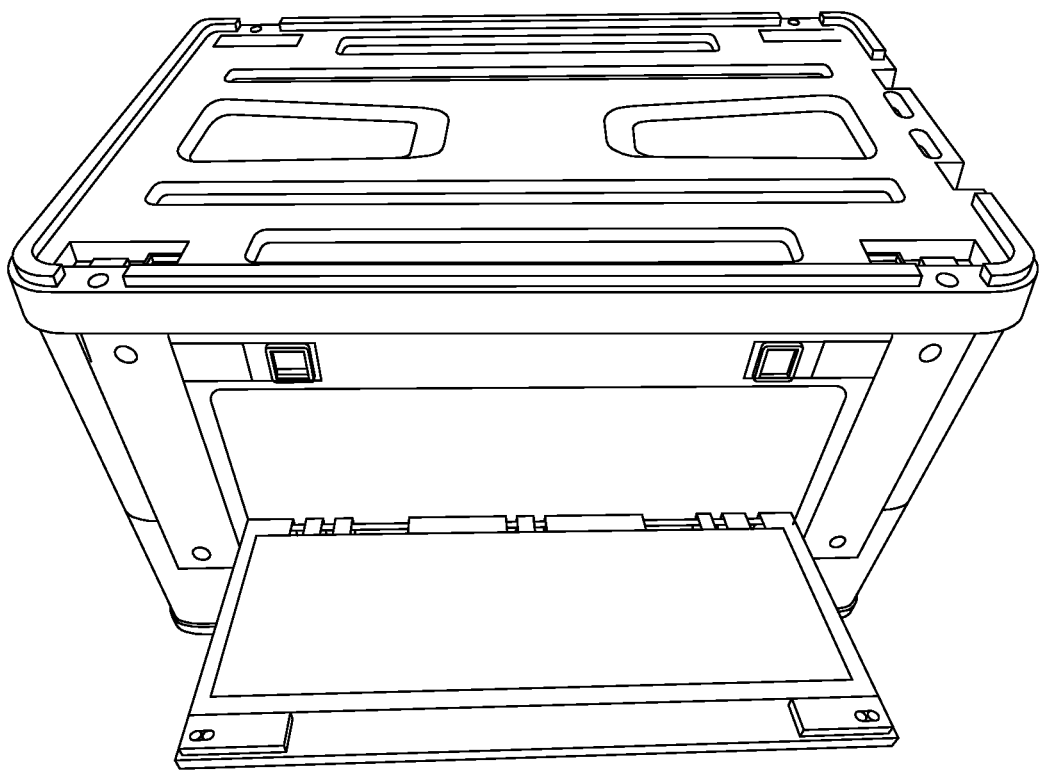
FIG. 56 is a perspective view of the collapsible cart of FIG. 45 illustrating a second panel rotatably coupled to a first panel, according to an embodiment.
Figure 57:
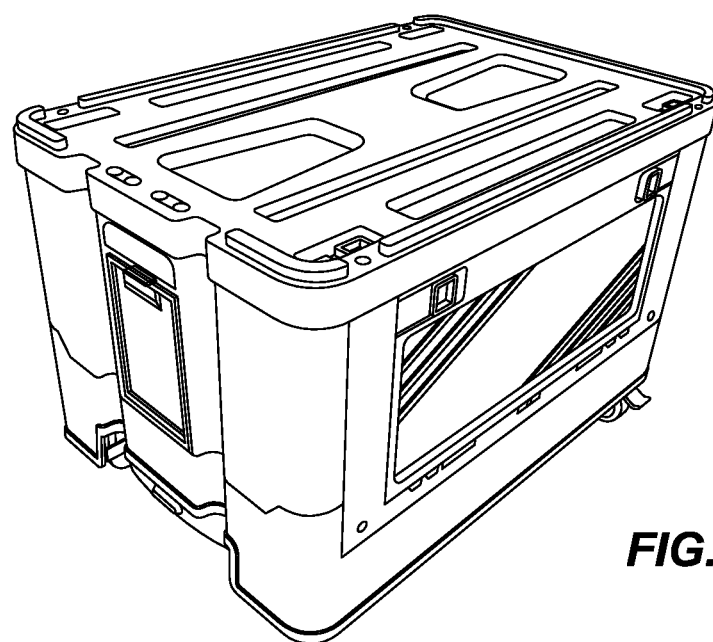
FIG. 57 is a perspective view of the collapsible cart of FIG. 45 in an open condition with alternate second panel having ribbed configuration for increased strength, according to an embodiment.
Figure 58:
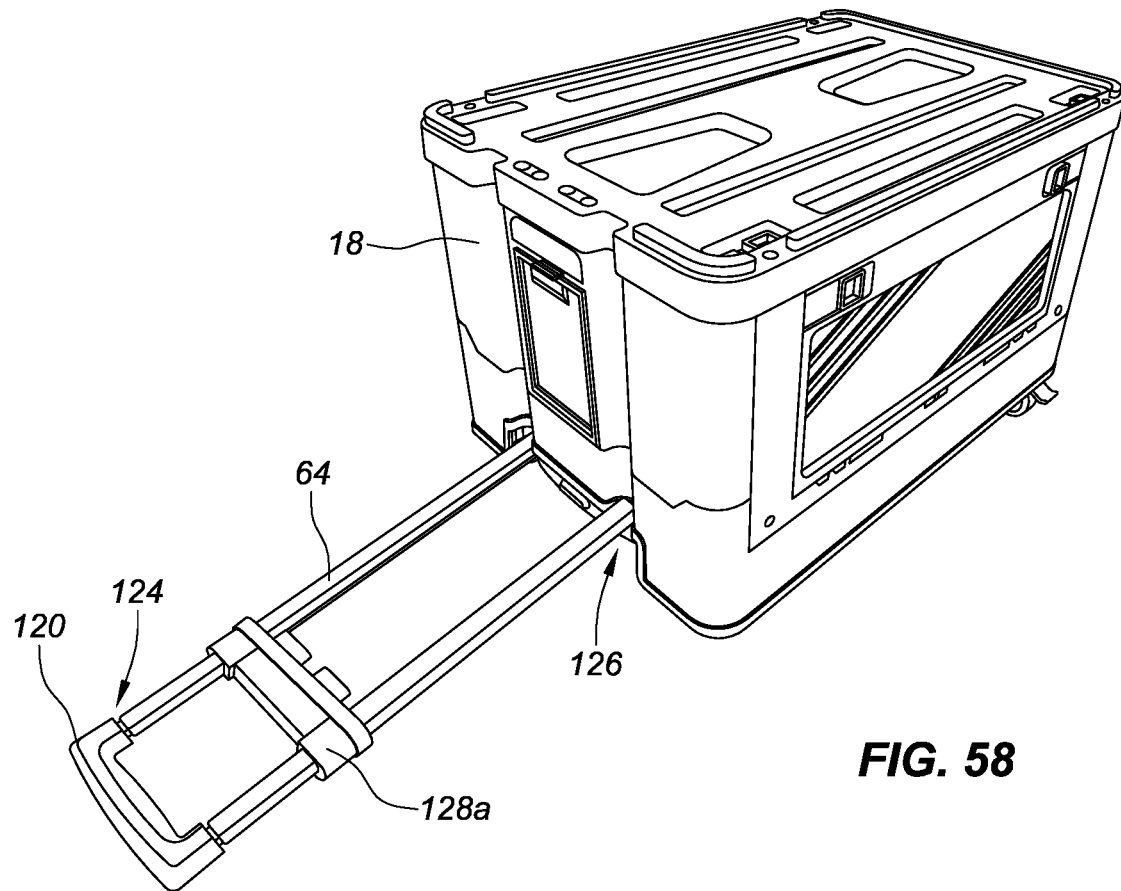
FIG. 58 is a view similar to FIG. 57 showing how the telescoping handle extended from underneath the collapsible cart and pivoted at its proximal end, according to an embodiment.
Figure 59:
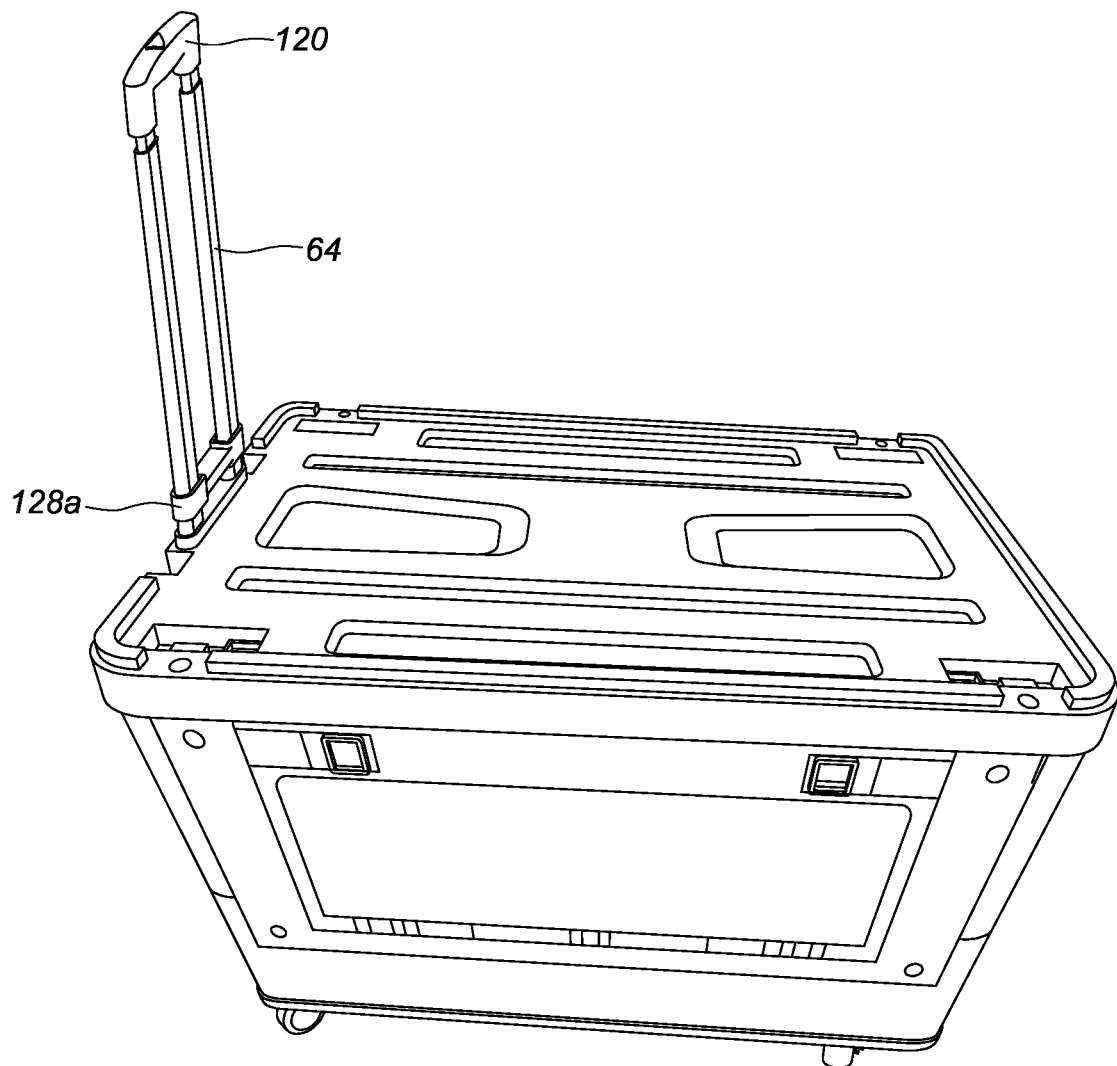
FIGS. 59-61 illustrate the locking of the telescoping handle to the cover panel so as to retain the telescoping handle in a vertical fixed position, according to an embodiment.
Figure 60:
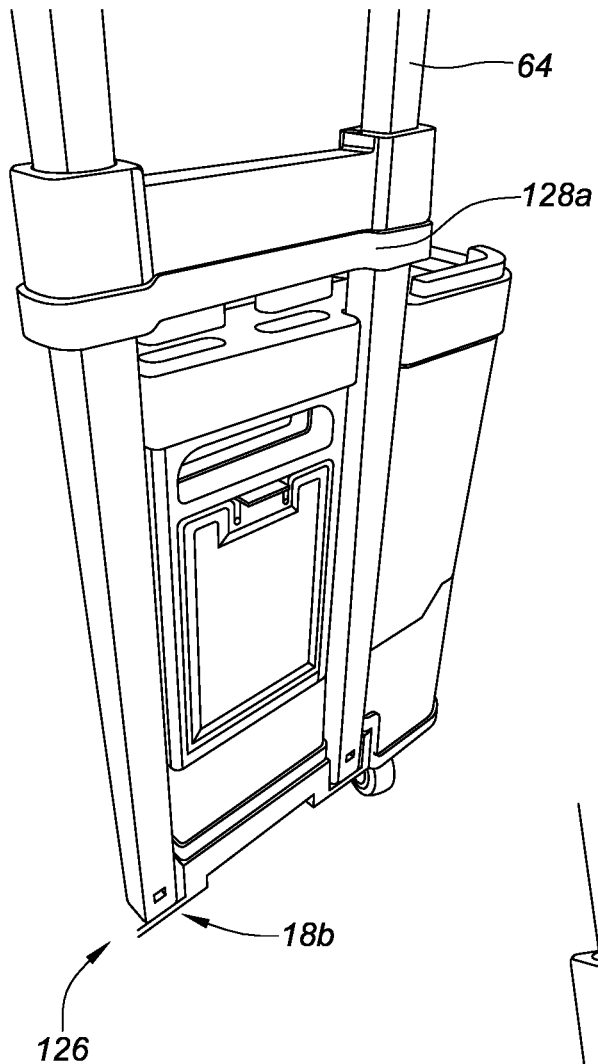
Figure 61:
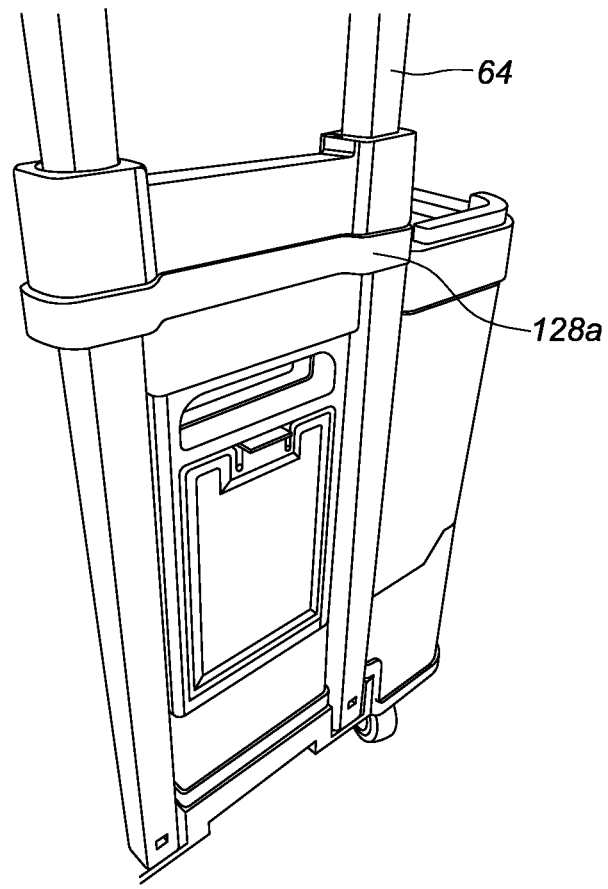

In some embodiments, as shown in FIG. 46, the telescoping handle assembly 64 may be rotatable to be horizontally aligned with the bottom wall 24 and may be retained parallel to the bottom wall 24 when in storage. As with prior embodiments, the collapsible cart 10 shown in FIG. 48 may include a wheel assembly 66 coupled to the bottom wall 24 of the cart 10.

In some embodiments, as shown in FIG. 51, the left sidewall 22 may also include a first left panel 32 rotatably coupled to a second left panel 34. In yet another embodiment, the second left panel 34 may be proportioned to fit within an opening in the first left panel 32. In some embodiments, the collapsible cart 10 may also include a second track 48 formed along the first left panel 32 and the second left panel 34 extending from a first position on the first left panel 32 to a second position on the second left panel 34. The collapsible cart 10 may also include a second slideable member 60 cooperatively engaged to the second track 48, the second slideable member 60 may be movable along the second track 48 between an open position to a closed position to selectively lock the first left panel 32 to the second left panel 34.

In some embodiments, the second slideable member 60 may be in the open position when disposed along the second track 48 adjacent the first position of the second track 48 while not disposed along the second left panel 34 and may be in the closed position when disposed along the second track 48 adjacent the second position of the second track 48 while being disposed across both the first left panel 32 and second left panel 34.

As shown in FIGS. 58-63, in some embodiments, the collapsible cart 10 may include a telescoping handle assembly 64 adjacent the rear wall 18. The telescoping handle assembly 64 may include a hand grip 120 at a distal end 124 of the telescoping handle assembly 64 and may be pivotably coupled at proximal end 126 to the bottom 18b of the rear wall 18. In one embodiment, the collapsible cart 10 includes a sliding lock member 128a translatable along at least a portion of the telescoping handle assembly 64. The sliding lock member 128a may be configured to lock to the rear wall 18 securing the telescoping handle assembly 64 parallel to the rear wall 18. The sliding lock member 128a may be configured to unlock from the rear wall 18 and/or cover panel 62 allowing the telescoping handle assembly 64 to pivot at an angle away from the rear wall 18. In some embodiments, the bottom wall 24 may include a sleeve 25. The telescoping handle assembly 64 may be rotatable to be horizontally aligned with the bottom wall 24 and may be retained in the sleeve 25 when the collapsible cart 10 is in the closed condition.

Figure 62:
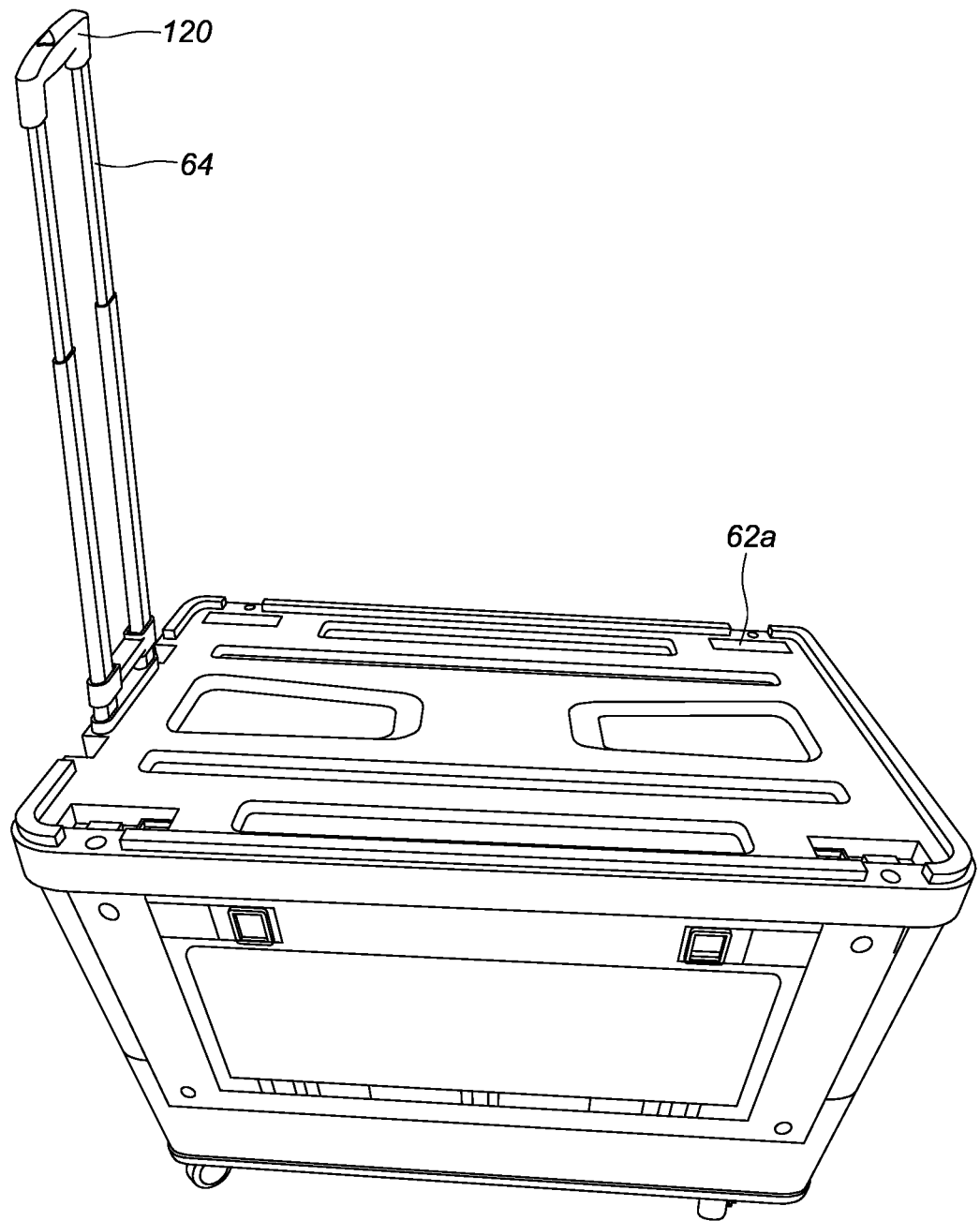
FIG. 62 illustrate the collapsible cart of FIG. 45 showing a locking slide being moved upwards to unlock the telescoping handle relative to the cover panel of the cart.

As shown in FIG. 62, in some embodiments, the top cover 62 may also include an indentation pattern 62a being at least substantially aligned with a vertical axis of the wheel assembly 66. The indentation pattern 62a may be configured to receive a wheel assembly 66 from another identical collapsible cart 10 when stacked vertically.

Although the various inventive aspects are herein disclosed in the context of certain preferred embodiments, implementations, and examples, it will be understood by those skilled in the art that the present invention extends beyond the specifically disclosed embodiments to other alternative embodiments and/or uses of the invention and obvious modifications and equivalents thereof. In addition, while a number of variations of the inventive aspects have been shown and described in detail, other modifications, which are within their scope will be readily apparent to those of skill in the art based upon this disclosure. It should be also understood that the scope this disclosure includes the various combinations or sub-combinations of the specific features and aspects of the embodiments disclosed herein, such that the various features, modes of implementation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this disclosure is not be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

Further, all claim terms should be interpreted in their most expansive forms so as to afford the applicant the broadest coverage legally permissible. Although the embodiments have been described with reference to the drawings and specific examples, it will readily be appreciated by those skilled in the art that many modifications and adaptations of the processes, methods and apparatuses described herein are possible without departure from the spirit and scope of the embodiments as claimed herein. Thus, it is to be clearly understood that this description is made only by way of example and not as a limitation on the scope of the embodiments as claimed below.

What is claimed is:

1. A collapsible cart configured to transition from a closed condition where it is folded up to an open condition where it is expanded for use, the collapsible cart comprising:
    a rigid frame forming a compartment, the rigid frame having a front wall, a rear wall, a right sidewall, a left sidewall, and a bottom wall, the right sidewall and the left sidewall are configured to fold inwardly in the closed condition; the right sidewall comprising a first right panel rotatably coupled to a second right panel; the second right panel proportioned to fit within an opening in the first right panel;
    a first track formed along the first right panel and the second right panel extending from a first position on the first right panel to a second position on the second right panel; and
    a first slideable member cooperatively engaged to the first track, the first slideable member is movable along the first track between an open position to a closed position to selectively lock the first right panel to the second right panel, wherein the first slideable member is in the open position when disposed along the first track adjacent the first position of the first track while not disposed along the second right panel and is in the closed position when disposed along the first track adjacent the second position of the first track while being disposed across both the first right panel and second right panel.

2. The collapsible cart of claim 1, wherein the second right panel comprises a ribbed wall with a plurality of ribs, the ribbed wall disposed adjacent the first track.

3. The collapsible cart of claim 2, wherein the plurality of ribs are aligned parallel to the first track.

4. The collapsible cart of claim 1, further comprising a top cover with at least one integrated lock assembly, the at least one lock assembly removably couples the top cover to an interior surface of at least one of the front wall, the rear wall, the right sidewall, and the left sidewall.

5. The collapsible cart of claim 1, wherein the left sidewall comprising a first left panel rotatably coupled to a second left panel, the second left panel proportioned to fit within an opening in the first left panel.

6. The collapsible cart of claim 5, further comprising:
    a second track formed along the first left panel and the second left panel extending from a first position on the first left panel to a second position on the second left panel; and
    a second slideable member cooperatively engaged to the second track, the second slideable member is movable along the second track between an open position to a closed position to selectively lock the first left panel to the second left panel, wherein the second slideable member is in the open position when disposed along the second track adjacent the first position of the second track while not disposed along the second left panel and is in the closed position when disposed along the second track adjacent the second position of the second track while being disposed across both the first left panel and second left panel.

7. The collapsible cart of claim 1, wherein the right sidewall further comprising a third right panel, and wherein each of the second right panel and the third right panel encloses half of the opening in the first right panel.

8. The collapsible cart of claim 1, further comprising:
    a telescoping handle assembly adjacent the rear wall, the telescoping handle assembly comprises:
        a hand grip at a distal end of the telescoping handle assembly and is pivotably coupled at proximal end to the bottom of the rear wall, and
        a sliding lock member translatable along at least a portion of the telescoping handle assembly, wherein the sliding lock member is configured to lock to the rear wall securing the telescoping handle assembly parallel to the rear wall, and
    wherein the sliding lock member is configured to unlock from the rear wall allowing the telescoping handle assembly to pivot at an angle away from the rear wall.

9. The collapsible cart of claim 1, wherein the telescoping handle assembly is rotatable to be horizontally aligned with the bottom wall and is retained parallel to the bottom wall when in storage.

10. The collapsible cart of claim 1, further comprising a wheel assembly coupled to the bottom wall of the cart.

11. A cart comprising:
    a rigid frame forming a compartment in an open condition, the rigid frame having a front wall, a rear wall, a right sidewall, a left sidewall, and a bottom wall, the right sidewall and the left sidewall are configured to fold inwardly in the closed condition, the right sidewall comprising a first right panel rotatably coupled to a second right panel, the right sidewall further comprising a third right panel, wherein the second right panel and the third right panel conform in shape to collectively cover the opening in the first right panel and, the second right panel comprises a ribbed wall with a plurality of ribs; and a first lock assembly integrated with the first right panel and the second right panel, the first lock assembly having a first condition for locking the first right panel to the second right panel, and a second condition for unlocking the first right panel from the second right panel.

12. The collapsible cart of claim 11, wherein the second right panel conforming in shape to cover at least a portion of an opening in the first right panel.

13. The collapsible cart of claim 11, further comprising a plurality of rotatable swivel wheels coupled to the bottom wall of the collapsible cart having at least one wheel-locking assembly, the at least one-wheel locking assembly having a first condition for locking at least one of the rotatable swivel wheels to prevent rolling movement, and a second condition for unlocking the at least one of the rotatable swivel wheels.

14. The collapsible cart of claim 11, further comprising a top cover panel conforming in shape to a top opening of the compartment, the top cover panel securely fits in a first position over the top opening to serve as a cover or seat on top of the collapsible cart, the top cover panel having an integrated second lock assembly, the second lock assembly removably couples the top cover to an interior surface of at least one of the front wall, the rear wall, the right sidewall, and the left sidewall.

15. A stackable collapsible cart configured to transition from a closed condition where it is folded up to an open condition where it is expanded for use, the stackable collapsible cart comprising:

a rigid frame forming a compartment in the open condition, the rigid frame having a front wall, a rear wall, a right sidewall, a left sidewall, and a bottom wall, the right sidewall and the left sidewall are configured to fold inwardly in the closed condition, the right sidewall comprising a first right panel rotatably coupled to a second right panel;

a first lock assembly integrated with the first right panel and the second right panel, the first lock assembly having a first condition for locking the first right panel to the second right panel, and a second condition for unlocking the first right panel from the second right panel;

a wheel assembly coupled to the bottom wall of the cart, the first wheel assembly having a first vertical axis; and a rigid top cover conforming in shape to a top opening of the compartment, the rigid top cover securely fits in a first position over the top opening to serve as a cover on top of the collapsible cart, the rigid top cover securely fits in a second position when the right sidewall and left sidewall fold inwardly in a closed condition, wherein the rigid top cover has an indentation pattern being at least substantially aligned with the vertical axis of the wheel assembly, the indentation pattern configured to receive a wheel assembly from another identical collapsible cart when stacked vertically.

16. The stackable collapsible cart of claim 15, further comprising:

a telescoping handle assembly adjacent the rear wall, the telescoping handle assembly comprises:

a hand grip at a distal end of the telescoping handle assembly and is pivotably coupled at proximal end to the bottom of the rear wall, and a sliding lock member translatable along at least a portion of the telescoping handle assembly, wherein the sliding lock member is configured to lock to the rear wall securing the telescoping handle assembly parallel to the rear wall, and wherein the sliding lock member is configured to unlock from the rear wall allowing the telescoping handle assembly to pivot at an angle away from the rear wall.

17. The stackable collapsible cart of claim 16, wherein the bottom wall comprises a sleeve, and wherein the telescoping handle assembly is rotatable to be horizontally aligned with the bottom wall and is retained in the sleeve when the stackable collapsible cart is in the closed condition.

18. The stackable collapsible cart of claim 15, wherein the top cover panel comprises an integrated second lock assembly, the second lock assembly removably couples the top cover to an interior surface of at least one of the front wall, the rear wall, the right sidewall, and the left sidewall.

* * * * *